(12) United States Patent
Ishii et al.

(10) Patent No.: US 8,588,414 B2
(45) Date of Patent: *Nov. 19, 2013

(54) IMAGE ENCRYPTION AND IMAGE DECRYPTION APPARATUS AND METHOD

(75) Inventors: Hideaki Ishii, Fukuoka (JP); Taizo Anan, Kawasaki (JP); Kensuke Kuraki, Kawasaki (JP); Shohei Nakagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 490 days.

This patent is subject to a terminal disclaimer.

(21) Appl. No.: 12/626,104

(22) Filed: Nov. 25, 2009

(65) Prior Publication Data

US 2010/0074443 A1 Mar. 25, 2010

Related U.S. Application Data

(63) Continuation of application No. PCT/JP2007/000583, filed on May 30, 2007.

(51) Int. Cl.
*H04L 29/06* (2006.01)
(52) U.S. Cl.
USPC .......................................... 380/54; 380/243
(58) Field of Classification Search
USPC .................................. 380/54, 243
See application file for complete search history.

(56) References Cited

U.S. PATENT DOCUMENTS

| | | | |
|---|---|---|---|
| 5,491,563 A | * | 2/1996 | Pomerantz .................... 358/405 |
| 6,839,844 B1 | | 1/2005 | Okano |
| 7,506,371 B1 | * | 3/2009 | Ben-Natan ...................... 726/18 |
| 2008/0080738 A1 | | 4/2008 | Takahashi et al. |

FOREIGN PATENT DOCUMENTS

| | | | |
|---|---|---|---|
| EP | 1 750 427 A1 | | 2/2007 |
| EP | 2 079 228 | | 7/2009 |
| JP | 2003-152987 | | 5/2003 |
| JP | 2003-169047 | * | 6/2003 |
| JP | 2006-74570 | | 3/2006 |
| JP | 2006-332826 | * | 12/2006 |
| JP | 2008-85920 | | 4/2008 |
| WO | 2008/053576 | | 5/2008 |

OTHER PUBLICATIONS

Search Report for European Application No. 07737239.9-1228; dated Aug. 24, 2012.

* cited by examiner

*Primary Examiner* — Lisa Lewis
(74) *Attorney, Agent, or Firm* — Staas & Halsey LLP

(57) ABSTRACT

Input data is converted into an image, and in the input image, an encryption region that is a region in which the image is to be encrypted. Meanwhile, on the basis of an encryption key, encryption key-related information that is information related to the encryption key is generated, and the encryption key-related information is embedded into the image in the encryption region, to generate a first intermediate image. Next, the first intermediate image is converted on the basis of the encryption key, to generate a second intermediate image. Then, the pixel values of the second intermediate image are converted so that the position of the encryption region can be specified. As a result of the conversion, an encrypted image in which the part corresponding to the encryption region in the input image is generated.

18 Claims, 116 Drawing Sheets

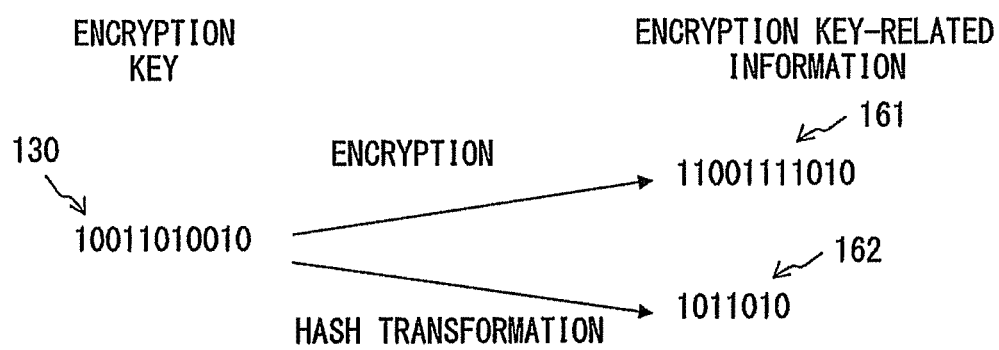
F I G. 1 0

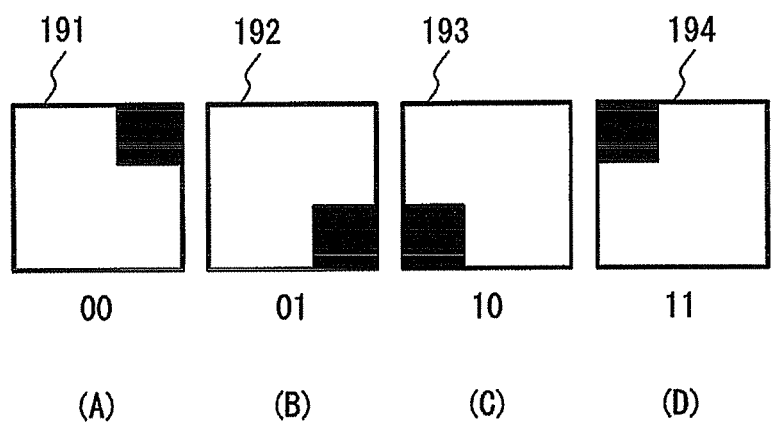
F I G. 1 3

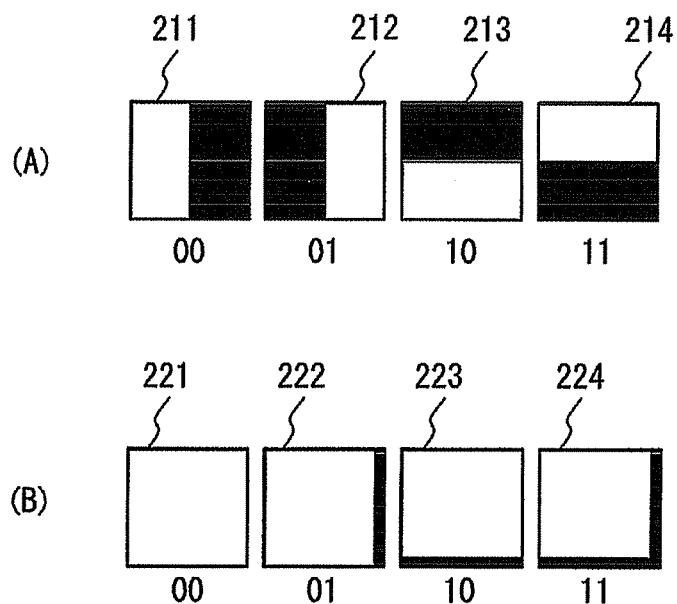
F I G. 1 6

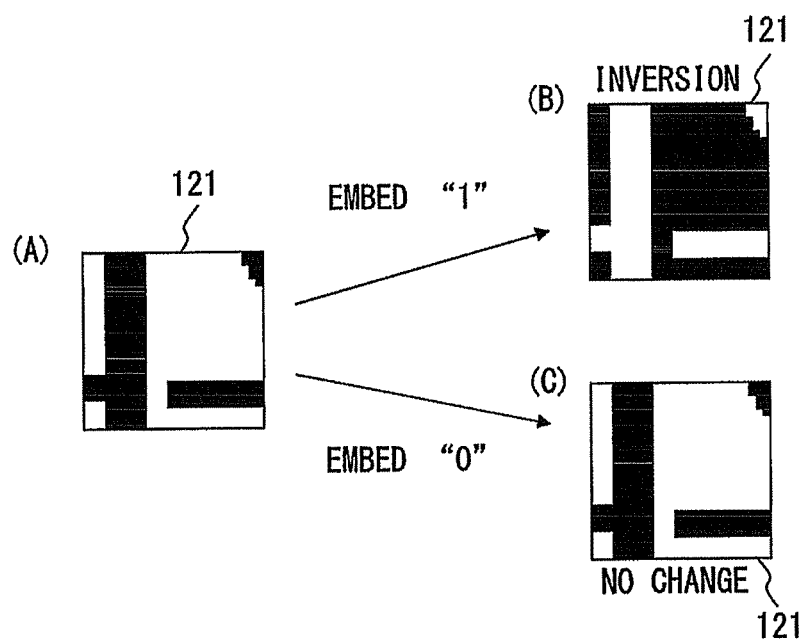
F I G. 3 2

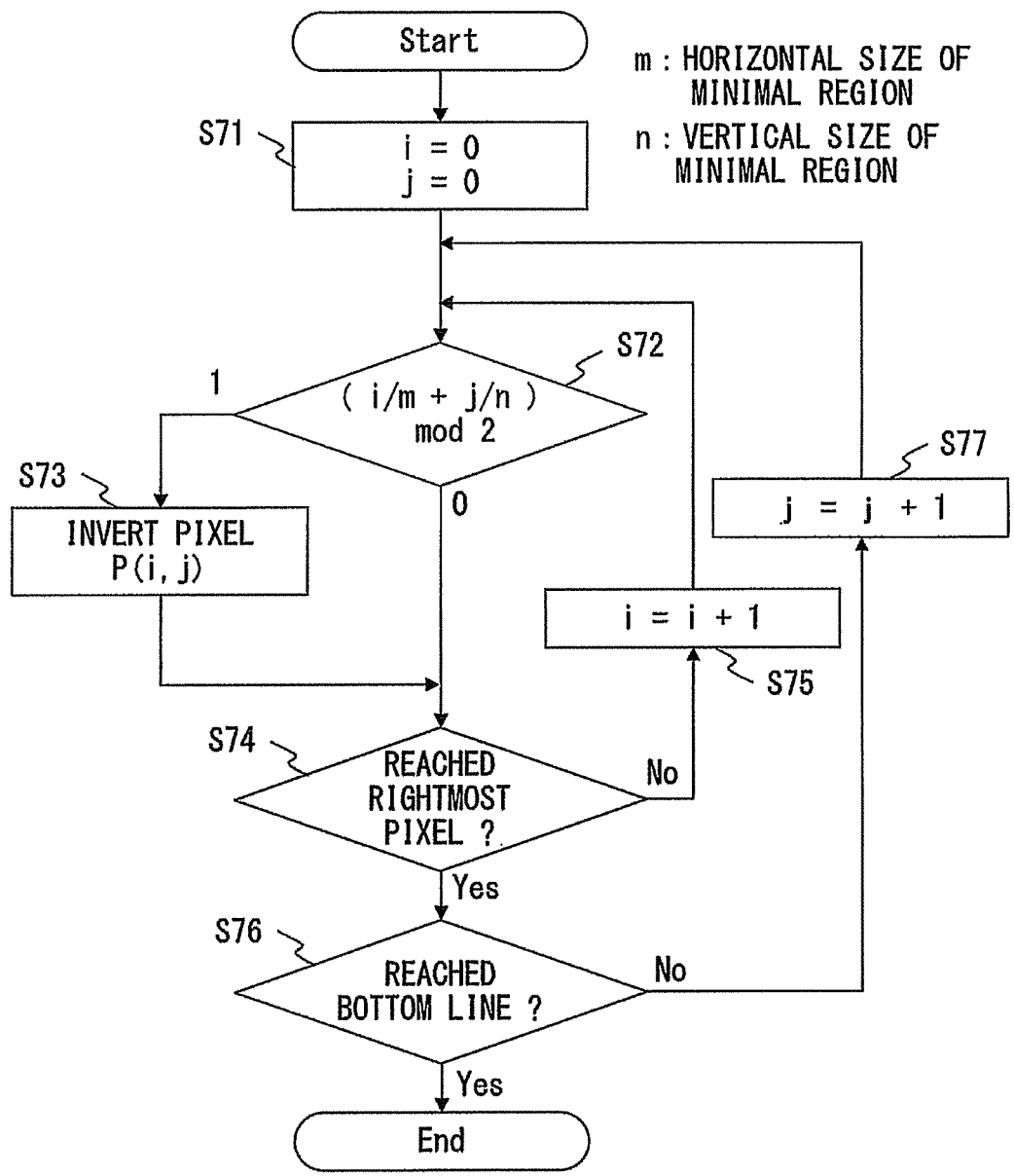
F I G. 3 5

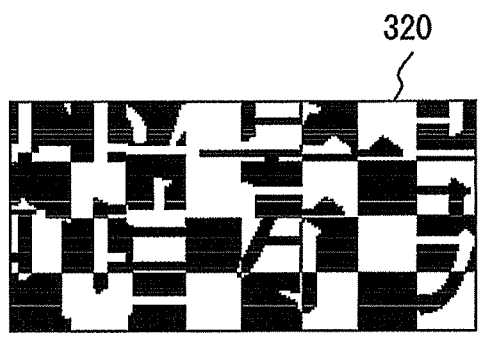
F I G. 37

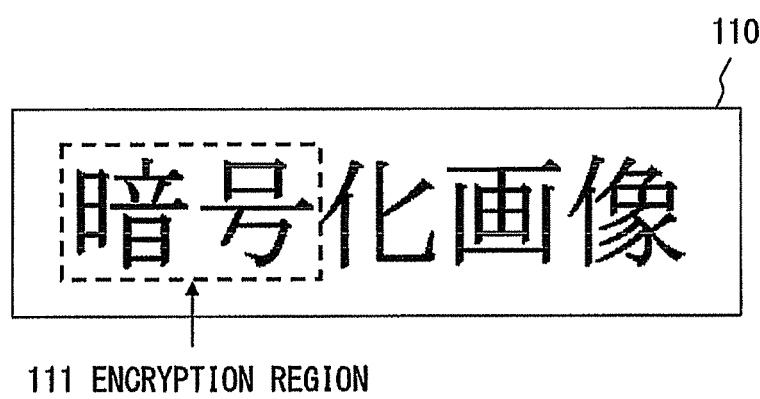
F I G. 4 2

F I G. 4 5

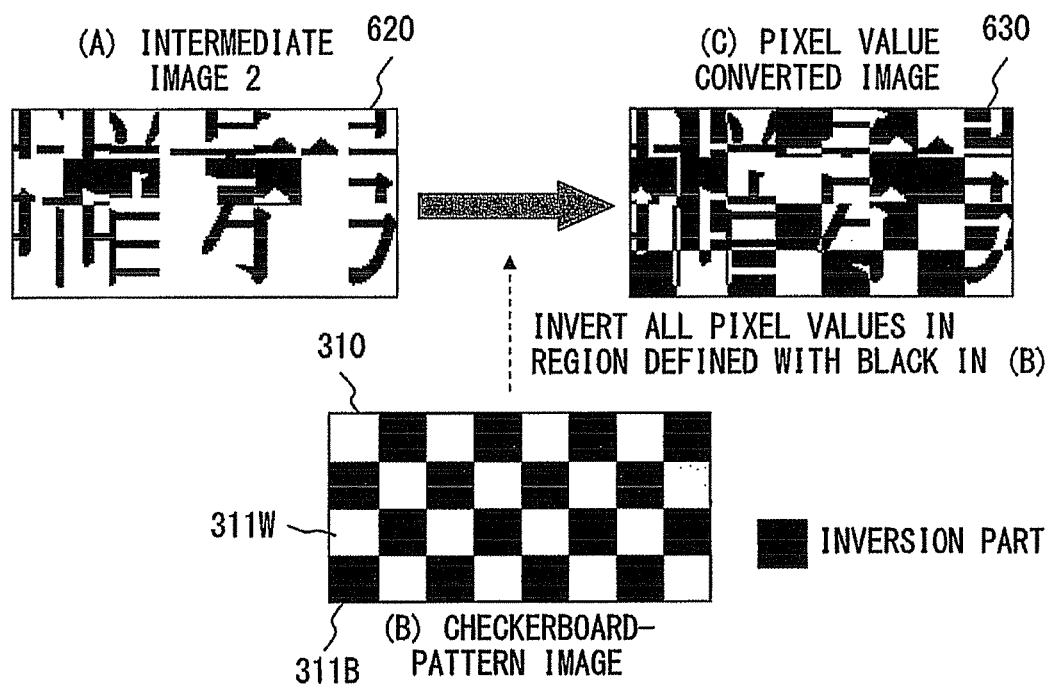
F I G. 4 8

630

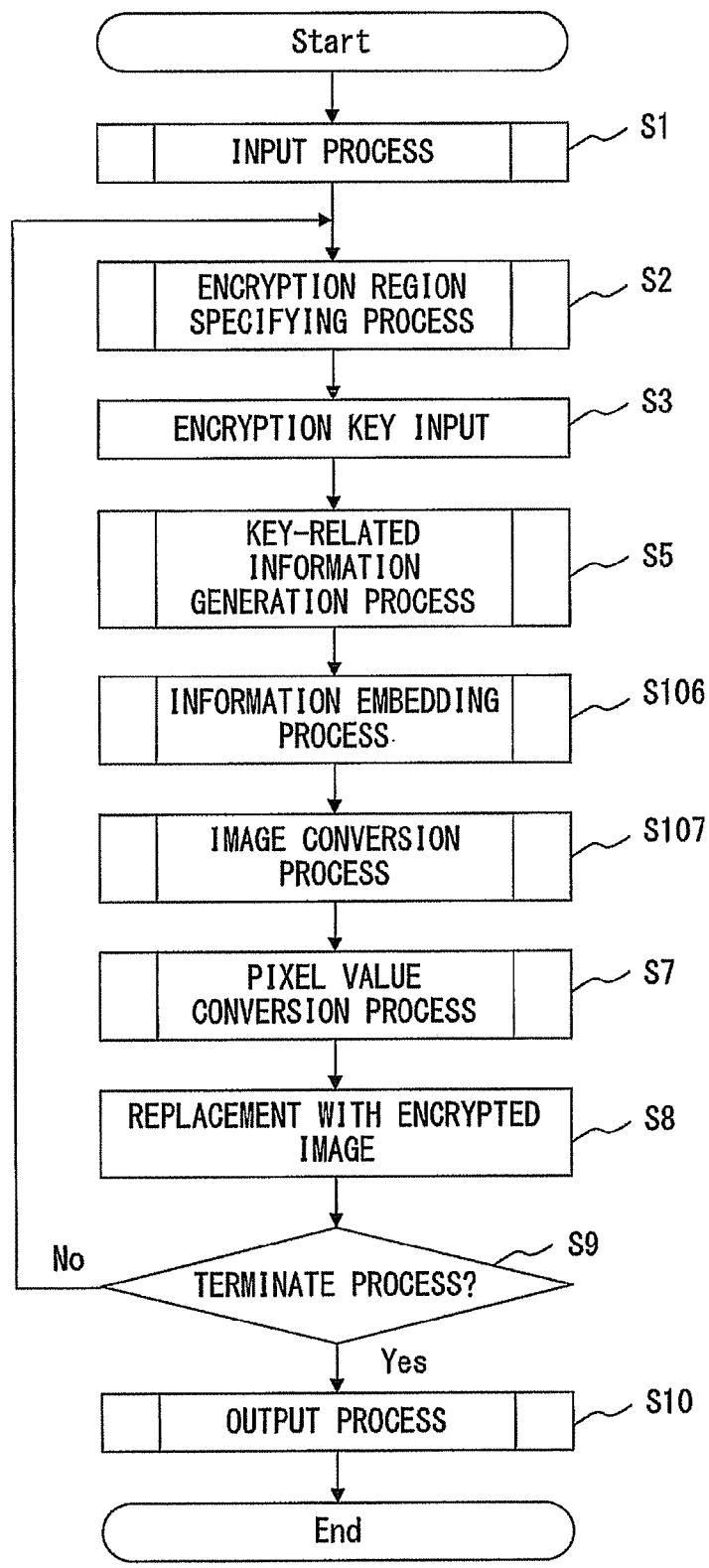
F I G. 5 0

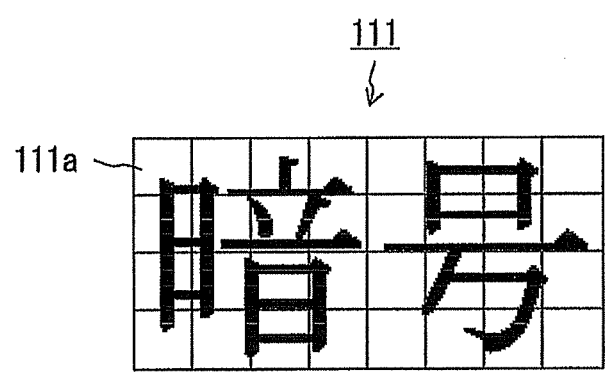
F I G. 5 2

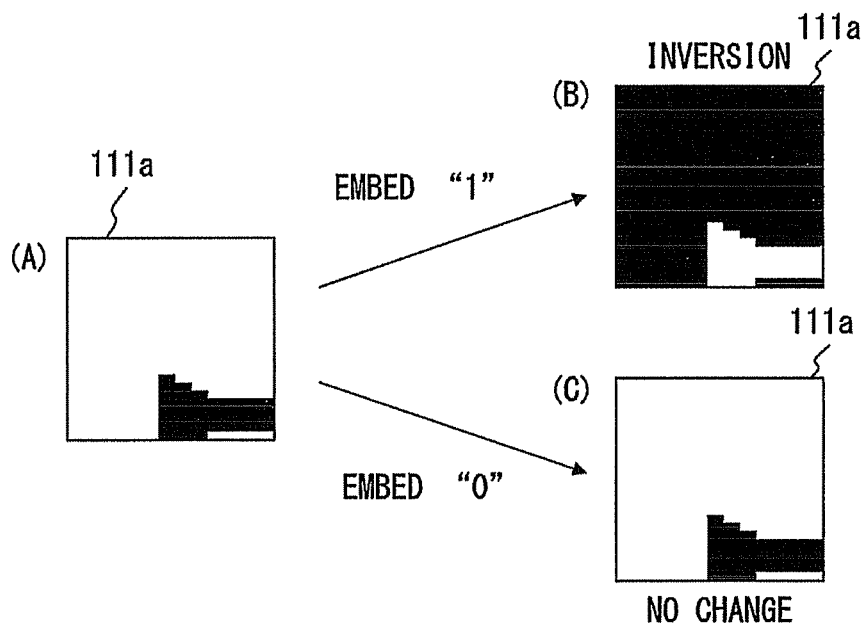
F I G. 5 4

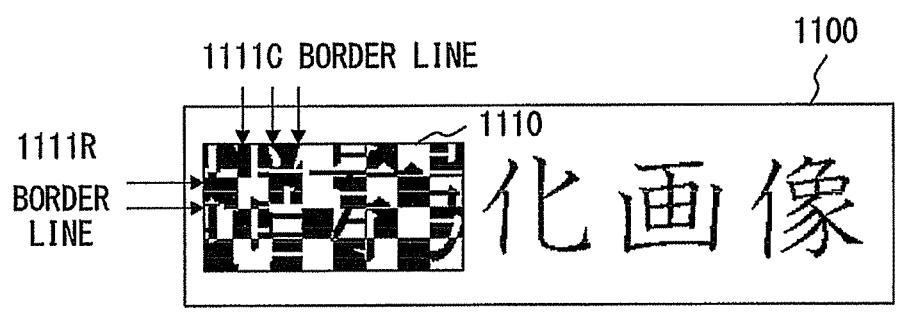
F I G. 5 7

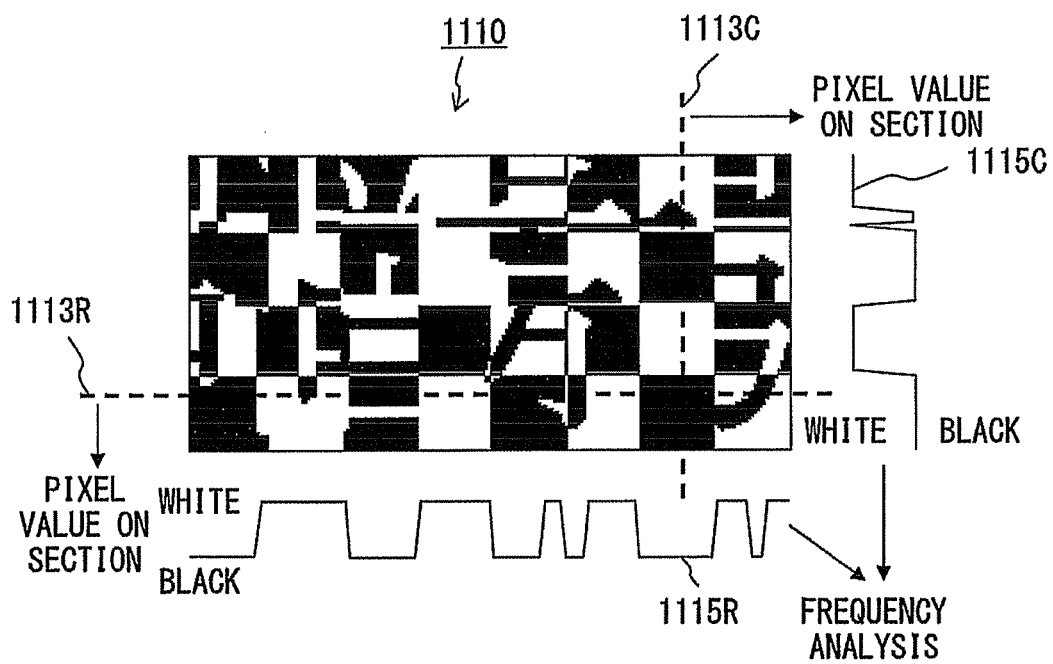
F I G. 5 8

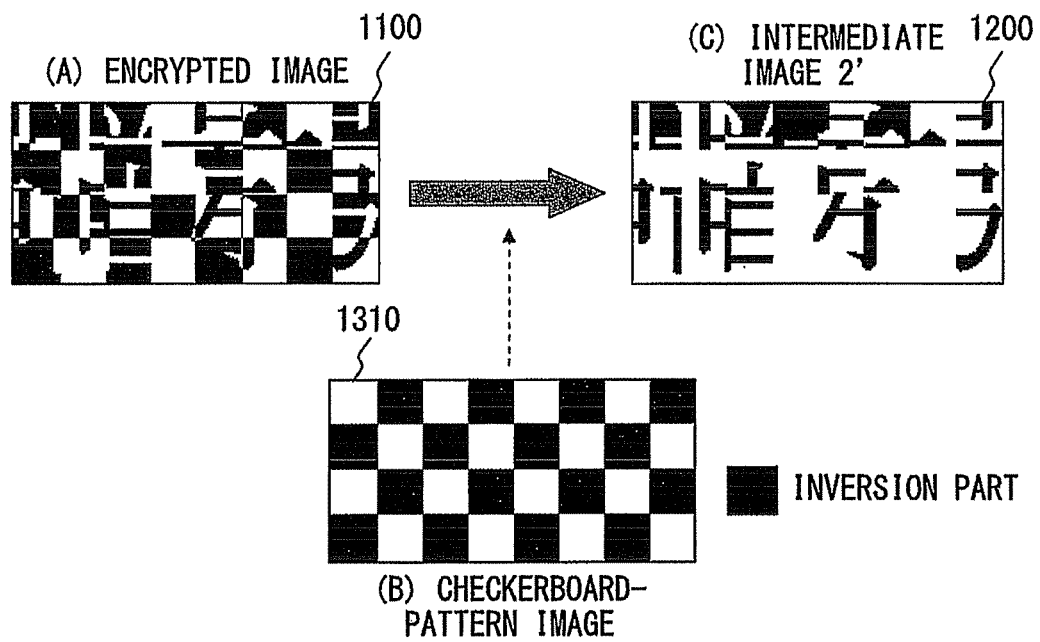
F I G. 5 9

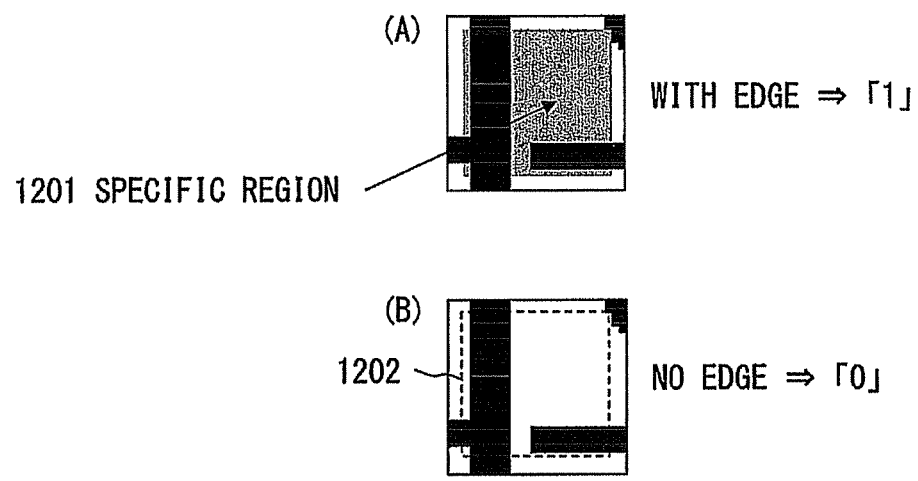
F I G. 6 1

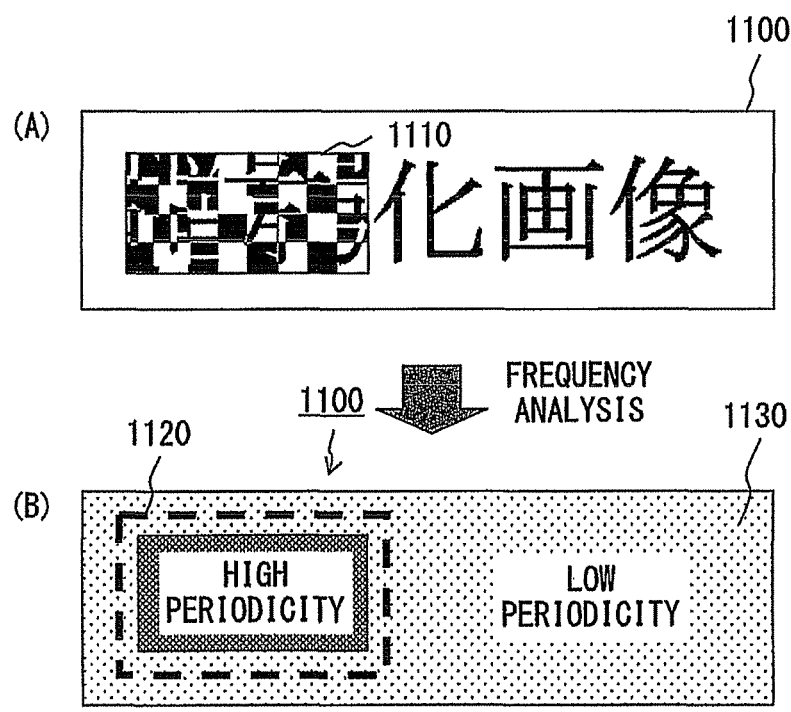
F I G. 6 8

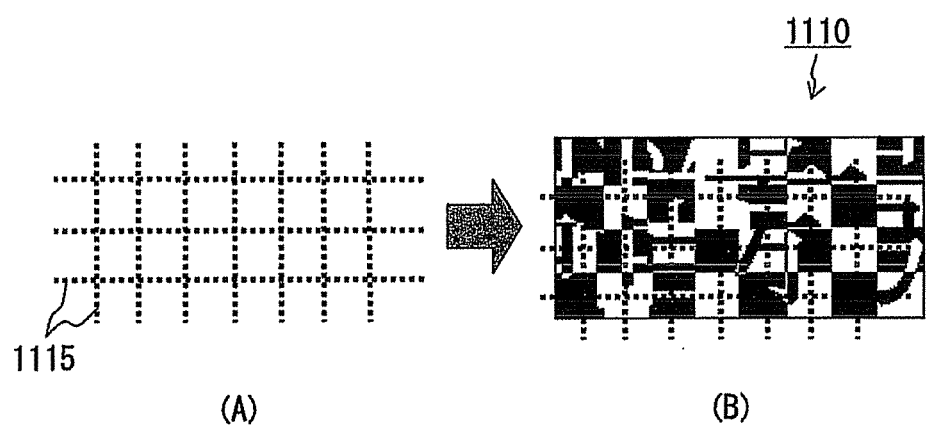
F I G. 6 9

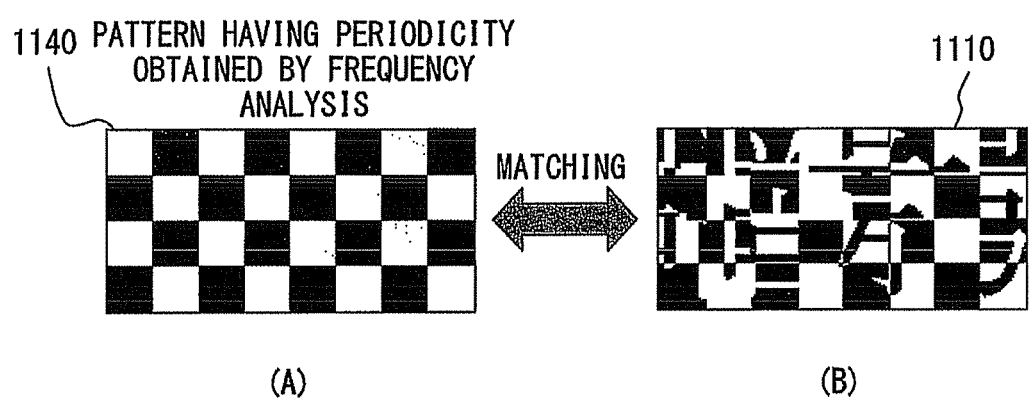
F I G. 7 0

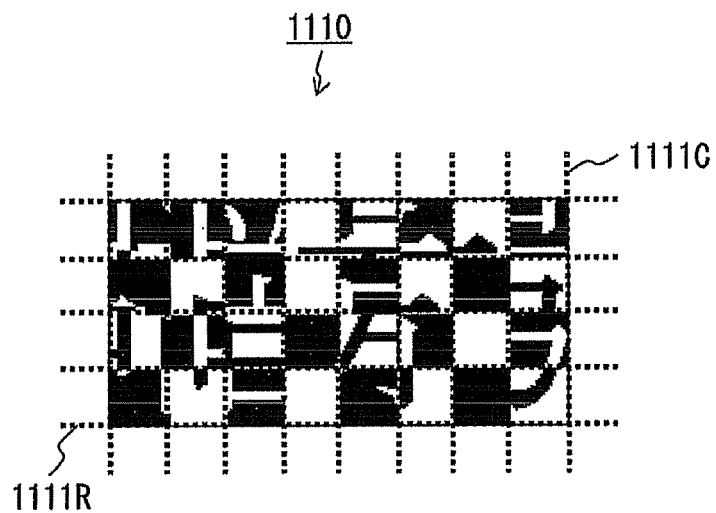
F I G. 7 1

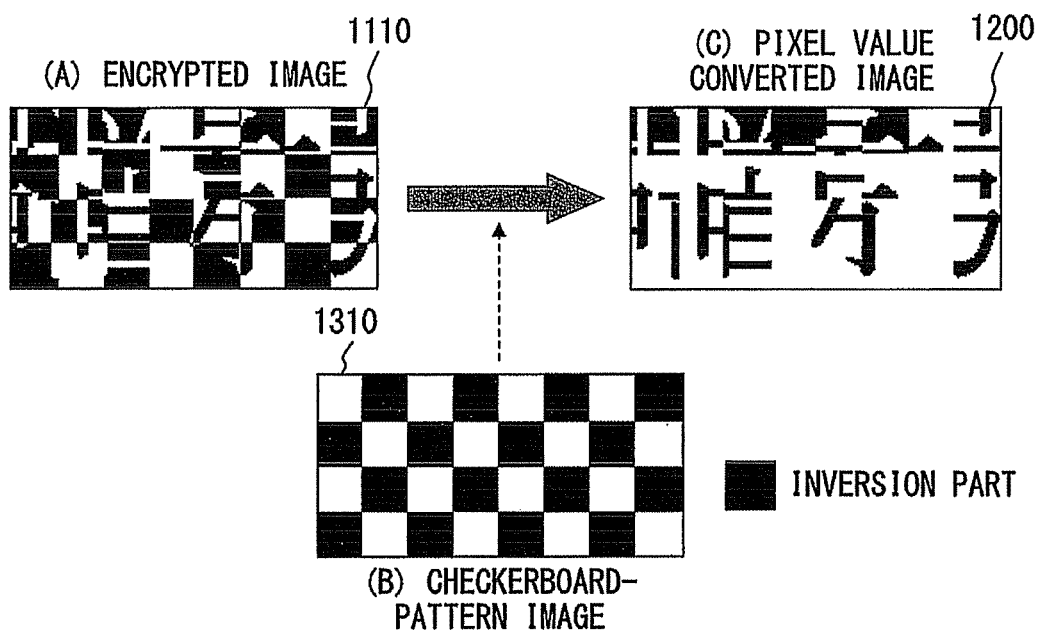
F I G. 7 2

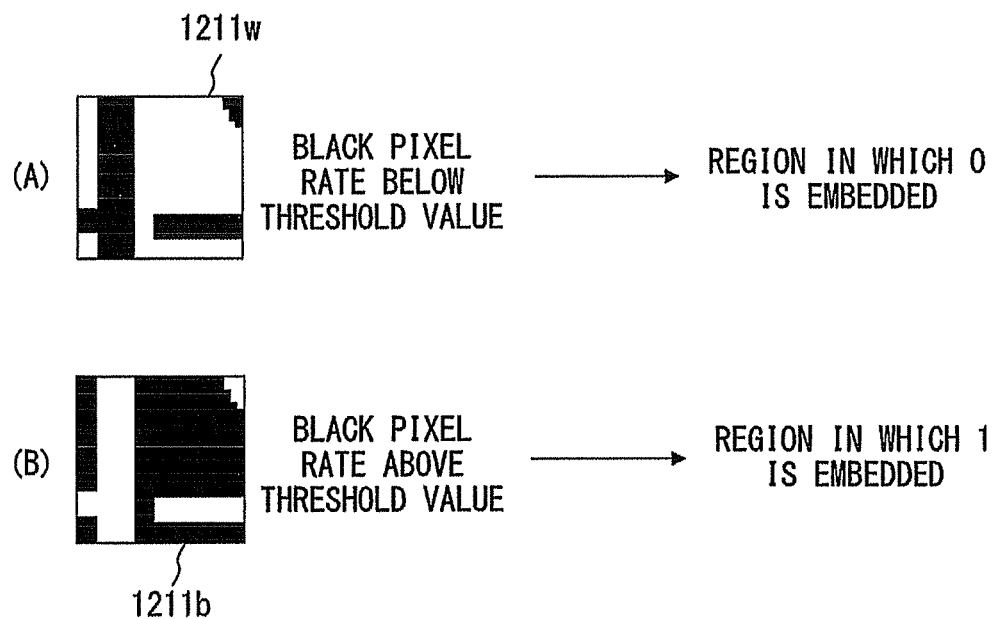
F I G. 7 5

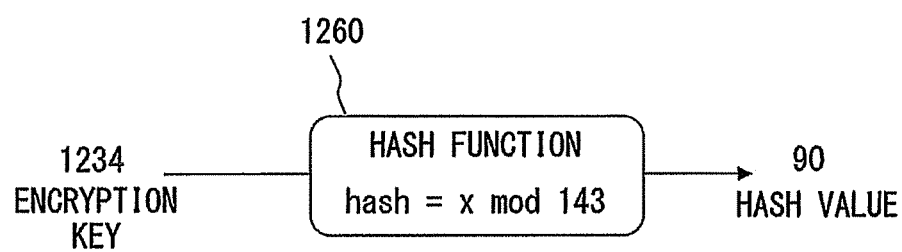
F I G. 7 8

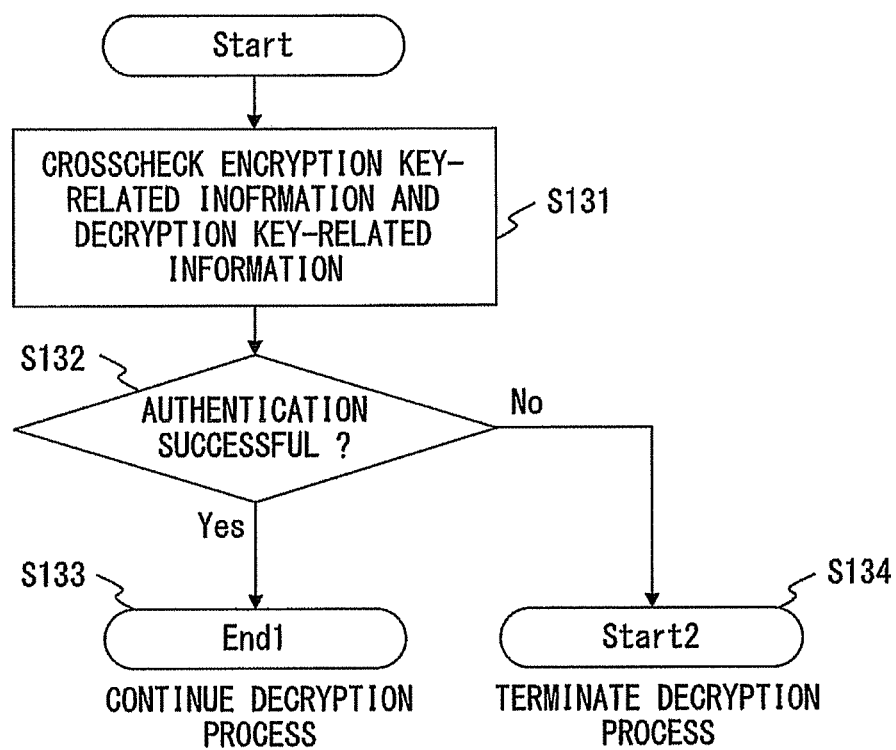
F I G. 7 9

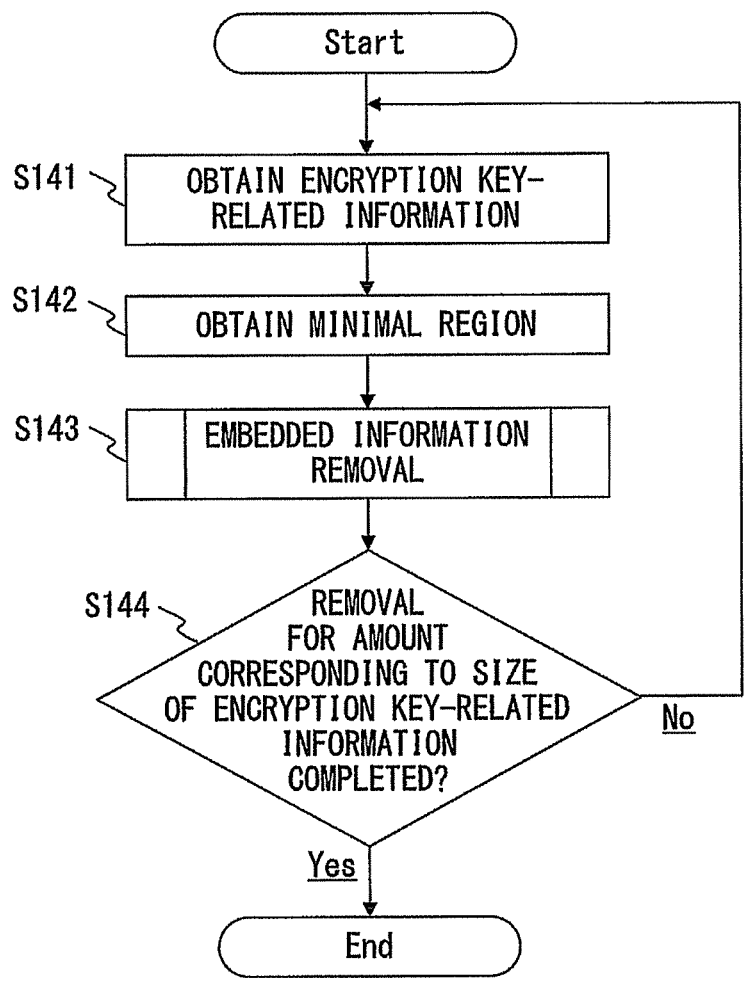
F I G. 80

(A) WHEN CANCELLING STATE IN WHICH "0" IS EMBEDDED
(B) WHEN CANCELLING STATE IN WHICH "1" IS EMBEDDED
F I G. 8 2

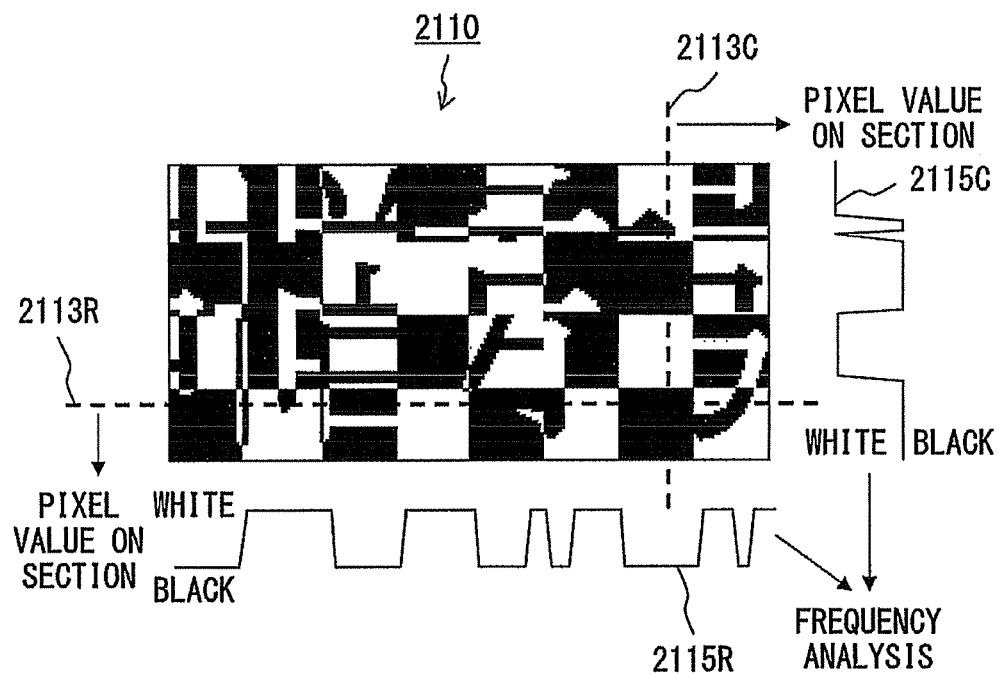
F I G. 9 0

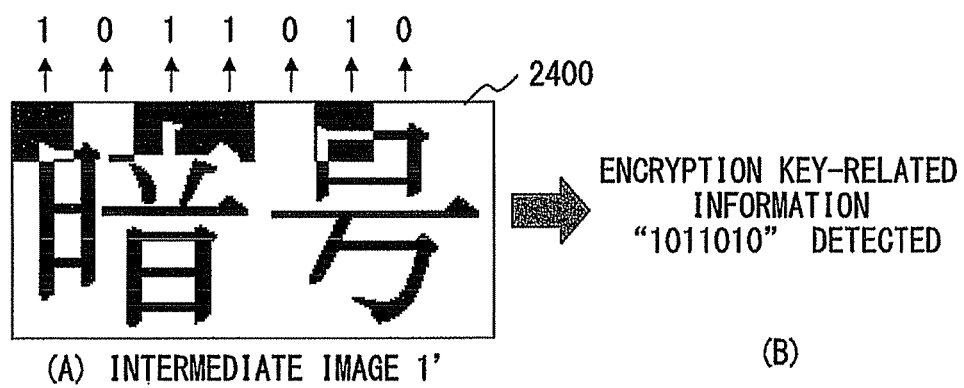
(A) INTERMEDIATE IMAGE 1'
(B) ENCRYPTION KEY-RELATED INFORMATION "1011010" DETECTED
F I G. 9 4

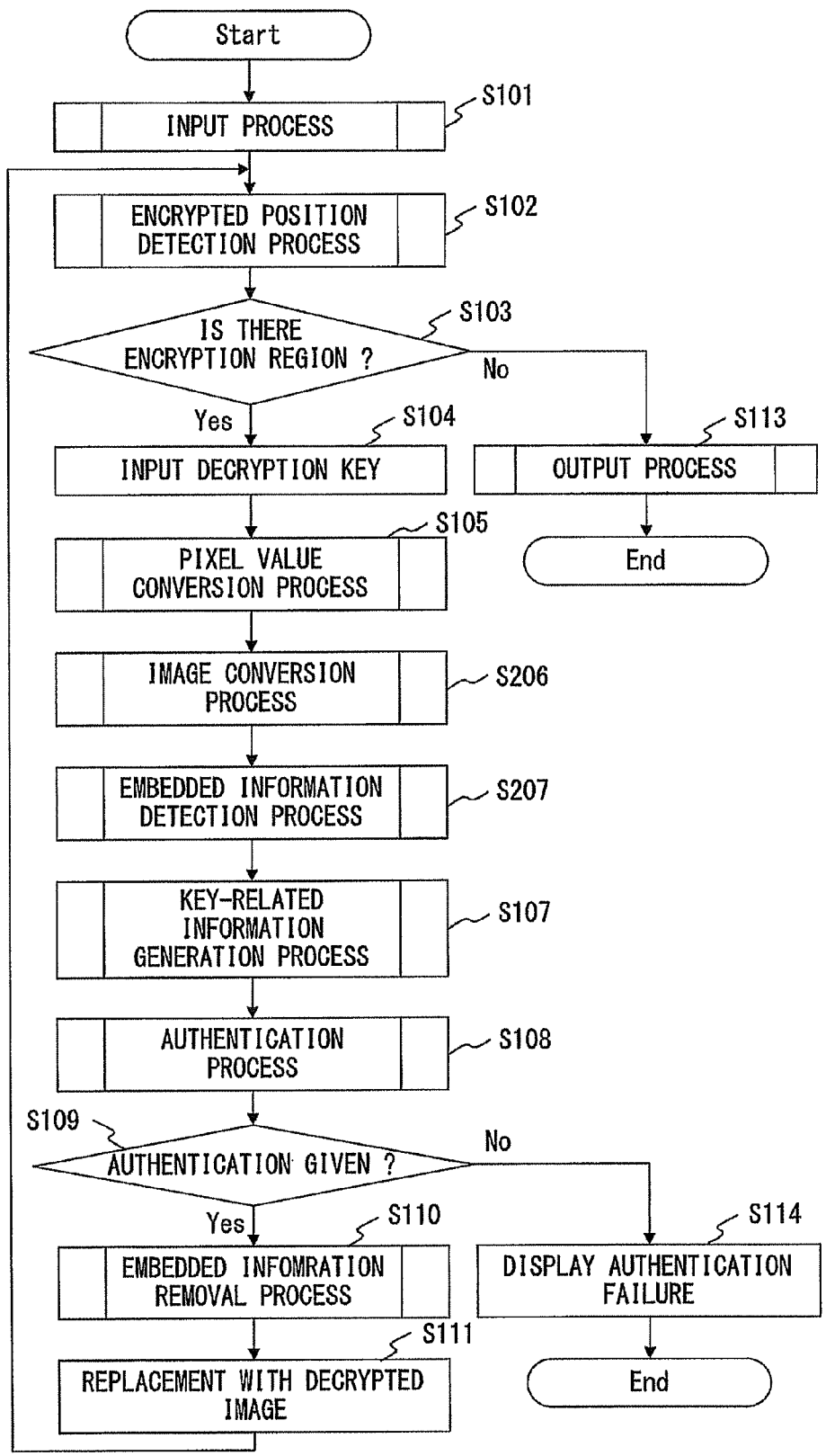
F I G. 97

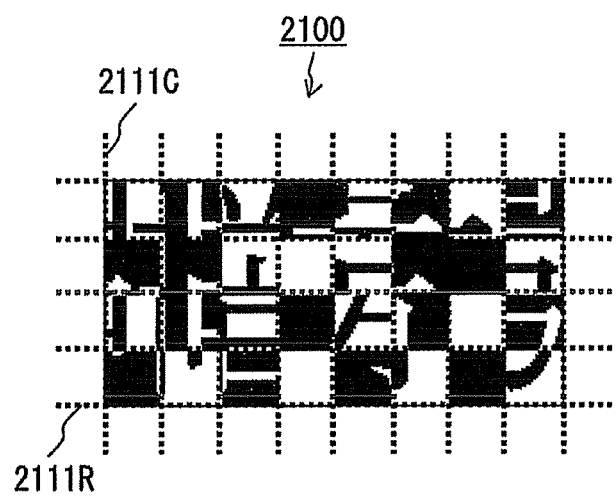
F I G. 9 8

(A) INTERMEDIATE IMAGE 2'  SCRAMBLE CANCEL  (B) INTERMEDIATE IMAGE 1'

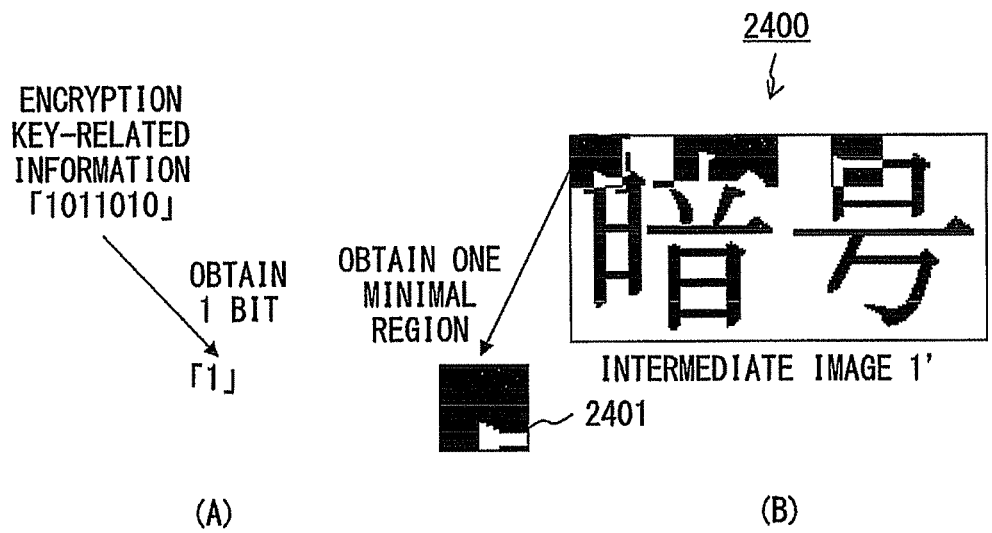
F I G. 1 0 6

(A) WHEN CANCELLING STATE IN WHICH "0" IS EMBEDDED
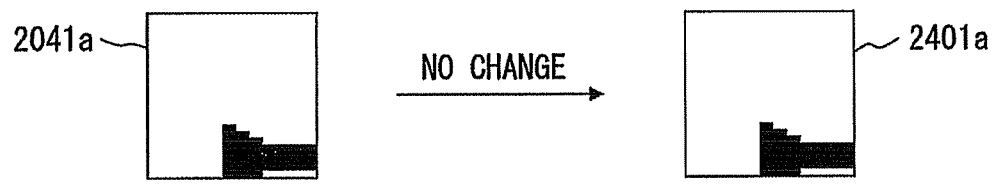
(B) WHEN CANCELLING STATE IN WHICH "1" IS EMBEDDED
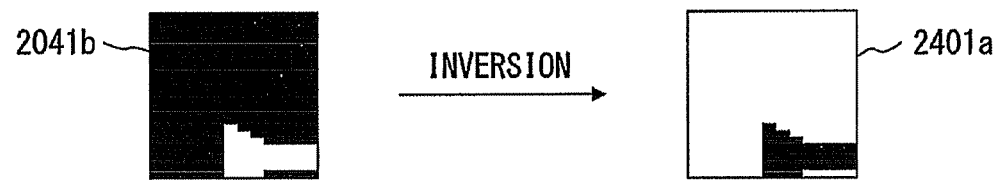
F I G. 1 0 7

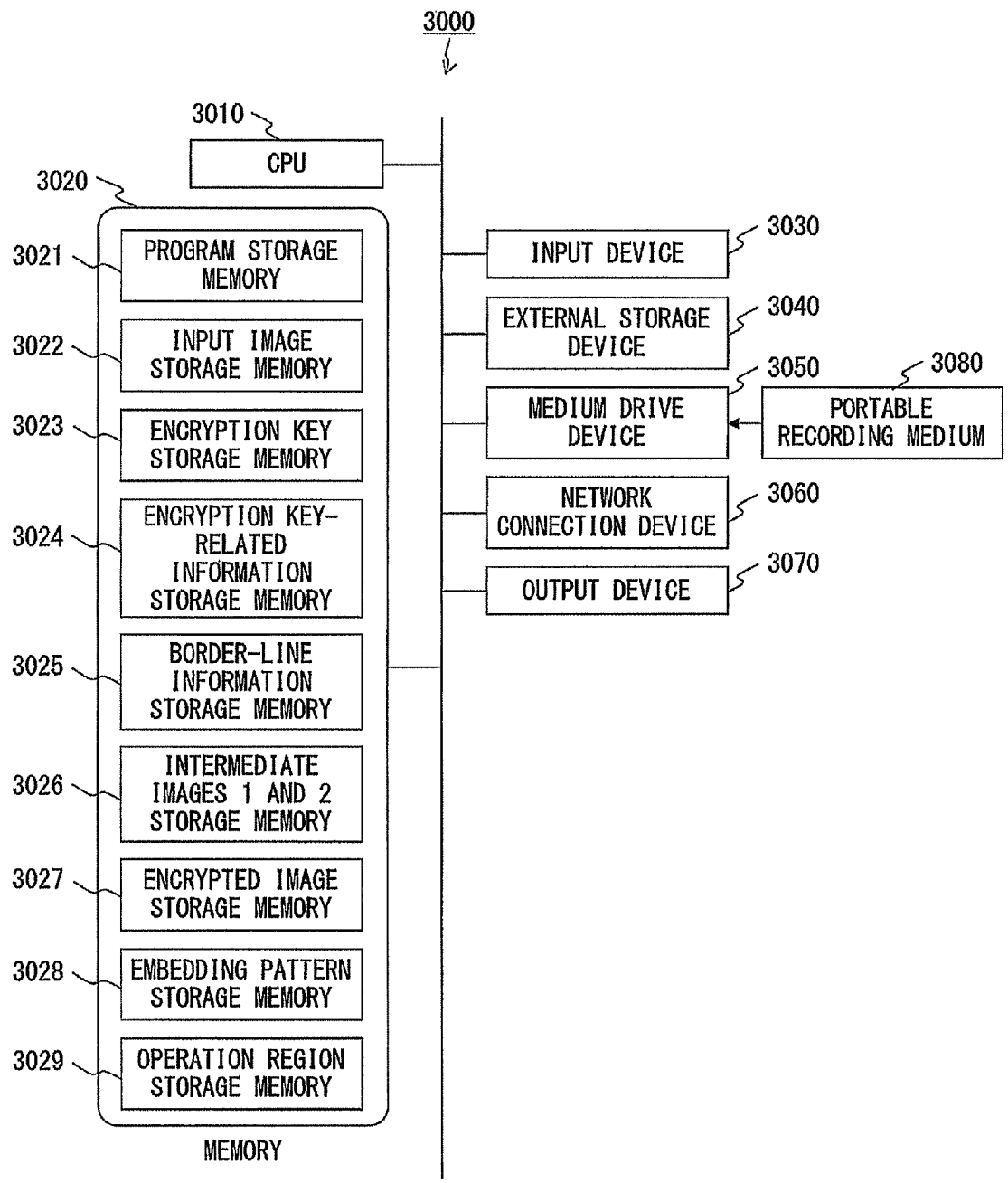
F I G. 109

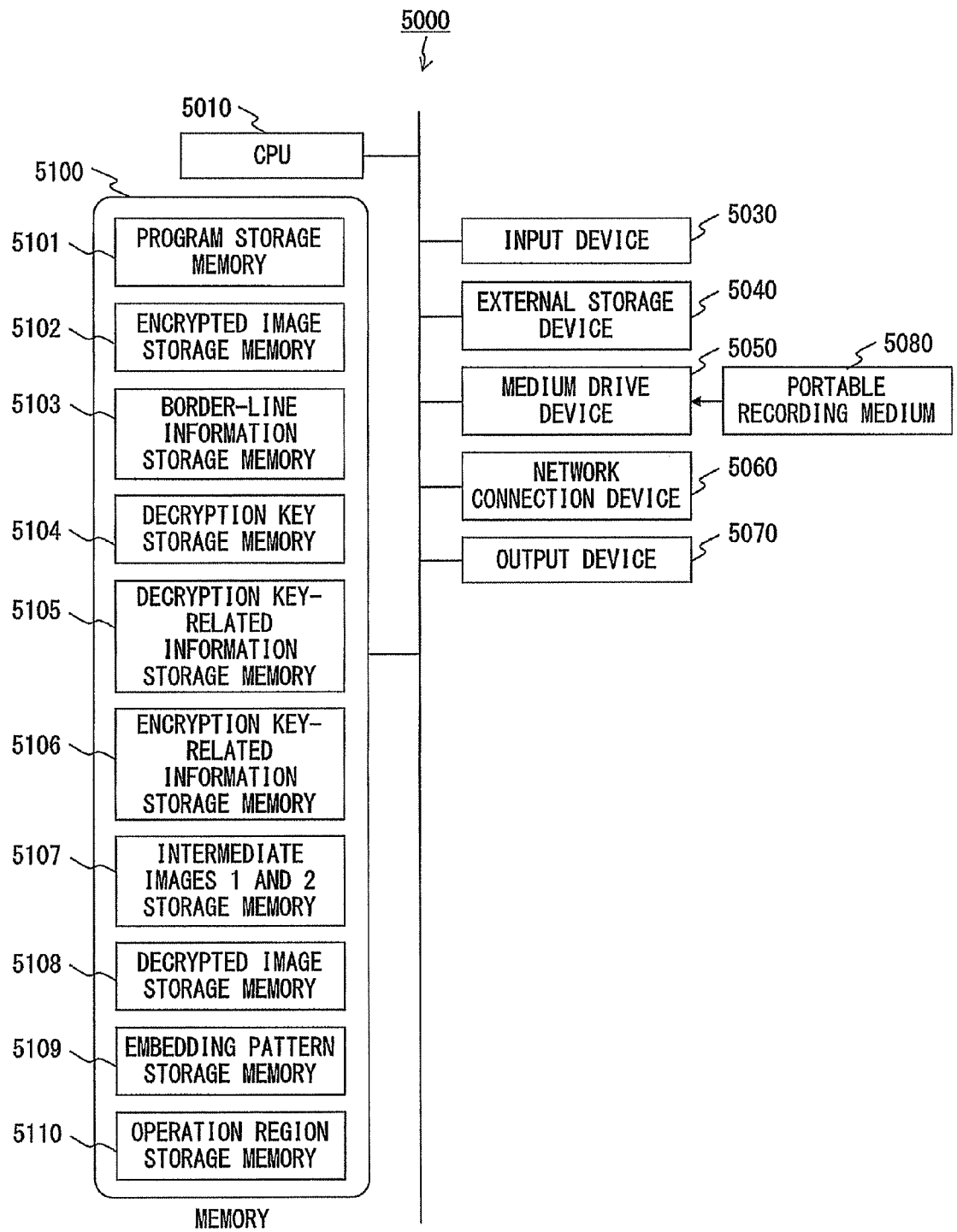
F I G. 1 1 2

IMAGE ENCRYPTION AND IMAGE DECRYPTION APPARATUS AND METHOD

CROSS-REFERENCE TO RELATED APPLICATIONS

This application is a continuation of PCT application PCT/JP2007/000583, which was filed on May 30, 2007, the entire contents of which are incorporated herein by reference.

FIELD

The present invention relates to image encryption and decryption techniques for visually encrypting important information such as personal information in a printed image, digital image and the like, to prevent the leakage of the important information to a third parties.

BACKGROUND

In the advancing information society, the leakage of confidential information has become a serious problem, and importance of techniques for preventing the information leakage is increasing. With regard to the information leakage prevention technique, a technique has been developed for encrypting, for example in digital data, the data so that if a third party obtains it, cannot find its contents. The encryption technique has already been used as effective means to prevent the information leakage of digital data.

On the other hand, the technique for preventing the information leakage of a printed matter printed on a paper medium and the like has not been established sufficiently yet, and there has been no example of practical application. Some statistics show that about half of information leakage occur with printed matters, so for printed matters, as well as digital data, there is an urgent need for the development of a technique for preventing information leakage. Specific examples of printed matters for which a measure to prevent information leakage is needed are, an invoice of purchase of goods, a bill of a credit card and the like, medical records in a hospital, record cards and name lists in a school, and so on.

According to PCT application JP/2007/000215 (hereinafter, referred to as patent document 1), not only a digital image, but also an image printed on paper can be encrypted to prevent information leakage. Meanwhile, medical records in a hospital and bills and the like can be defined as a type of visual information. Therefore, in the description of the present invention (in this description), they are collectively referred to as an "image".

The outline of the image encryption disclosed in patent document 1 is described.

In an input image 10 illustrated in FIG. 1(A), a part of it is specified as an encryption region 11, and an image processing is performed for the image in the encryption region 11 in accordance with a password (encryption key). As a result, an encrypted image 20 illustrated in FIG. 1(B) is generated. In the encrypted image 20, the image in the encryption region 11 described above has been converted into an image (converted image) in which the original contents cannot be recognized.

A restoration method of the encrypted image 20 is illustrated in FIG. 2.

When a correct password (decryption key) is input for the encrypted image illustrated in FIG. 2(A), the original image 10 is restored as illustrated in FIG. 2(B). However, when an incorrect password is input for the encrypted image 20, the converted image 21 is not decrypted to be the original image, and converted into a different image 31, as illustrated in FIG. 2(C). Thus, when an incorrect password is input for the encrypted image 20, the original image 10 is not restored.

However, in the case of the image encryption technique in patent document 1, there is a disadvantage as illustrated in FIG. 3.

That is, even when an incorrect password is input for the encrypted image 20 illustrated in FIG. 3(A), there is a possibility that the converted image 21 is coincidentally converted into an image 41 that is similar to the original image as illustrated in FIG. 3(B), and allowing the concealed contents to be inferred.

This is not preferable in terms of security. Therefore, there is a need for a mechanism with which, when an incorrect password is input, a converted image is not decoded.

Meanwhile, a conventional art related to the present invention, for example, Japanese Laid-open Patent Application 2006-332826 (hereinafter, referred to as patent document 2), is disclosed. In a method of patent document 2, when performing transmission/reception of a material by FAX, the transmitter selects a region in the material that needs to be confidential, and specifies an encryption password. By this, the set encryption password is overlapped with and printed on the cover sheet, and these materials are transmitted to the receiver side by using communication means such as FAX. At the receiver side, the password is extracted from the cover sheet of the received material, and when it matches the password input by the receiver, the text of the document is printed in a state in which the receiver can read it. In addition, according to patent document 2, the embedding of the password information into the cover sheet is to be done using an electronic watermark or a barcode.

However, the conventional arts such as the one described above have a problem as follows to be solved.

According to the method of patent document 2, password information is embedded into a document image using an electronic watermark or a barcode. However, since the electronic watermark is a system for embedding information by slightly changing pixel values so as not to lose the value of the image contents, it is susceptible to distortion caused with printing, copying and scanning, and there is a high possibility that it does not work at the time of authentication. In addition, a barcode provides an embedding method that is resistant to distortion, but it cannot be applied when there is no appropriate margin region besides the encryption region, and when there are a plurality of regions to be encrypted, barcodes needs to be printed additionally, the number of barcodes corresponding to the number of regions.

As illustrated in FIG. 4(A), when there are three encryption regions 51, 52, 53 in an original image 50, an individual password is given to the encryption regions 51-53 respectively. The encryption regions 51-53 are converted into images 61-63 on the basis of the passwords assigned respectively, generating an encrypted image 60 as illustrated in FIG. 4(B). At this time, three barcodes 66-68 representing the respective pieces of information about the three passwords above (password information) are embedded in the upper area of the encrypted image 60.

In the case of the method of patent document 2, the encryption region and barcode need to be linked, requiring elaboration for that. For this reason, there are problems in practicality, in terms of an increase in the toner cost due to the addition of the barcode, increase in the processing amount for associating the encryption area and the barcode, and so on.

Patent document 1: PCT/JP2007/000215

Patent document 2: Japanese Laid-open Patent application No. 2006-332826 in the Japan Patent Office Patent document 3: Japanese Patent Application No. 2006-266015 in the Japan Patent Office

SUMMARY

A first aspect of the image encryption apparatus of the present invention has input means obtaining input data, performing format conversion of the obtained input data into an image as needed, and inputting the image to be a target of encryption; encryption region specifying means specifying, with regard to an image obtained by the input means, a region to be encrypted; image conversion means converting an image in an encryption region specified by the encryption region specifying means into a first intermediate image on a basis of an encryption key; key-related information generation means generating encryption key-related information on a basis of the encryption key; information embedding means embedding the encryption key-related information into the first intermediate image to generate a second intermediate image; pixel value conversion means performing pixel value conversion for the second intermediate image so that a position of the encryption region can be specified at a time of decryption; and output means outputting an image generated in the pixel value conversion means while performing format conversion of the image as needed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 illustrates an example of a method with which key-related information generation means generates encryption key-related information.

FIG. 13 is a diagram illustrating examples of patterns of a part of which pixel values are to be changed in an embedding region.

FIG. 16 is a method illustrating examples of other patterns for embedding into intermediate image.

The image conversion process is explained with reference to FIG. 26 and FIG. 27.

Figure 27:
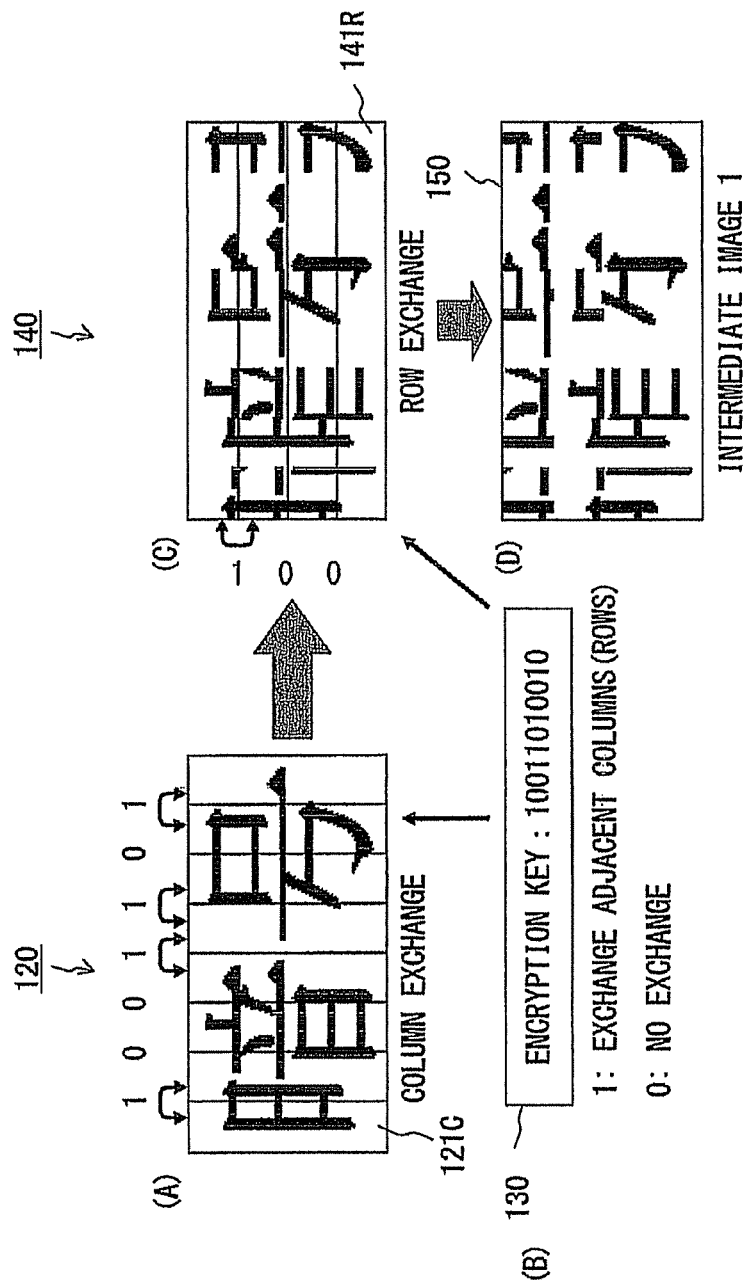

FIG. 27 is a diagram (part 2) illustrating an image conversion process by image conversion means.

Figure 28:
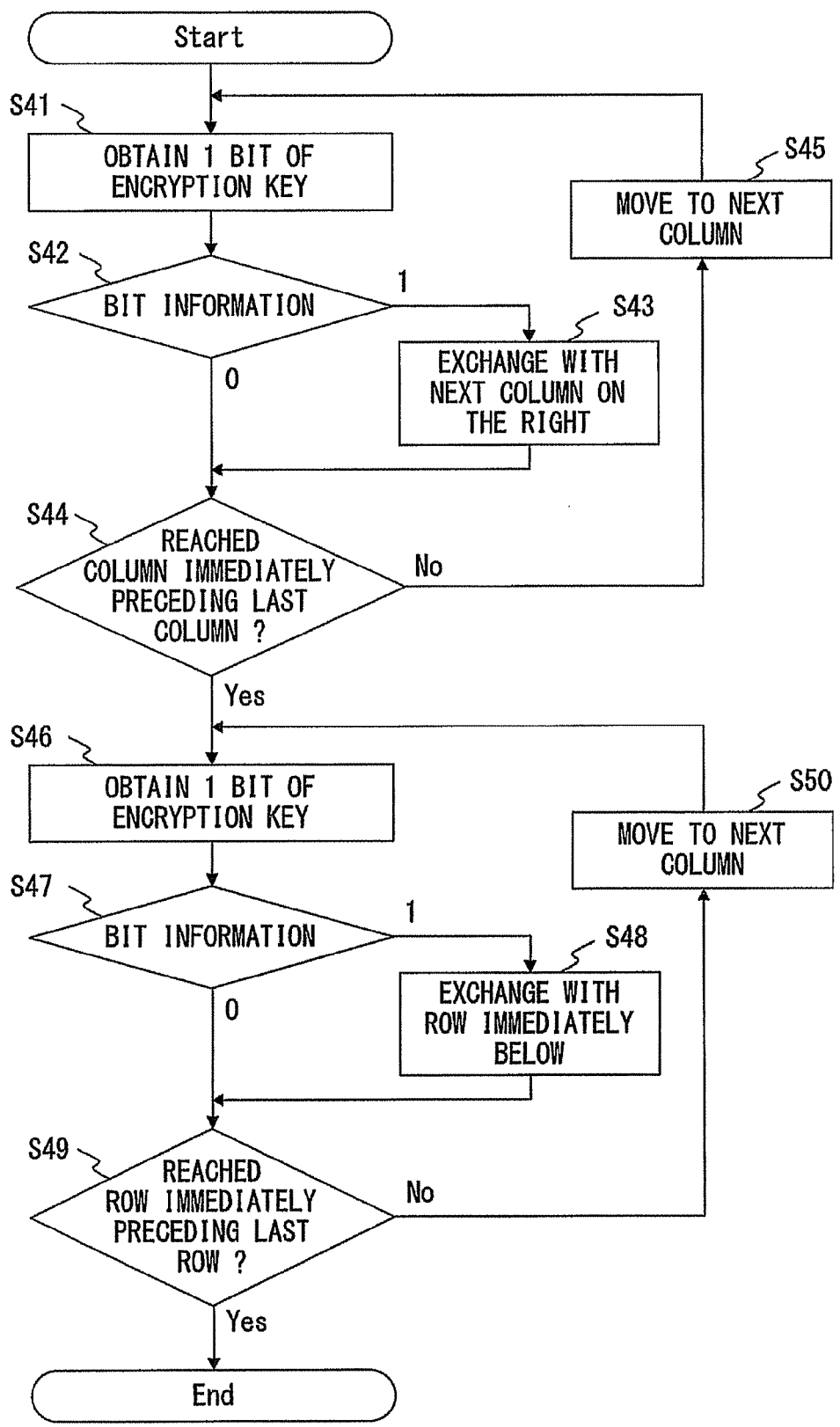

FIG. 28 is a flowchart illustrating details of the image conversion process.

Figure 29:
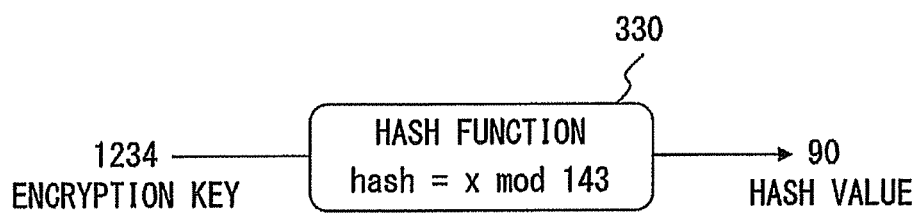

FIG. 29 is a diagram illustrating a method of converting decimal values of an encryption key into encryption key-related information using a hash function.

Figure 30:
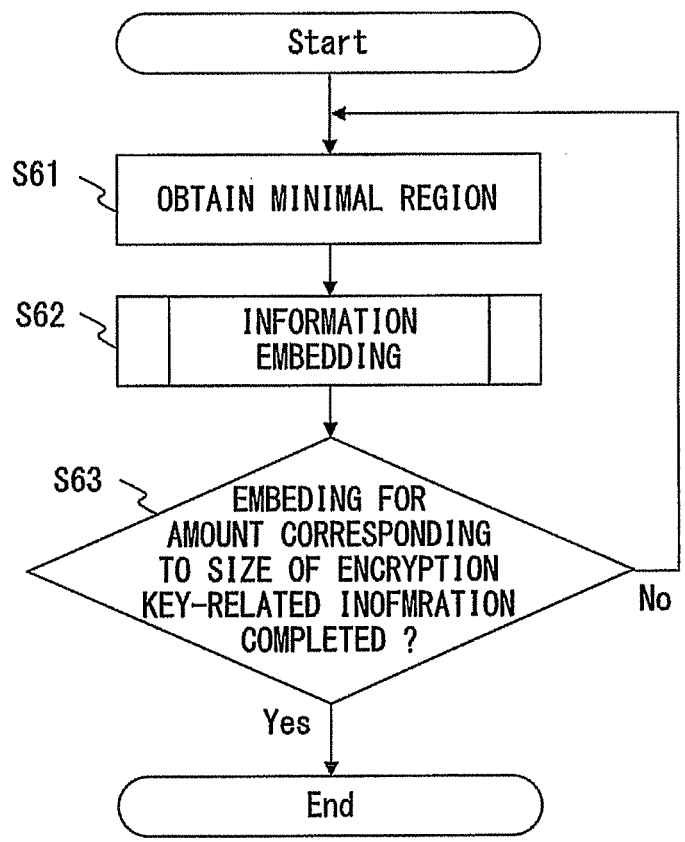

FIG. 30 is a diagram illustrating details of an information embedding process.

Figure 31:
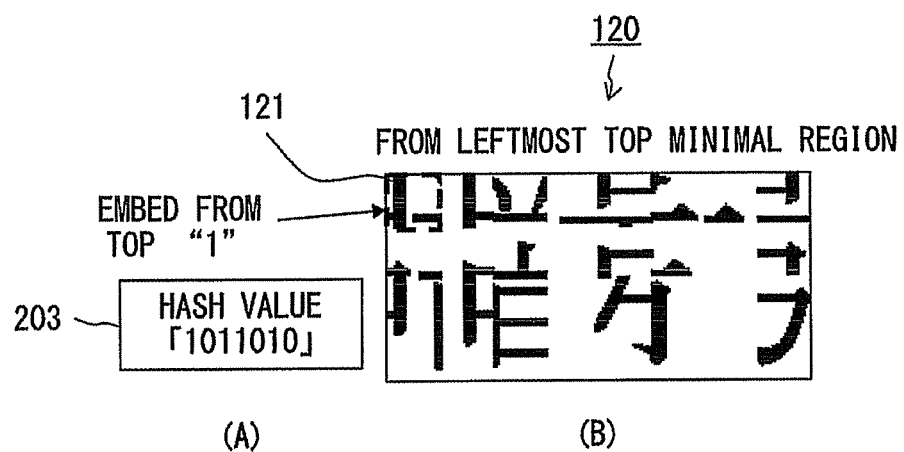

FIG. 31 is a diagram illustrating an example of embedding information into a minimal region bit by bit.

FIG. 32 is a diagram illustrating a method of embedding encryption key-related information into each minimal region of an encryption region.

Figure 33:
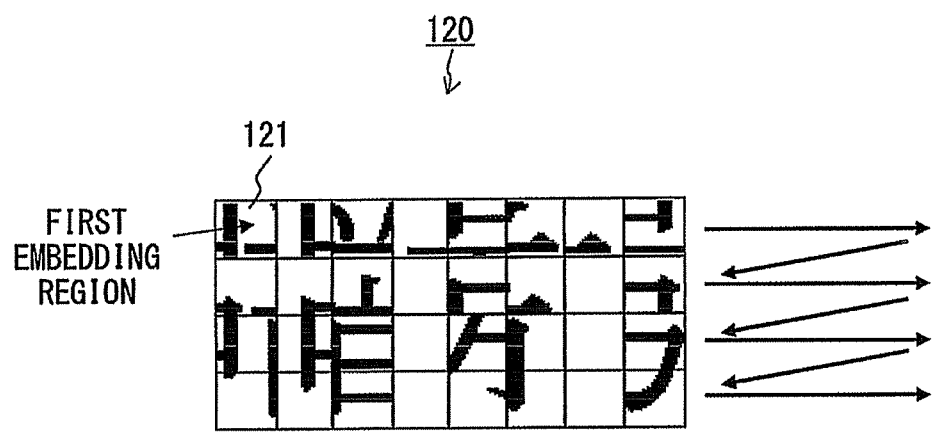

FIG. 33 is a diagram illustrating an order in which information embedding means obtains minimal regions of an encryption region.

Figure 34:
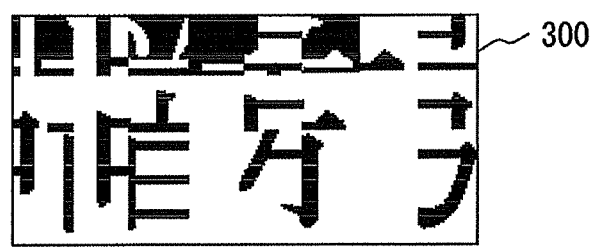

FIG. 34 is a diagram illustrating intermediate image obtained as a result of embedding encryption key-related information into the intermediate image 1 in FIG. 27.

FIG. 35 is a flowchart illustrating details of a pixel value conversion process.

Figure 36:
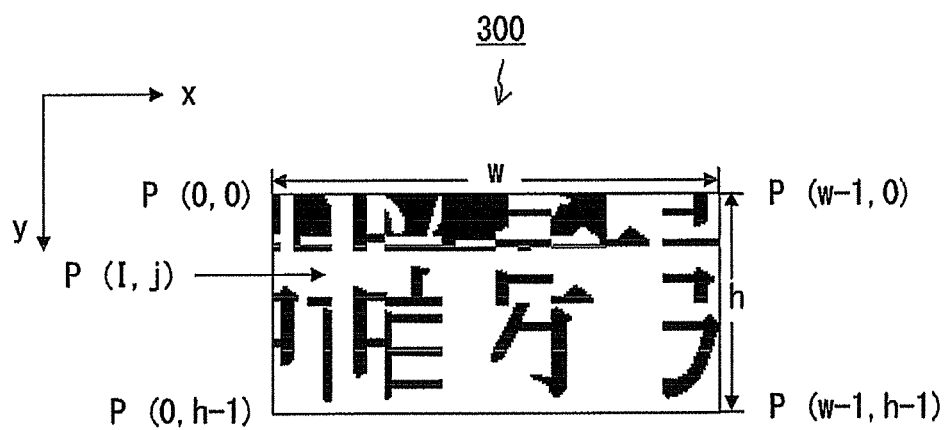

FIG. 36 is a flowchart illustrating the definition of variables used in the flowchart in FIG. 35.

FIG. 37 is a diagram illustrating an encrypted image that pixel value conversion means generated by converting pixel values of an intermediate image.

Figure 38:
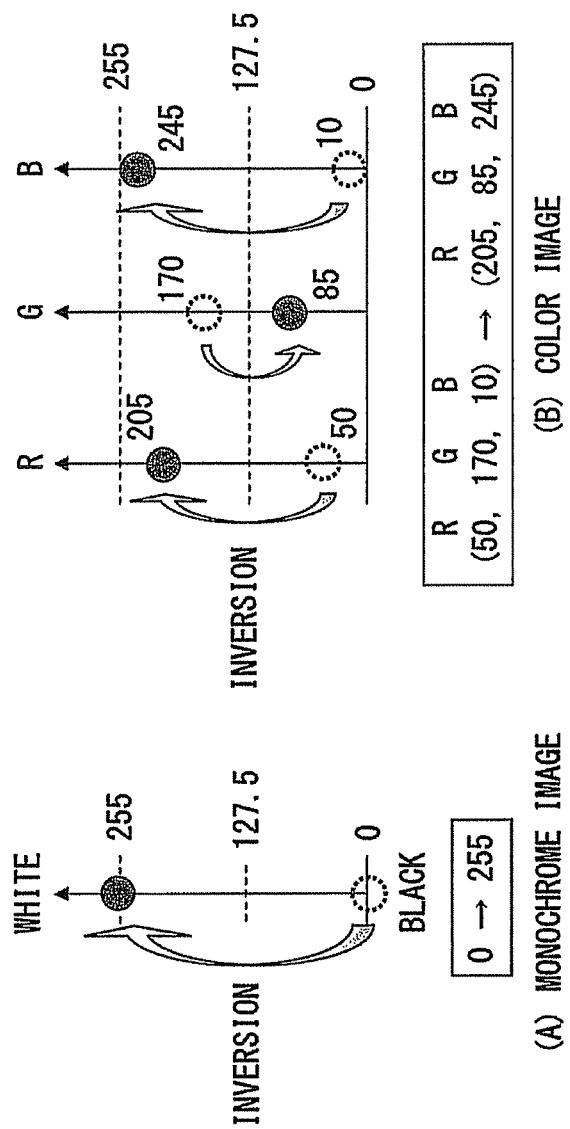

FIG. 38 is a diagram illustrating an example of an inversion method for a color image.

Figure 39:
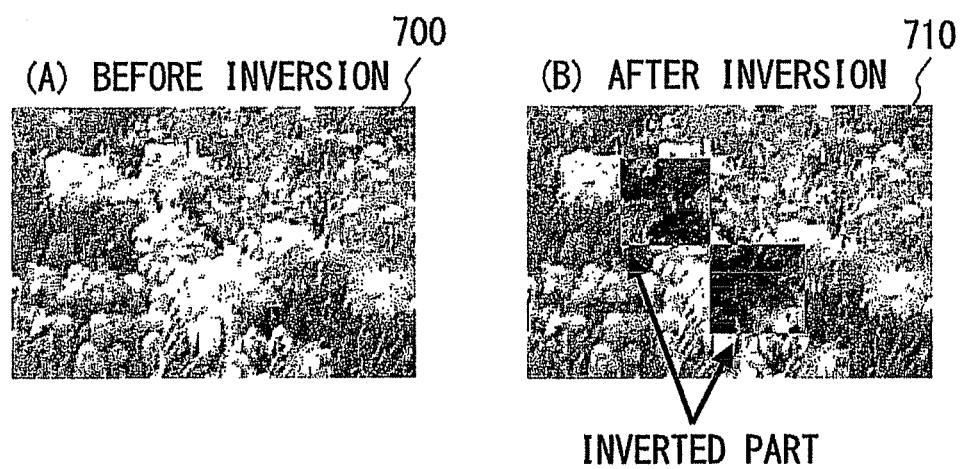

FIG. 39 is a diagram illustrating an example of inversion of a color image.

Figure 40:
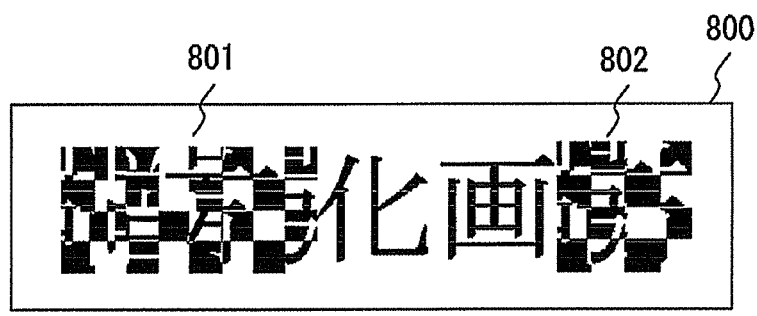

FIG. 40 is a diagram illustrating an example of encrypting a plurality of regions in an input image.

Figure 41:
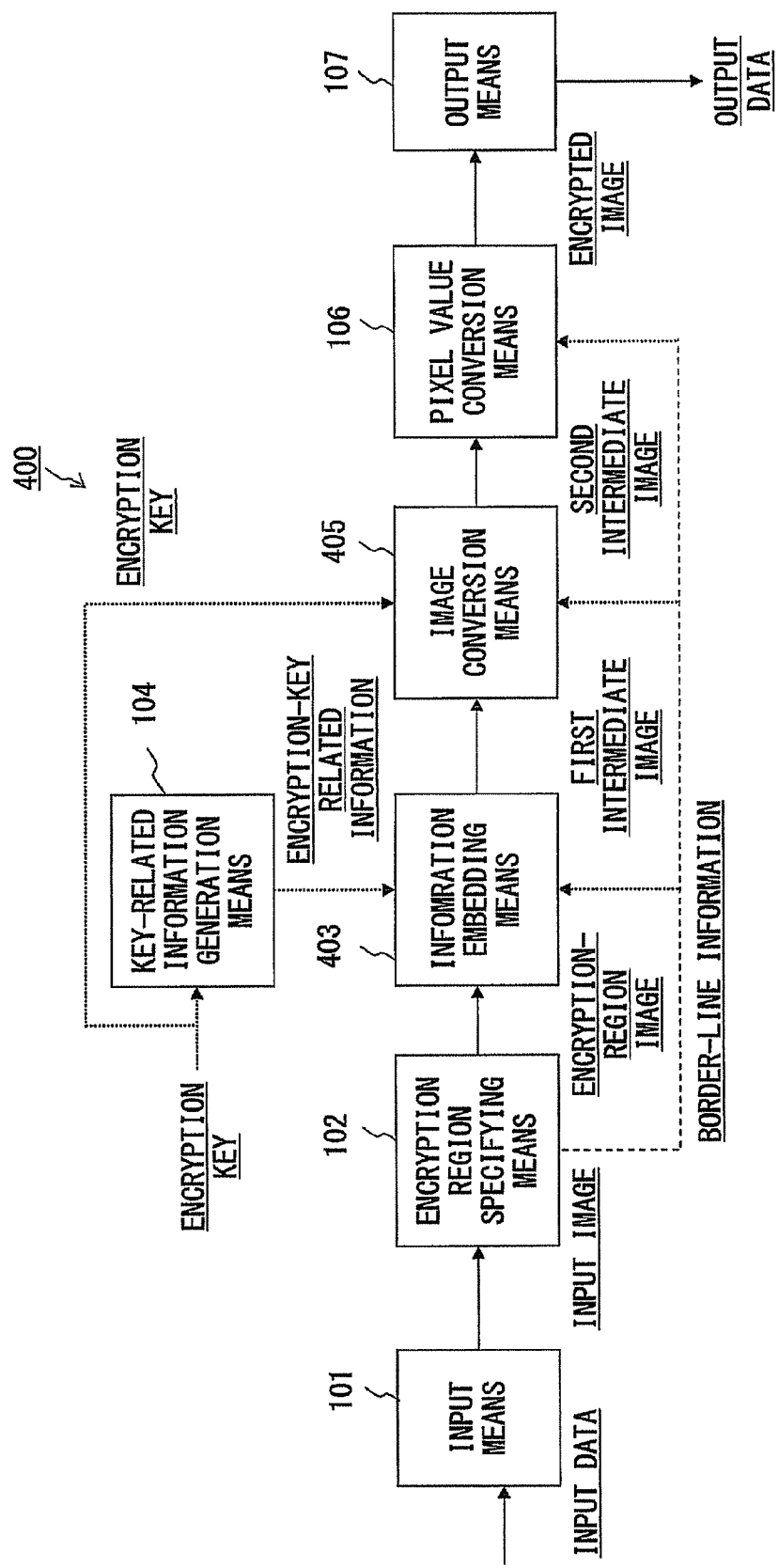

FIG. 41 is a diagram illustrating a second embodiment of the image encryption apparatus of the present invention.

FIG. 42 is a diagram illustrating an input image generated by input means.

Figure 43:
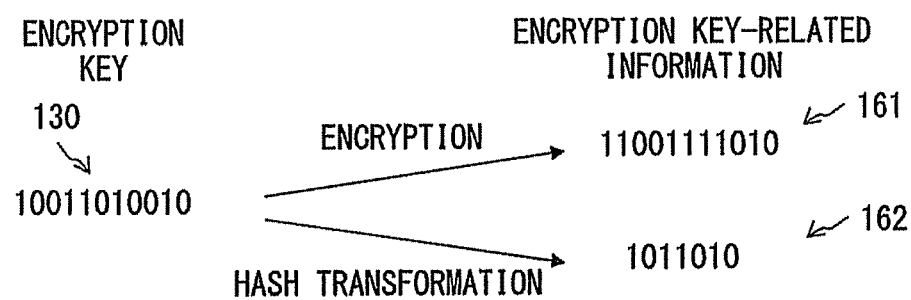

FIG. 43 is a diagram illustrating a method of generating encryption key-related information by performing a hash transformation of an encryption key.

Figure 44:
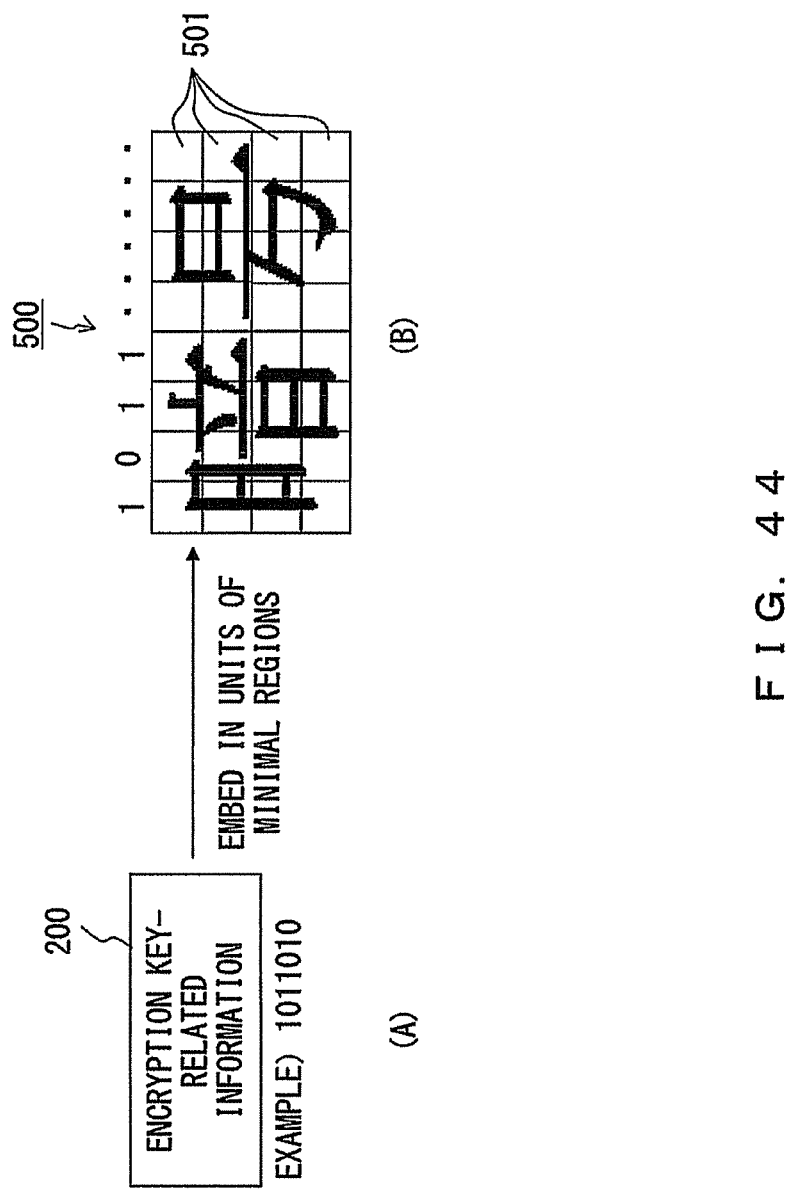

FIG. 44 is a diagram illustrating encryption key-related information into a minimal region of an encryption region by the first embedding method.

FIG. 45 is a diagram illustrating intermediate image 1 generated by information embedding means.

Figure 46:
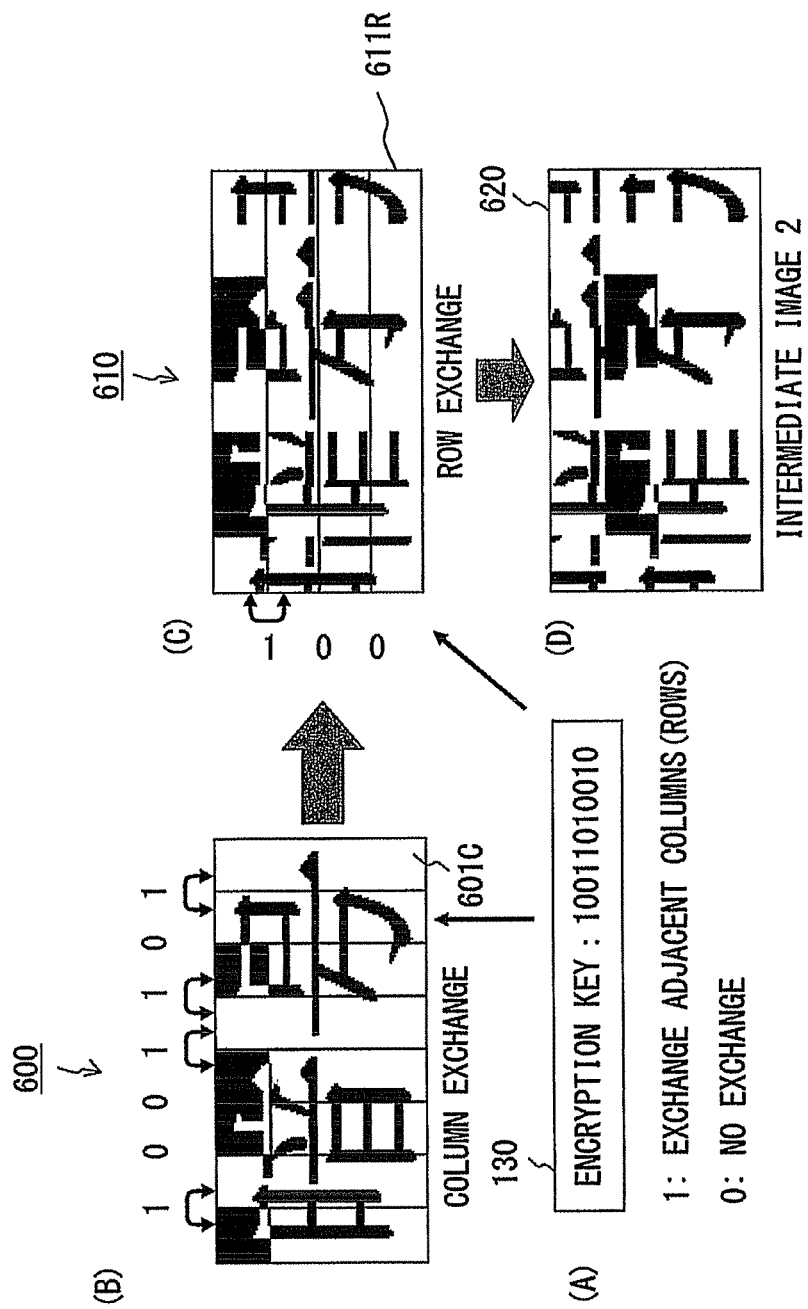

FIG. 46 is a diagram illustrating a method with which image conversion means generates intermediate image 2 on the basis of an encryption key.

Figure 47:
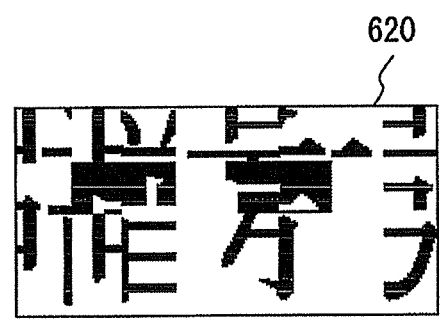

FIG. 47 is a diagram illustrating intermediate image generated by image conversion means.

FIG. 48 is a diagram illustrating a method with which pixel value conversion means converts intermediate image into a pixel value converted image.

Figure 49:
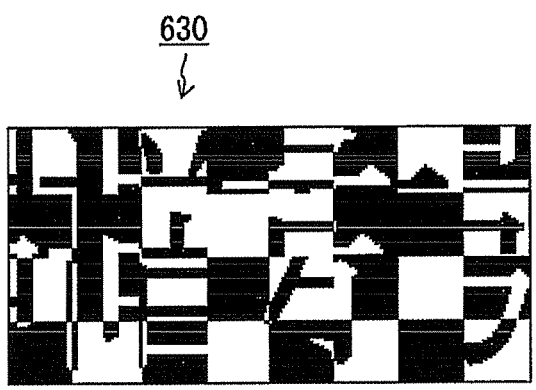

FIG. 49 is a diagram illustrating an encrypted image generated finally by the second embodiment of the image encryption apparatus of the present invention.

FIG. 50 is a flowchart illustrating the entire process in the second embodiment of the image encryption apparatus of the present invention.

Figure 51:
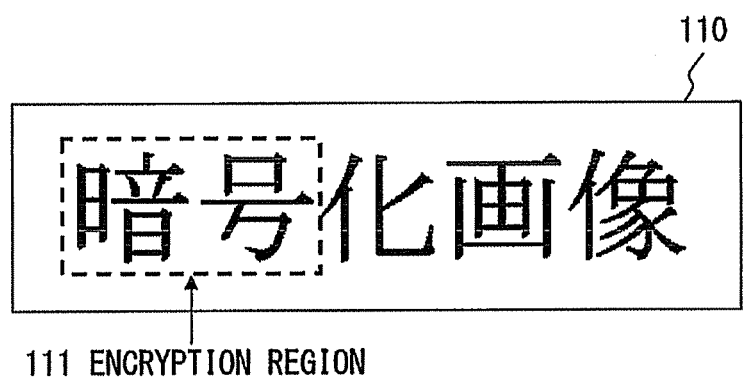

FIG. 51 is a diagram illustrating an example of input image to be encrypted.

FIG. 52 is a diagram illustrating a result of the division of the input image into a plurality of minimal regions.

Figure 53:
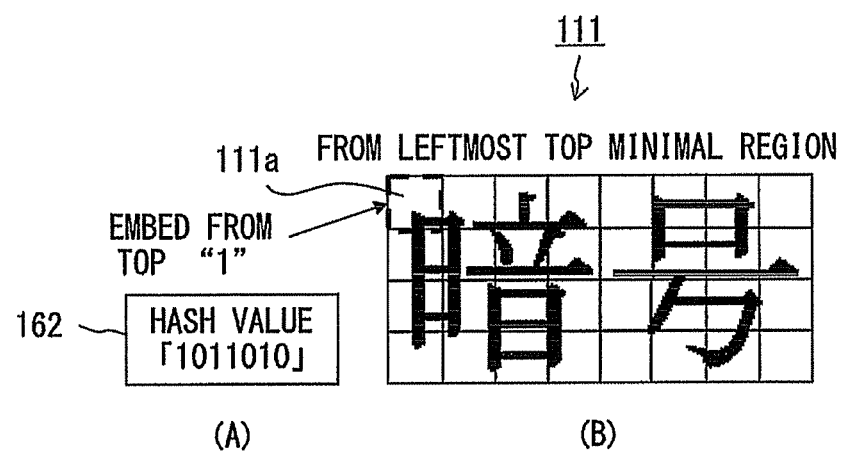

FIG. 53 is a diagram illustrating a method with which information embedding means embeds image encryption key-related information into an encryption region.

FIG. 54 is a diagram illustrating an example of embedding the bits of a hash value into a minimal region of an encryption region.

Figure 55:
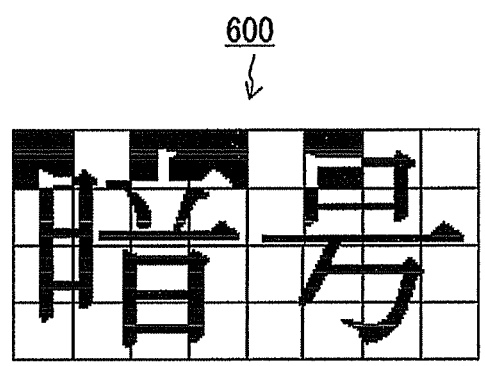

FIG. 55 is a diagram illustrating intermediate image 1 generated by information embedding means by embedding a hash value into regions of an encryption region.

Figure 56:
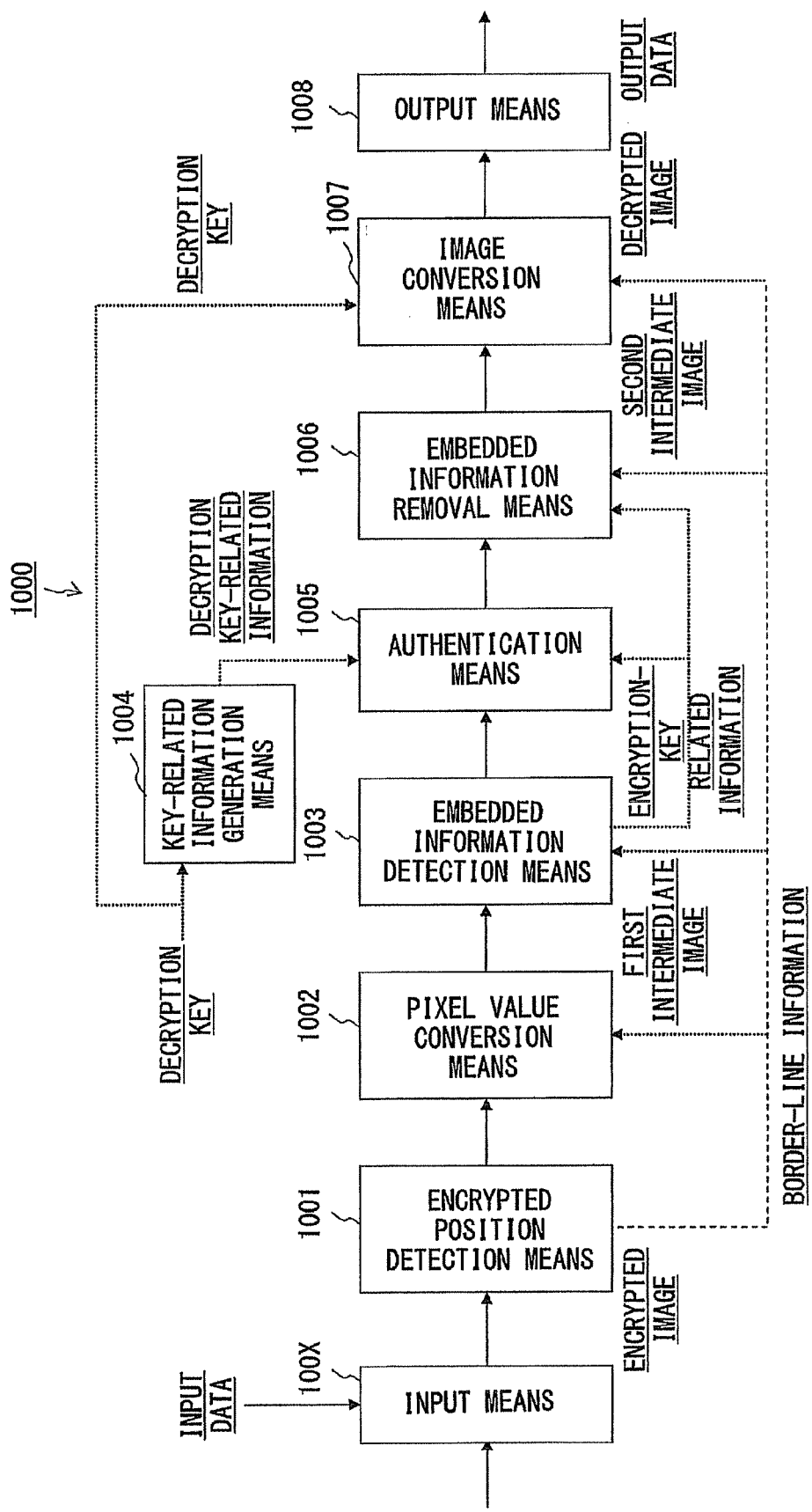

FIG. 56 is a diagram illustrating a first embodiment of an image decryption apparatus of the present invention.

FIG. 57 is a diagram illustrating an encrypted image input to the image decryption apparatus in FIG. 56.

FIG. 58 is a diagram illustrating a method with which encrypted position detection means of the image decryption apparatus detects borderlines in an encryption region.

FIG. 59 is a diagram illustrating a method with which pixel value conversion means of the image decryption apparatus cancel pixel value conversion (conversion to a checkerboard pattern) performed for an encrypted image.

Figure 60:
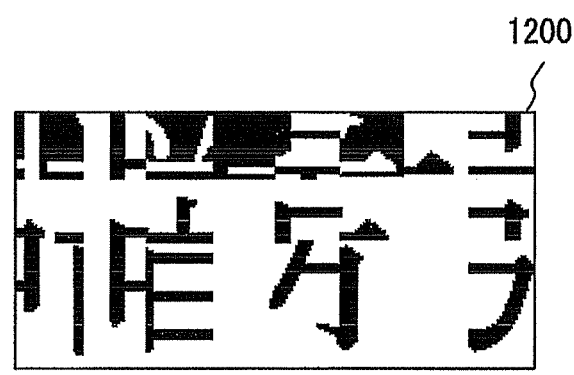

FIG. 60 is a diagram illustrating intermediate image restored by pixel value conversion means of the image decryption apparatus.

FIG. 61 is a diagram illustrating a method of detecting encryption key-related information embedded by the first embedding method.

Figure 62:
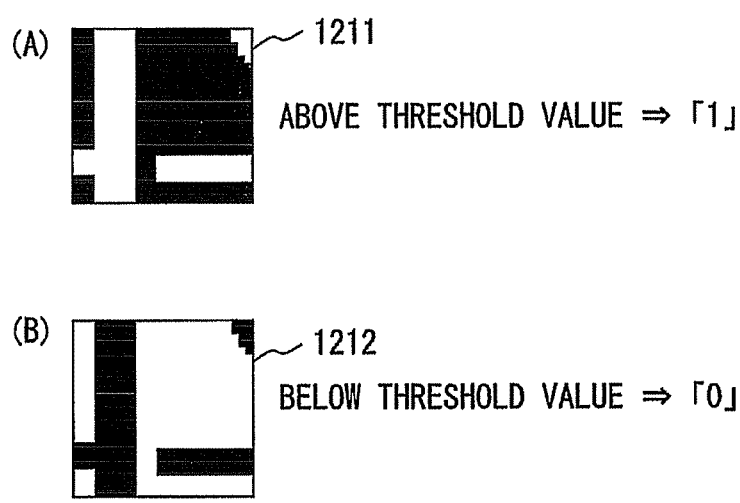

FIG. 62 is a diagram illustrating a method of detecting encryption key-related information embedded by the second embedding method.

Figure 63:
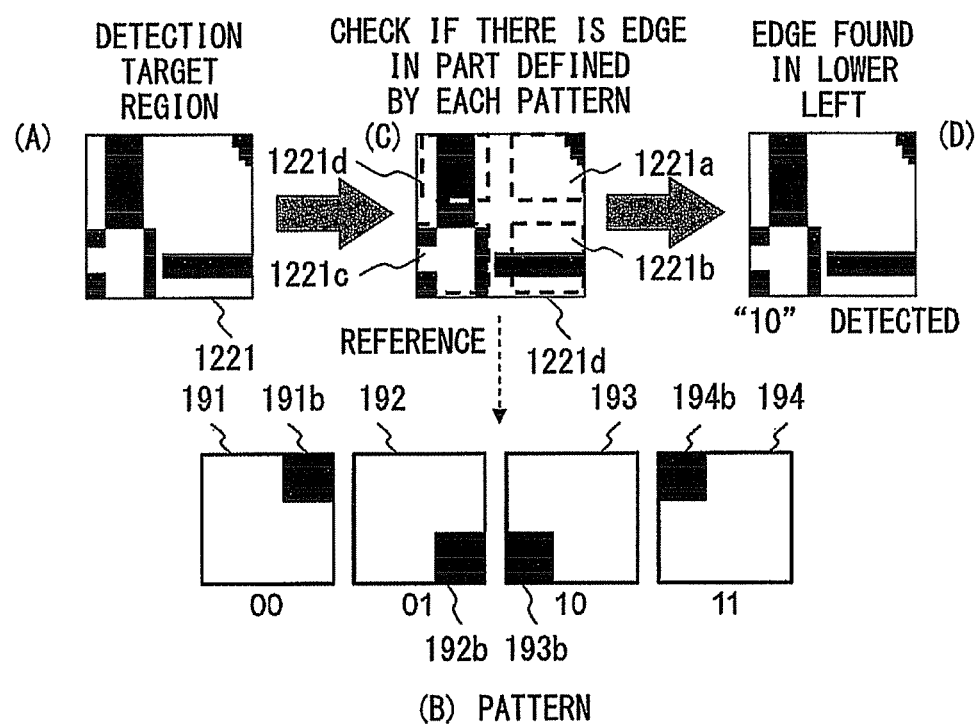

FIG. 63 is a diagram illustrating a method of detecting encryption key-related information embedded by the third embedding method.

Figure 64:
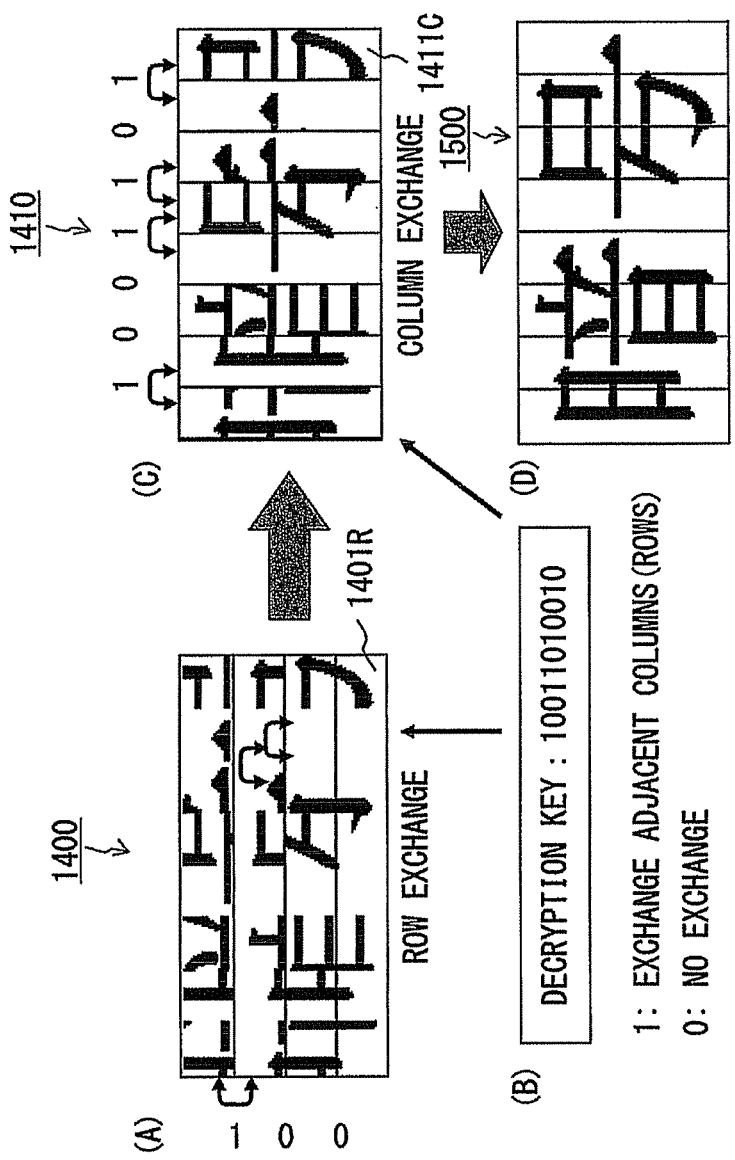

FIG. 64 is a diagram illustrating a method with which image conversion means of the image decryption apparatus restores an original image from an intermediate image.

Figure 65:

FIG. 65 is a diagram illustrating an original image (raw image) restored by image conversion means.

Figure 66:
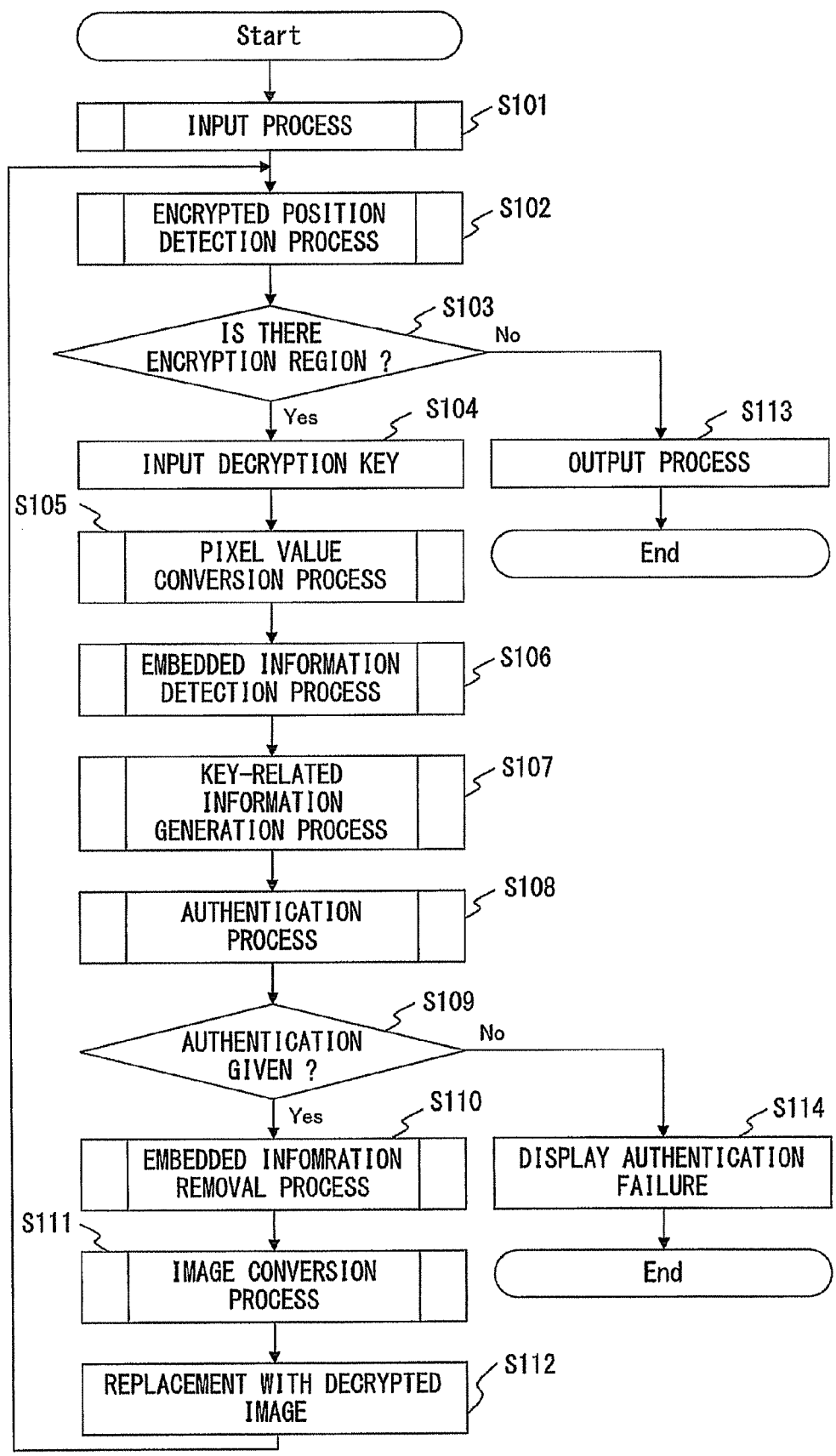

FIG. 66 is a diagram illustrating the entire process in the first embodiment of the image decryption apparatus of the present invention.

Figure 67:
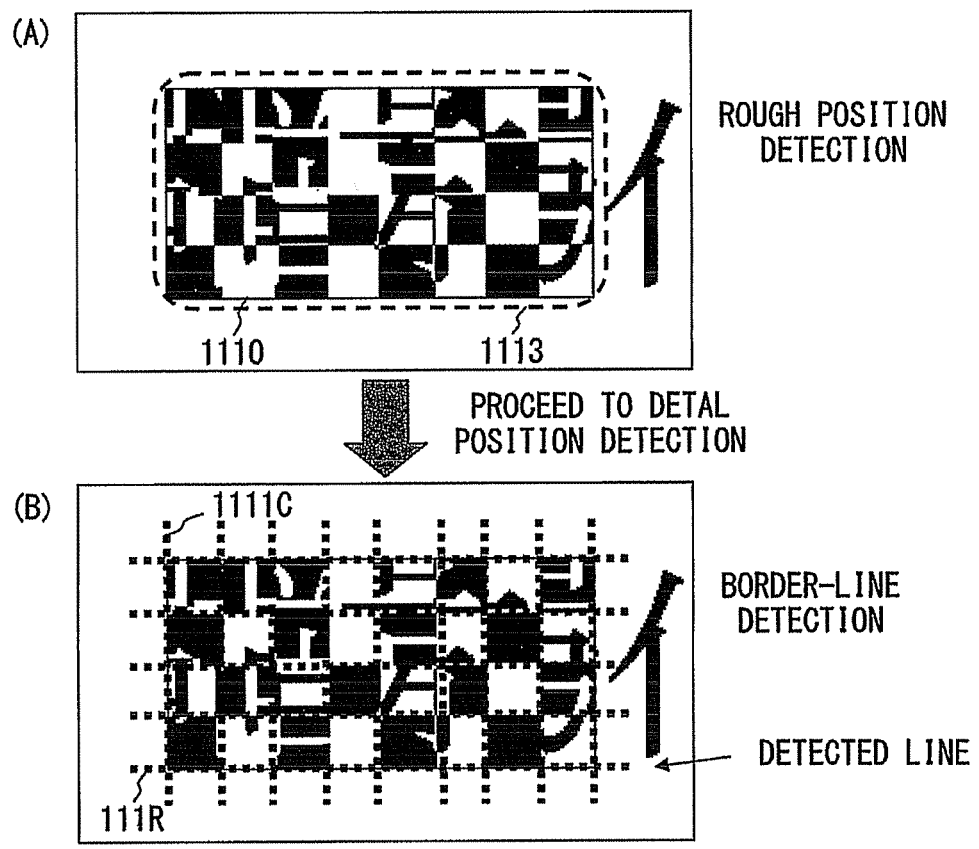

FIG. 67 is a diagram illustrating the outline of an encrypted region detection process.

FIG. 68 is a diagram illustrating a method of rough position detection of an encryption region.

FIG. 69 is a diagram illustrating a reason why it is impossible to find where in an encryption region borderlines obtained by frequency analysis are positioned.

FIG. 70 is a diagram illustrating a method of obtaining absolute positions of borderlines.

FIG. 71 is a diagram illustrating a state in which borderlines of the image in an encryption region are obtained using the method illustrated in FIG. 70 in a case when scrambling and the like has been performed in the image encryption apparatus.

FIG. 72 is a diagram illustrating a pixel value conversion process that pixel value conversion means performs.

Figure 73:
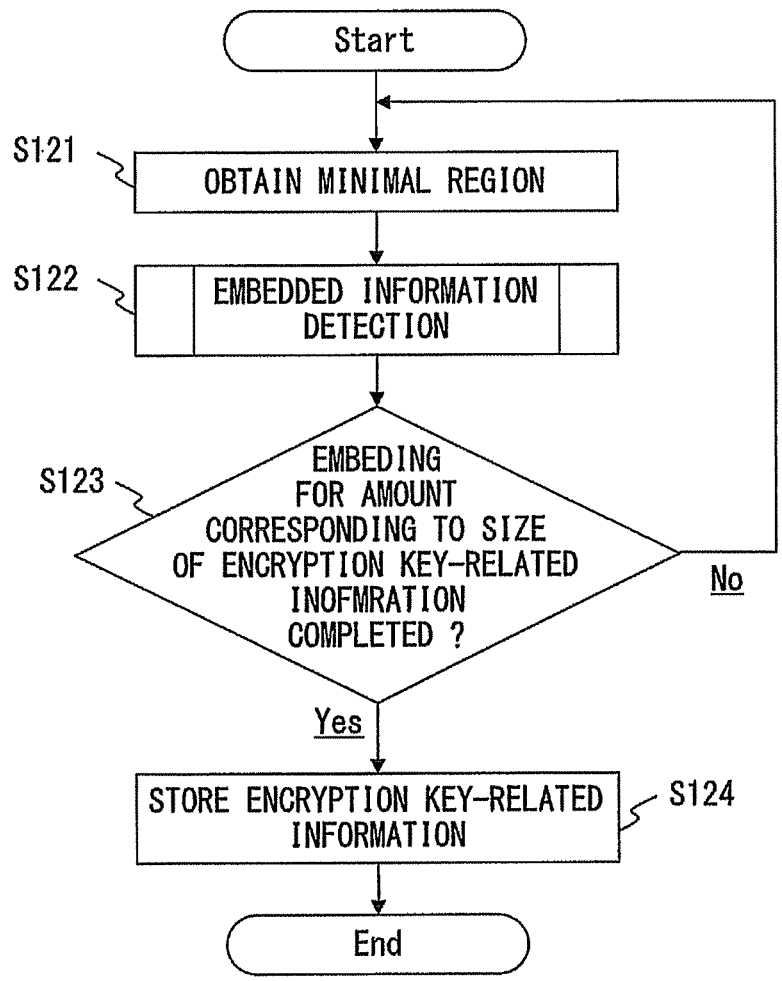

FIG. 73 is a flowchart illustrating details of key-related information detection process that embedded information detection means performs.

Figure 74:
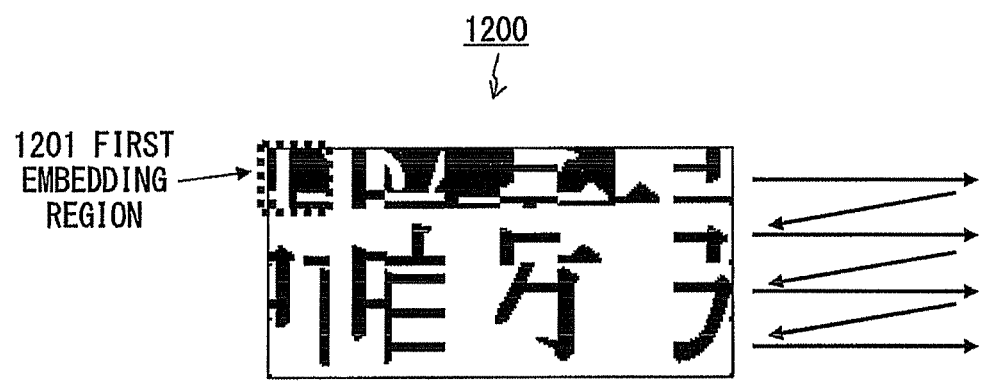

FIG. 74 is a diagram illustrating an order of obtaining minimal regions in an image (intermediate image 2') in an encryption region in step S121 in the flowchart in FIG. 73.

FIG. 75 is a diagram illustrating an example of a specific detection method of detecting embedded information from a minimal region.

Figure 76:
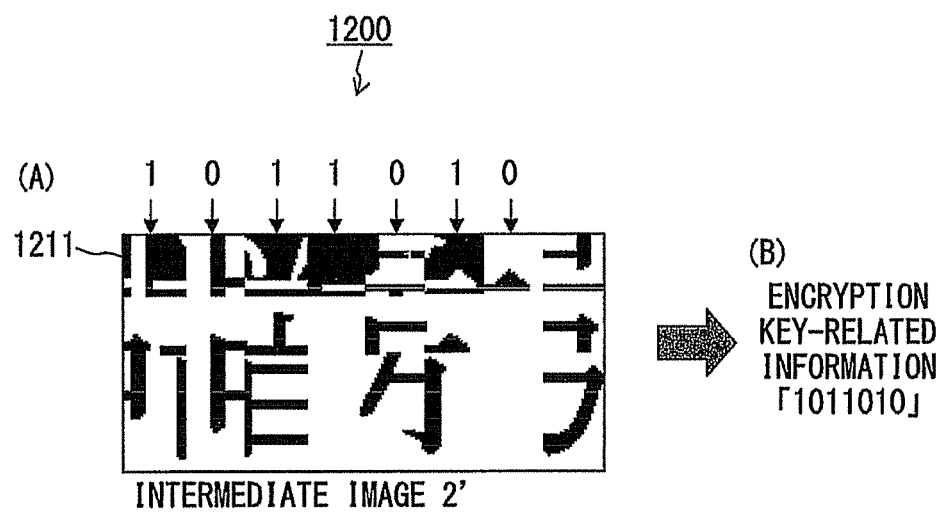

FIG. 76 is a diagram illustrating a method of detecting encryption key-related information from intermediate image 2' by an embedded information detection process.

Figure 77:
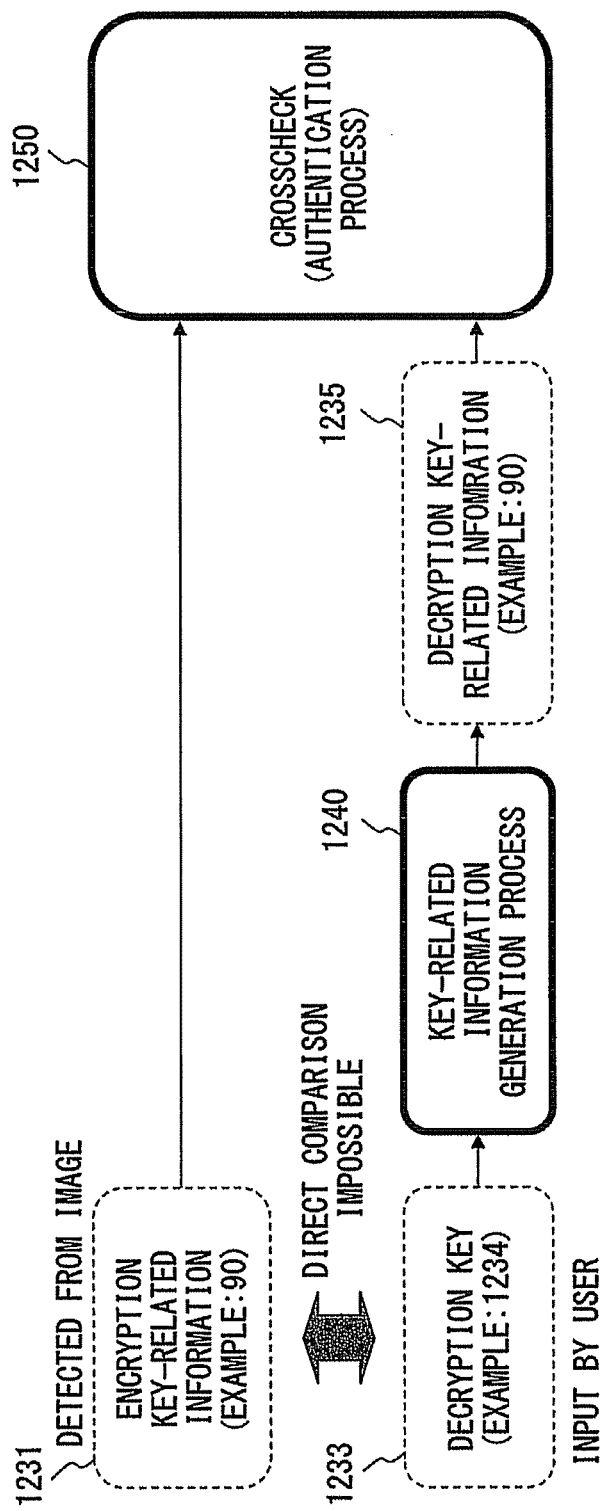

FIG. 77 is a diagram illustrating the position of decryption user authentication at the time when the embedded information detection process is completed.

FIG. 78 is a diagram illustrating an example of a key-related information generation method.

FIG. 79 is a flowchart illustrating details of an authentication process that authentication means performs.

FIG. 80 is a flowchart illustrating details of an embedded information removal process.

Figure 81:
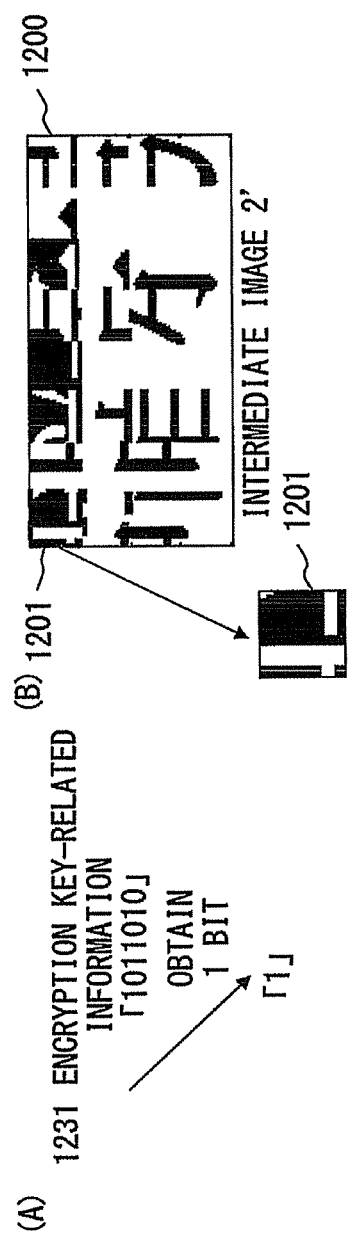

FIG. 81 is a diagram specifically illustrating the embedded information removal process.

FIG. 82 is a diagram illustrating a removal method of embedded information.

Figure 83:
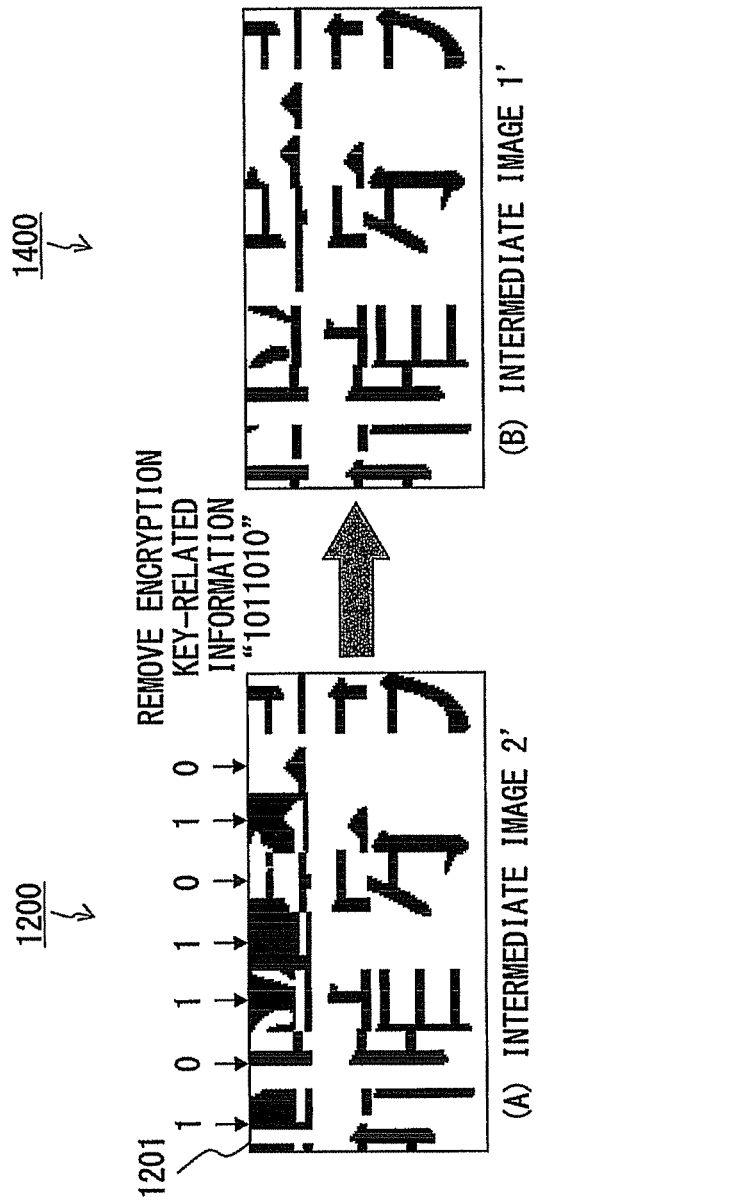

FIG. 83 is a diagram illustrating intermediate image 1' obtained as a result of removal of seven-bit encryption key-related information from an intermediate image.

Figure 84:
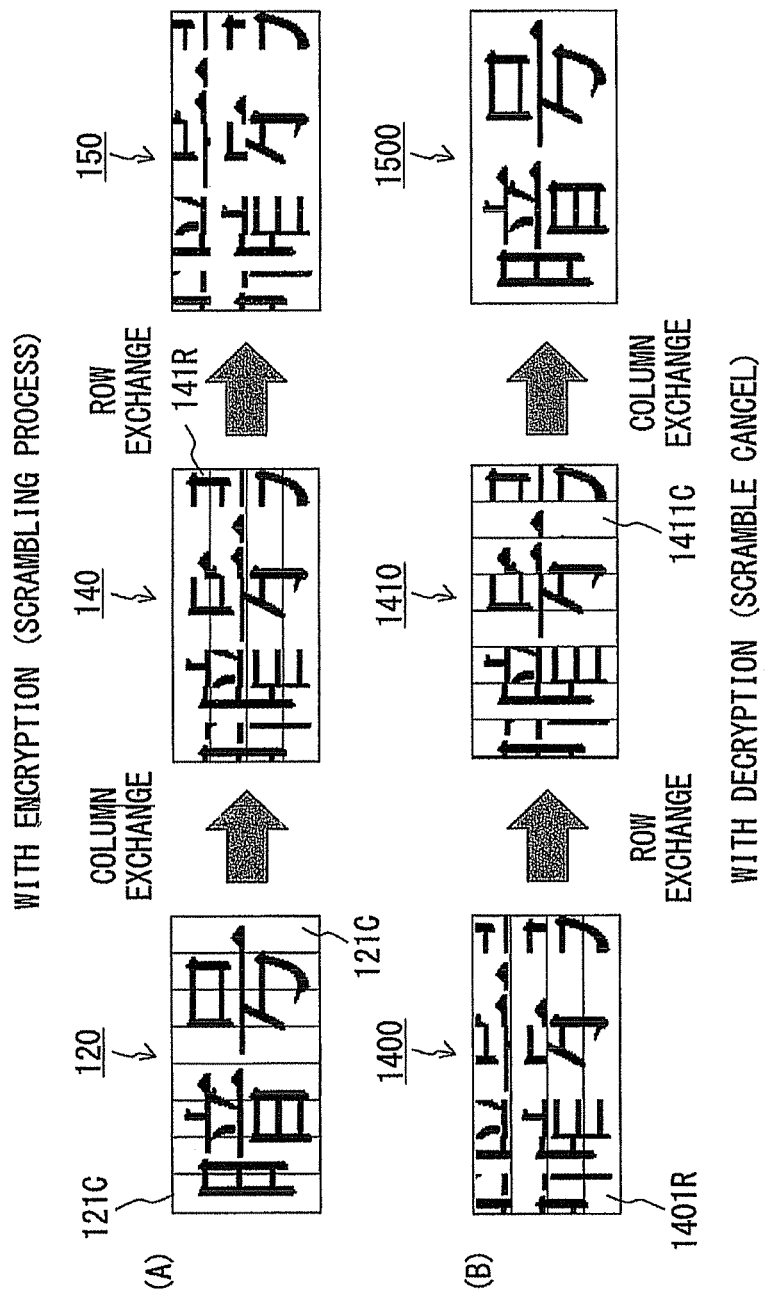

FIG. 84 illustrates a process order of image conversion for converting (encrypting) an original image into intermediate image by the first embodiment of the image encryption apparatus of the present invention, and a process order for restoring an original image from intermediate image by the first embodiment of the image decryption apparatus of the present invention.

Figure 85:
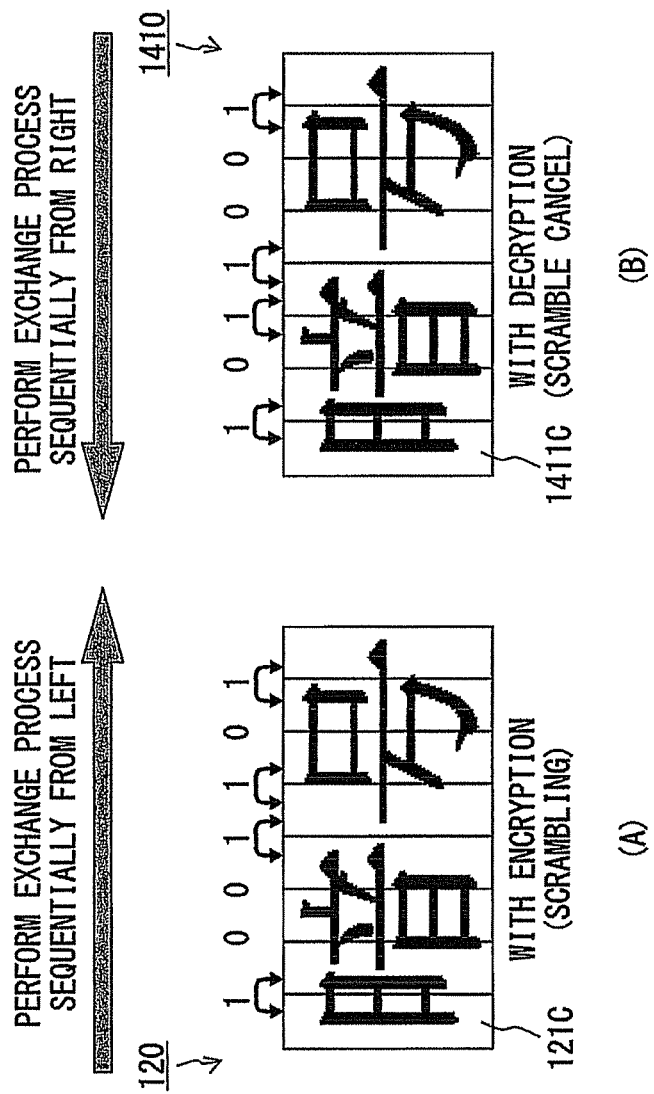

FIG. 85 is a diagram illustrating the directions in respective exchange process of lines and columns at the time of image encryption in the image encryption apparatus and at the time of image decryption in the image decryption apparatus.

Figure 86:
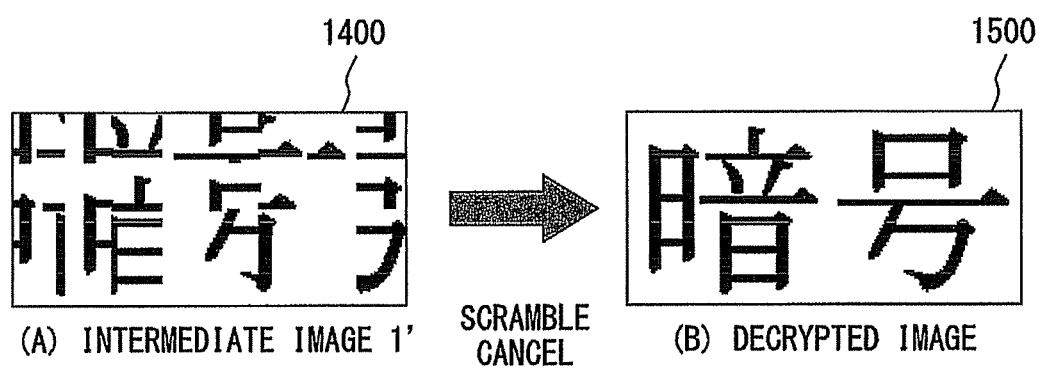

FIG. 86 is a diagram illustrating a method of cancelling scrambling performed for intermediate image to restore an original image 1500.

Figure 87:
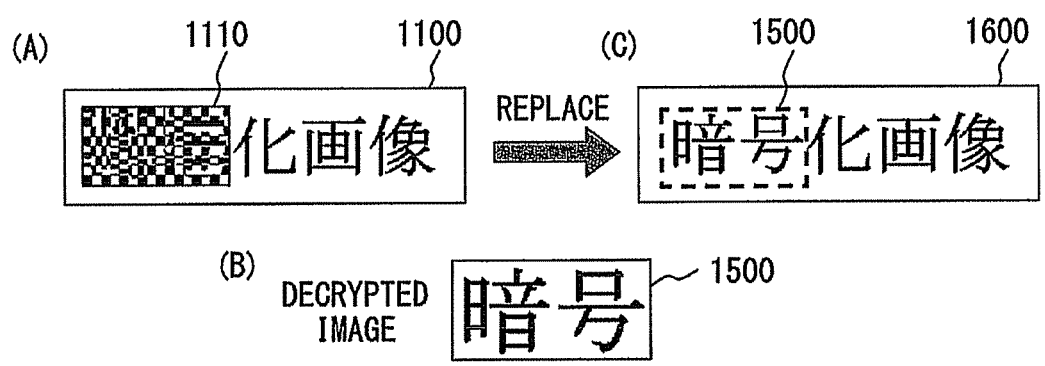

FIG. 87 is a diagram illustrating process contents of step S111 in the flowchart in FIG. 66.

Figure 88:
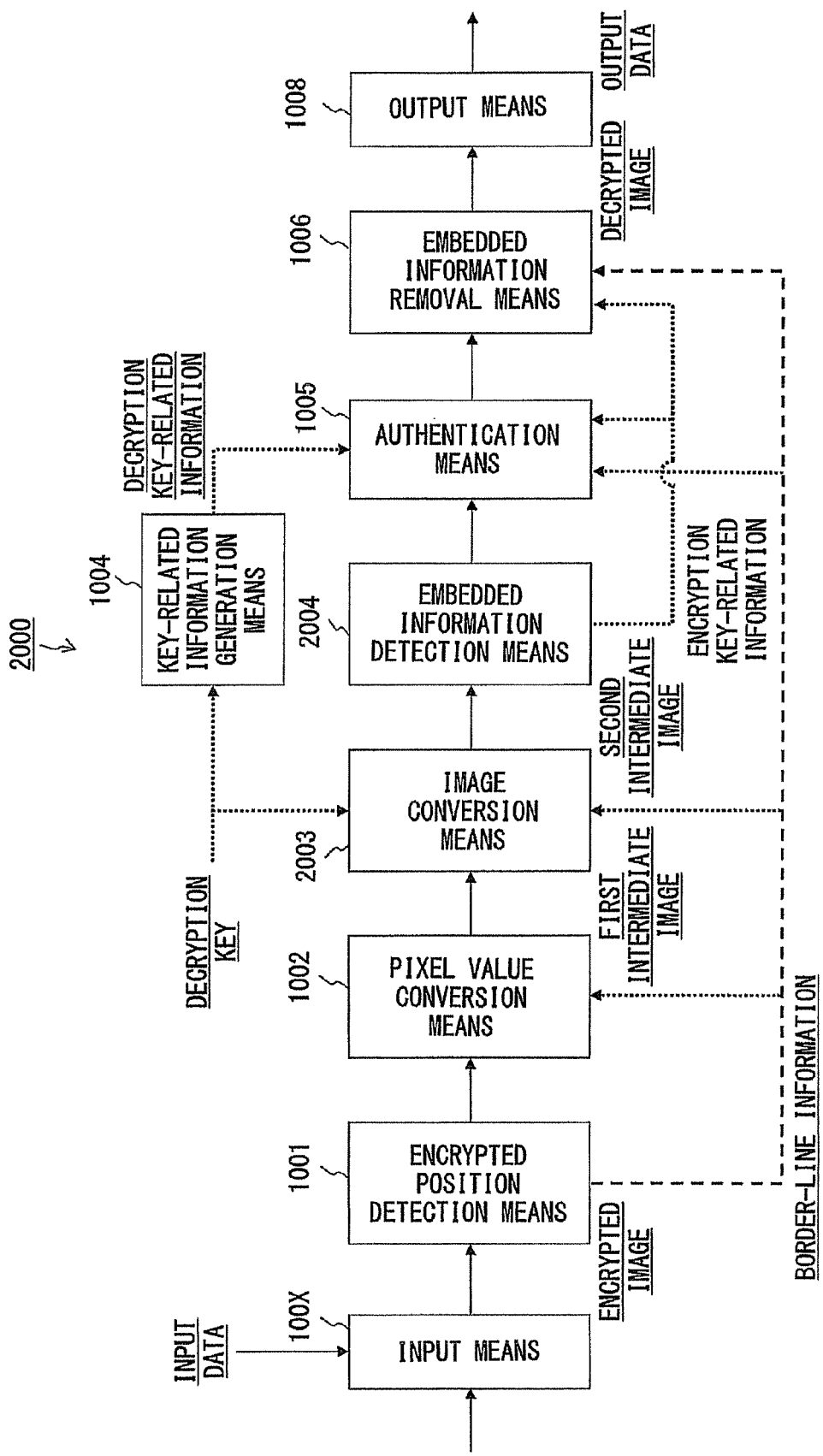

FIG. 88 is a diagram illustrating a second aspect of an image decryption apparatus of the present invention.

Figure 89:

FIG. 89 is a diagram illustrating an encrypted image generated by a second embodiment of an image decryption apparatus of the present invention.

FIG. 90 is a diagram illustrating a detection method of positions of borderlines in an encryption region by encrypted position detection means.

Figure 91:
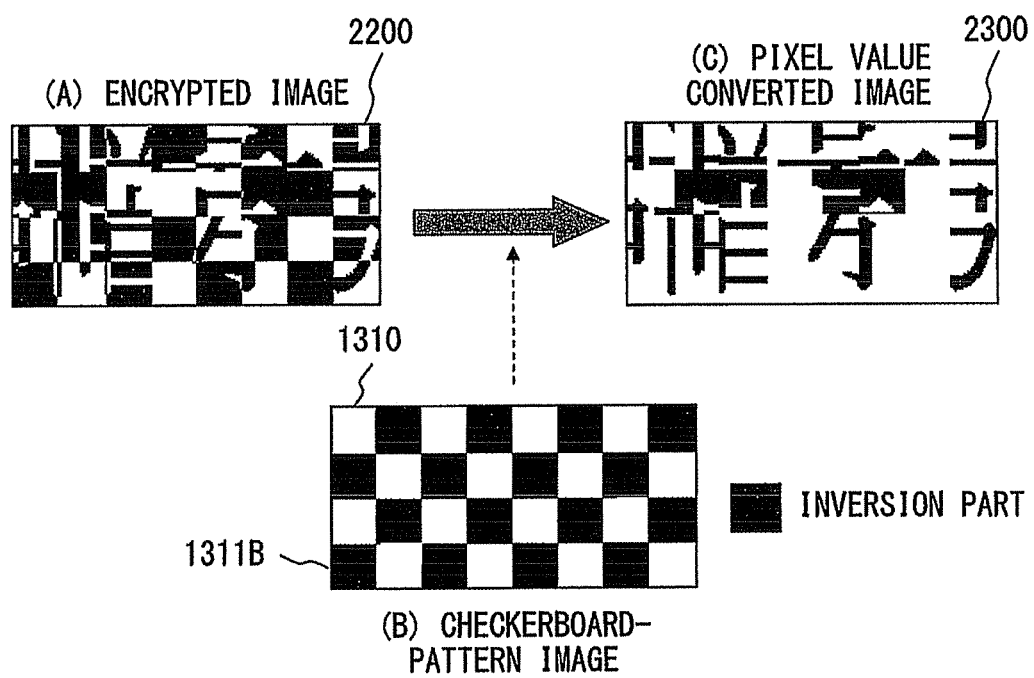

FIG. 91 is a diagram illustrating a method with which pixel value conversion means converts an encrypted image into a pixel value converted image.

Figure 92:
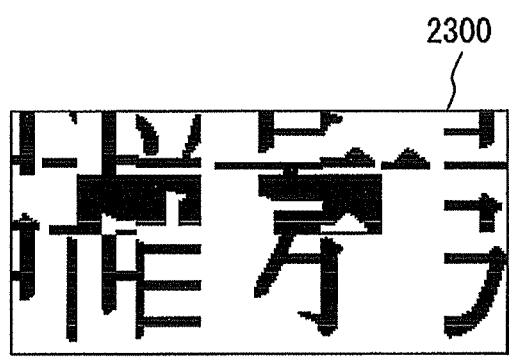

FIG. 92 is a diagram illustrating intermediate image 2' generated by image conversion means.

Figure 93:
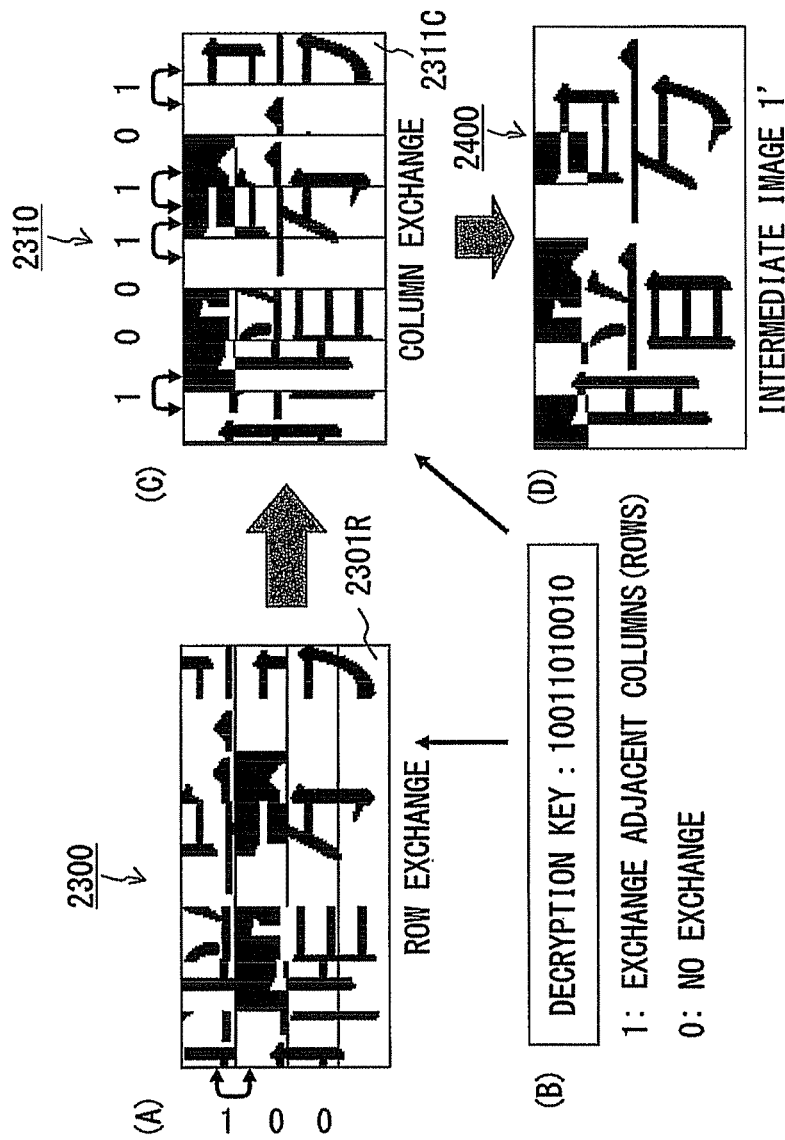

FIG. 93 is a diagram illustrating a method with which image conversion means generates intermediate image from intermediate image.

FIG. 94 is an image diagram illustrating a detection method of encryption key-related information by embedded information detection means.

Figure 95:
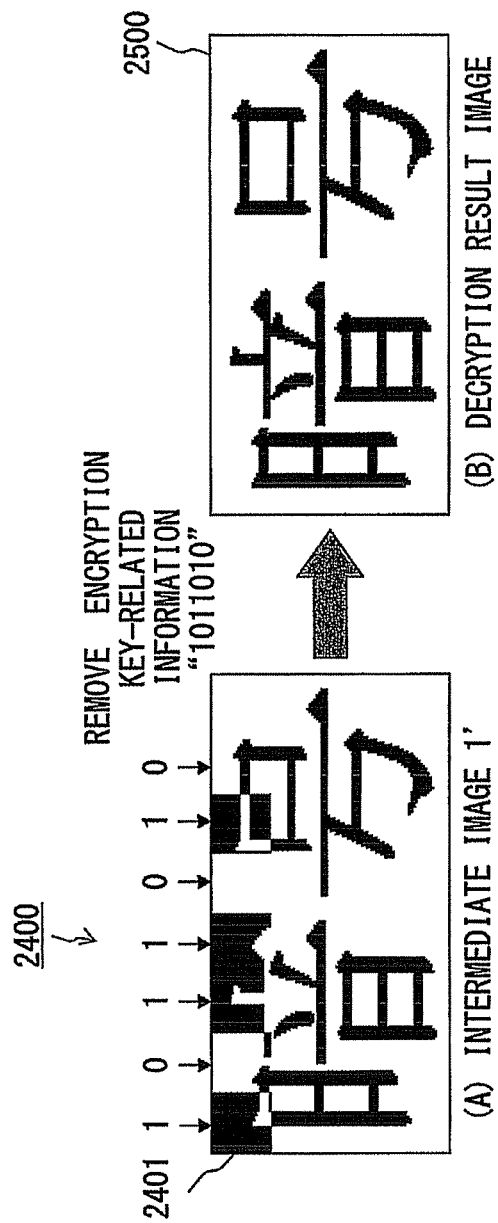

FIG. 95 is a diagram illustrating a method with which embedded information removal means removes encryption key-related information from intermediate image.

Figure 96:

FIG. 96 is a diagram illustrating an original image restored by embedded information removal means.

FIG. 97 is a flowchart of the entire process in the second embodiment of the image decryption apparatus of the present invention.

FIG. 98 is a diagram illustrating a state in which borderlines (borderlines in the column direction and borderlines in the lateral direction) in an encryption region are determined.

Figure 99:
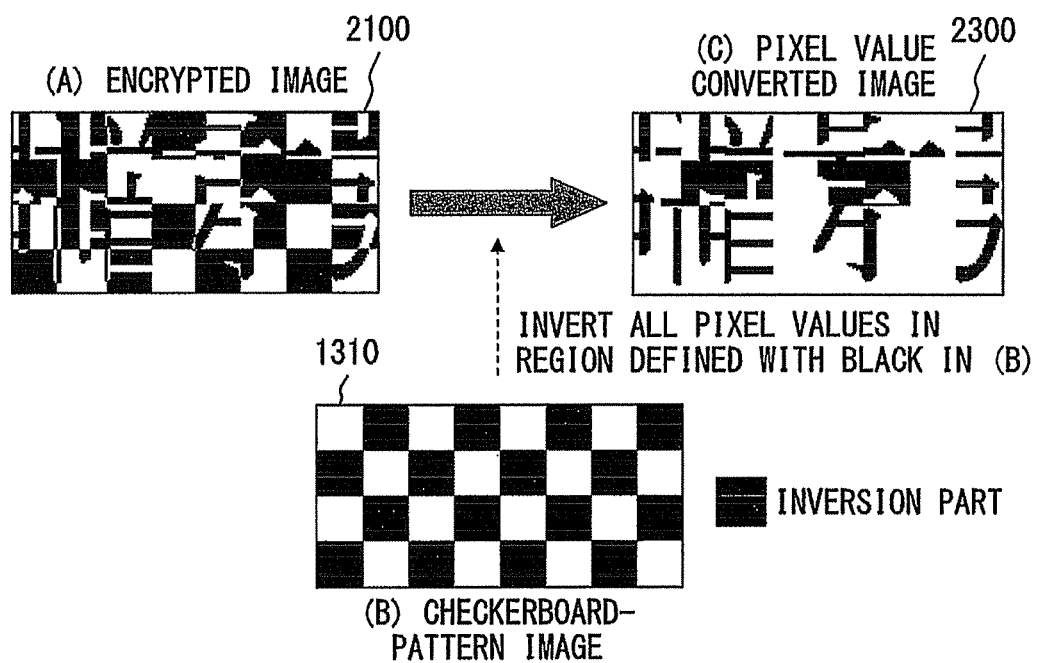

FIG. 99 is a diagram illustrating an example of a pixel value conversion process.

Figure 100:
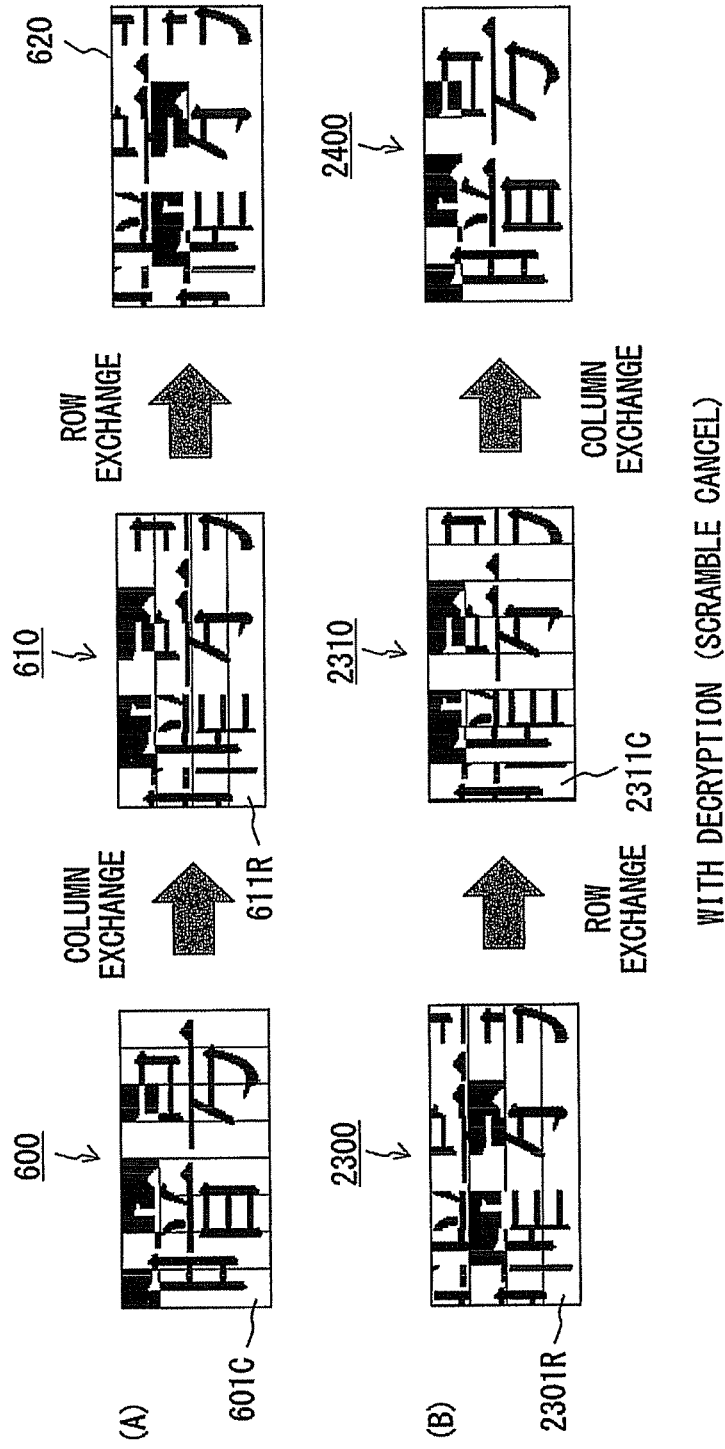

FIG. 100 is a diagram illustrating an order for image conversion at the time of the encryption and an order of image conversion at the time of the decryption.

Figure 101:
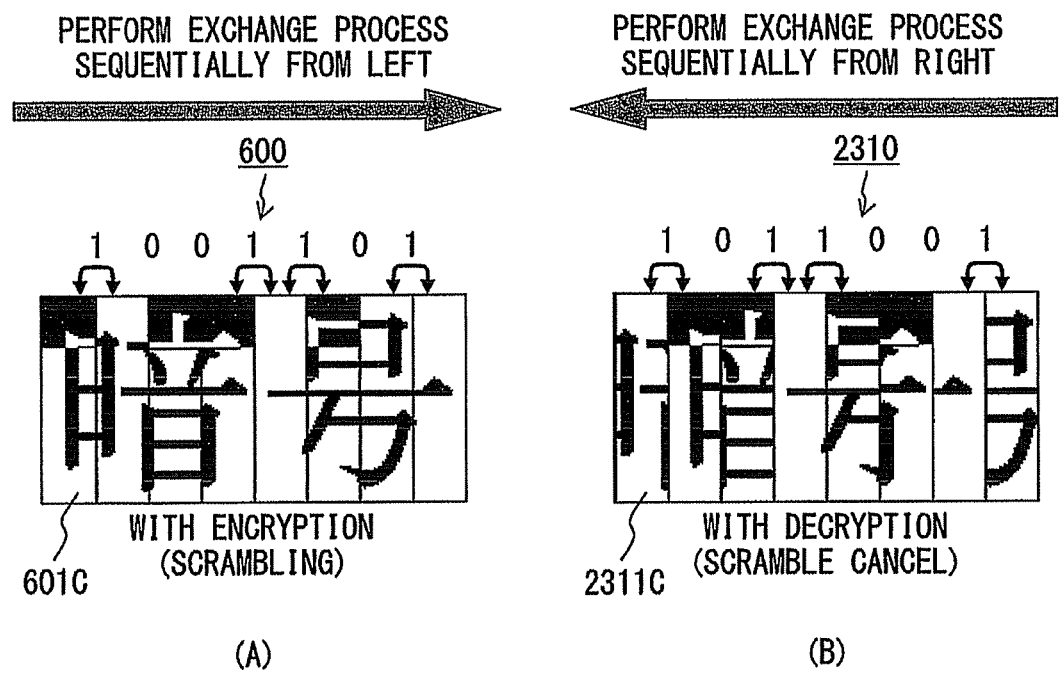

FIG. 101 is a diagram illustrating an order for exchange respectively for rows and columns.

Figure 102:
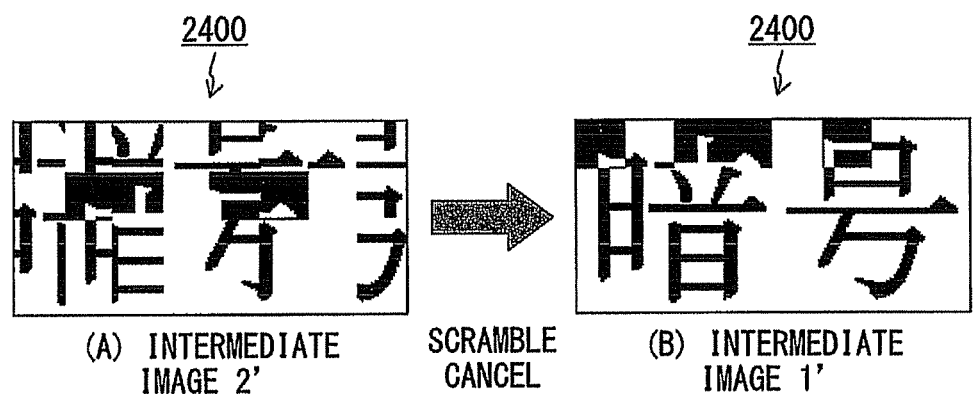

FIG. 102 is a diagram illustrating a method of cancelling scrambling in intermediate image by the image conversion process in step S206 in FIG. 97 to generate intermediate image 2'.

Figure 103:
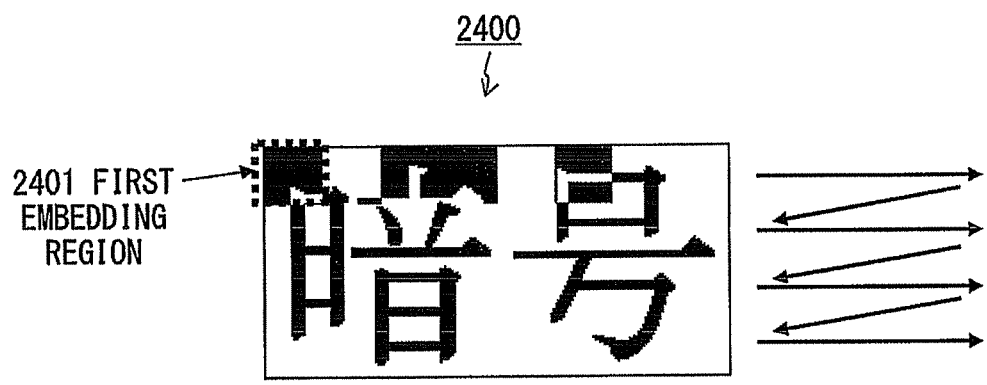

FIG. 103 is a diagram illustrating a specific method (part 1) of detecting encryption key-related information embedded at the time of the encryption from intermediate image.

Figure 104:
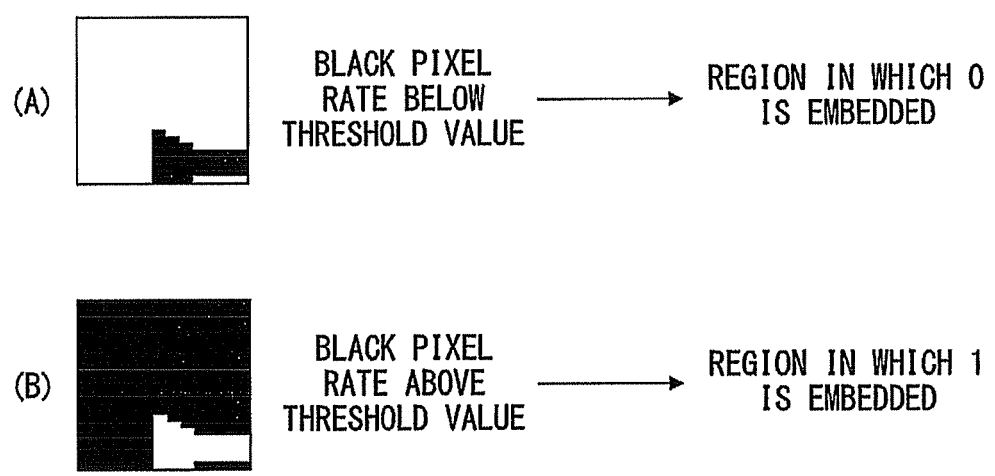

FIG. 104 is a diagram illustrating a specific method (part 2) of detecting encryption key-related information embedded at the time of the encryption from the intermediate image.

Figure 105:
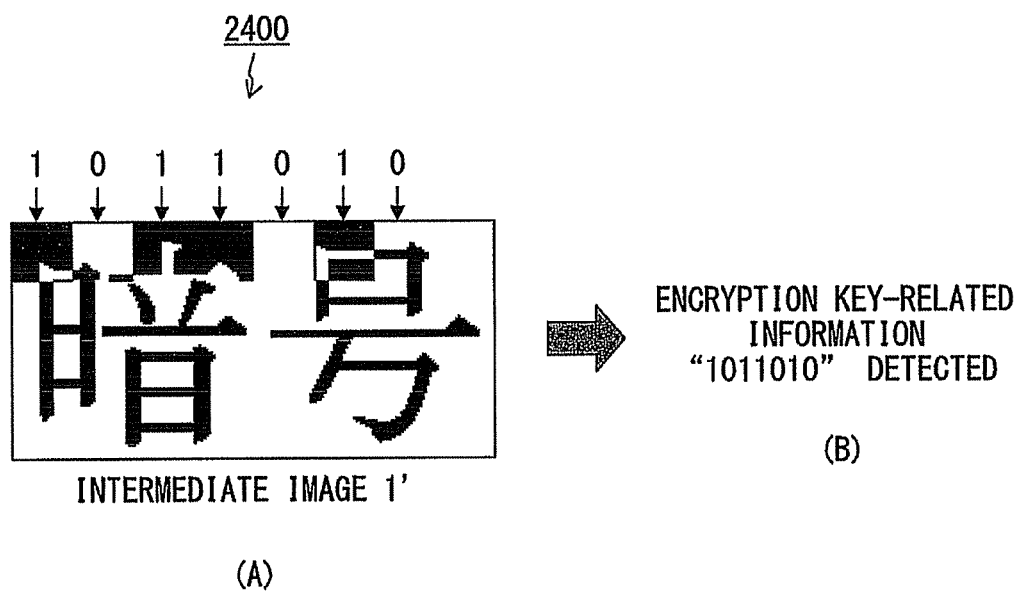

FIG. 105 is a diagram illustrating a specific method (part 3) of detecting encryption key-related information embedded at the time of the encryption from the intermediate image.

FIG. 106 is a diagram illustrating an example of an embedded information removal process.

FIG. 107 is a diagram illustrating a method of removing, from a minimal region in intermediate image, information embedded therein.

Figure 108:
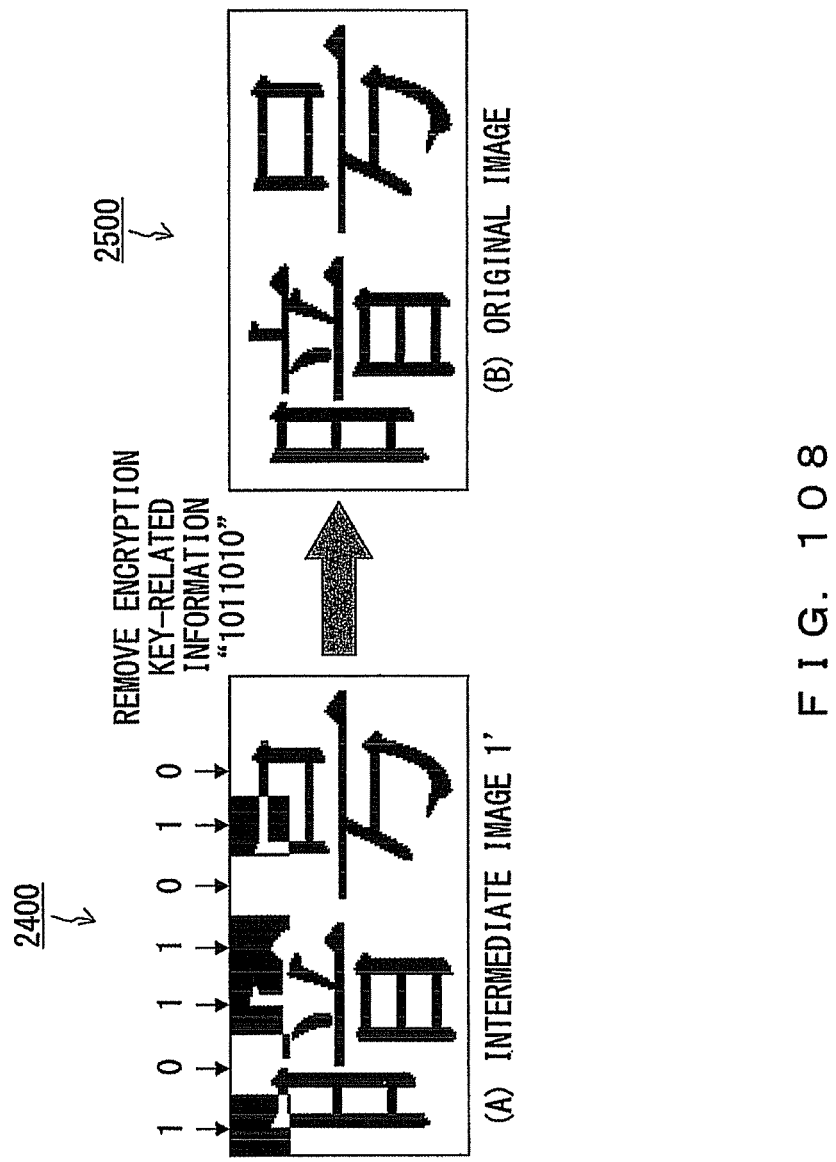

FIG. 108 is a diagram illustrating a method of removing encryption key-related information from intermediate image to restore an original image.

FIG. 109 is a diagram illustrating a hardware configuration of a computer being an execution environment of a program that makes the computer function as the first or second embodiment of the image encryption apparatus of the present invention.

Figure 110:
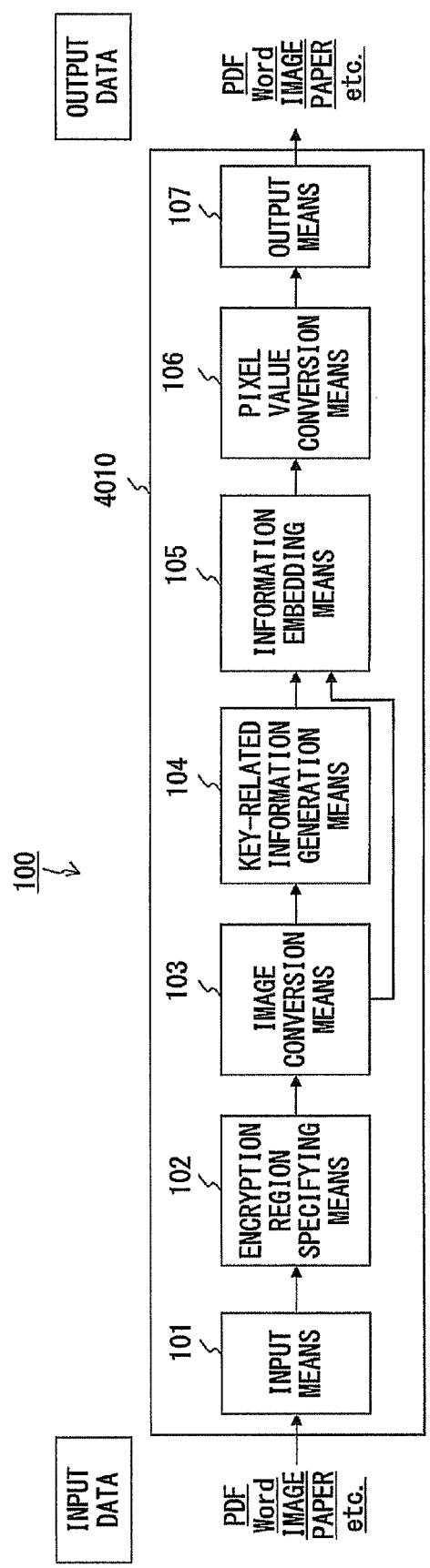

FIG. 110 is a block diagram illustrating a configuration in a case in which the computer in FIG. 109 functions as the first embodiment of the image encryption apparatus of the present invention.

Figure 111:
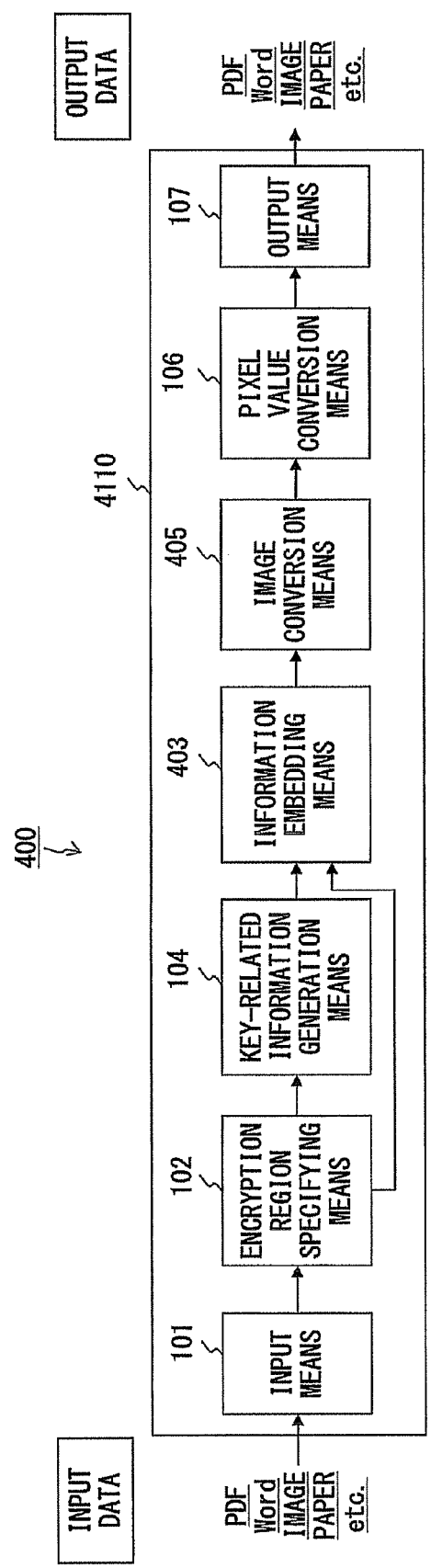

FIG. 111 is a block diagram illustrating a configuration in a case in which the computer in FIG. 109 functions as the second embodiment of the image encryption apparatus of the present invention.

FIG. 112 is a diagram illustrating a system configuration of a computer being an execution environment of a program that makes the computer function as the first or second embodiment of the image decryption apparatus of the present invention.

Figure 113:
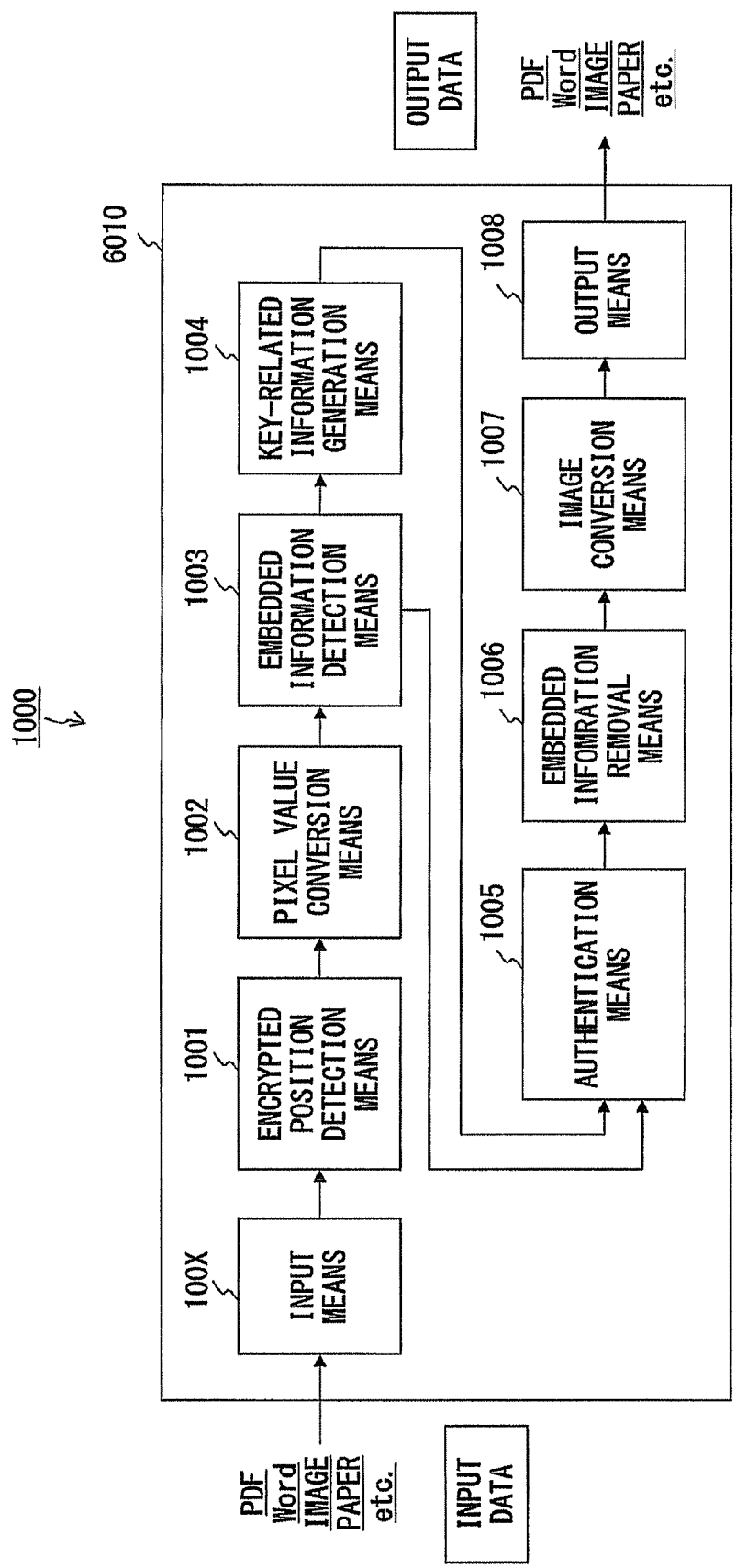

FIG. 113 is a block diagram illustrating a configuration in a case in which the computer illustrated in FIG. 112 functions as the first embodiment of the image decryption apparatus of the present invention.

Figure 114:
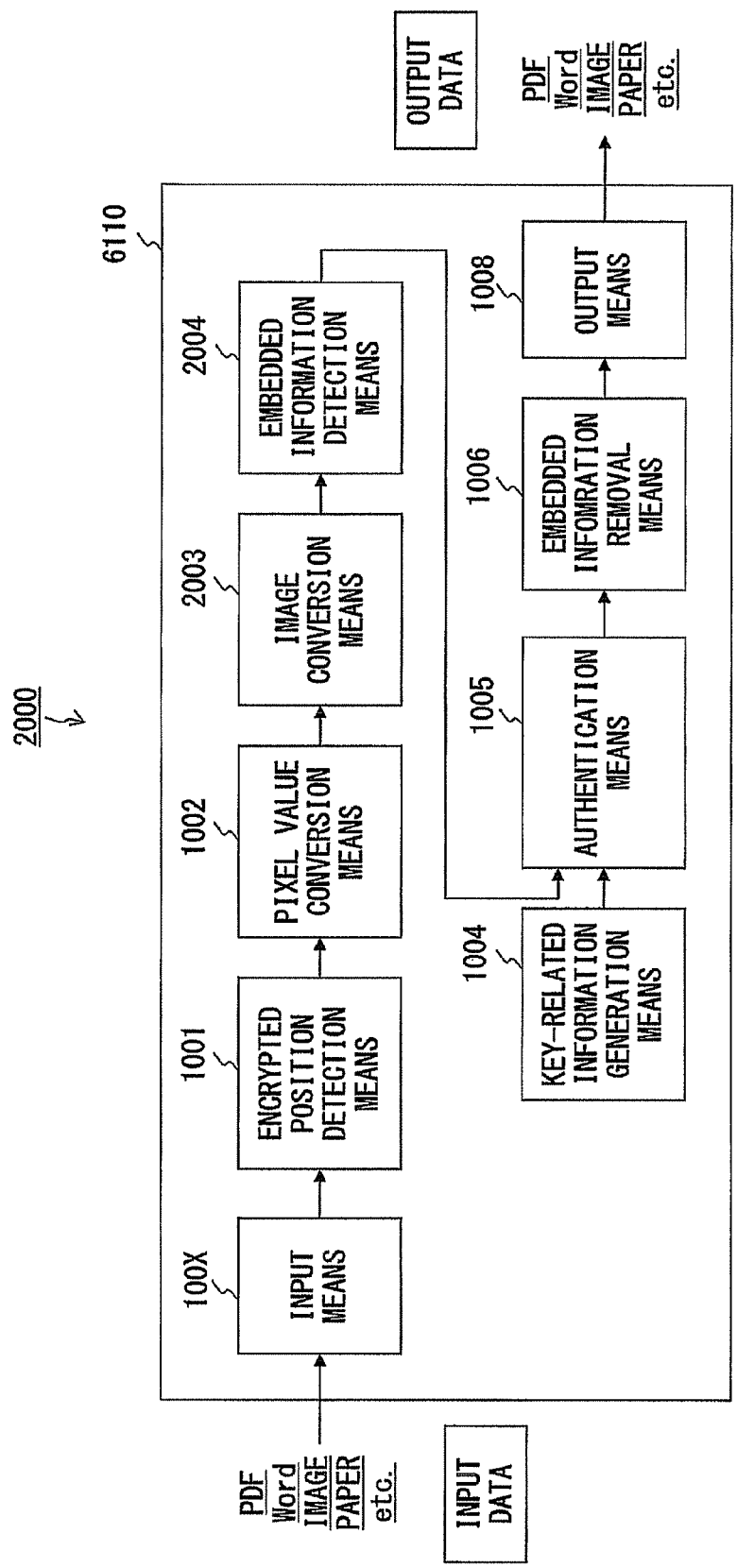

FIG. 114 is a block diagram illustrating a configuration in a case in which the computer illustrated in FIG. 112 functions as the second embodiment of the image decryption apparatus of the present invention.

Figure 115:
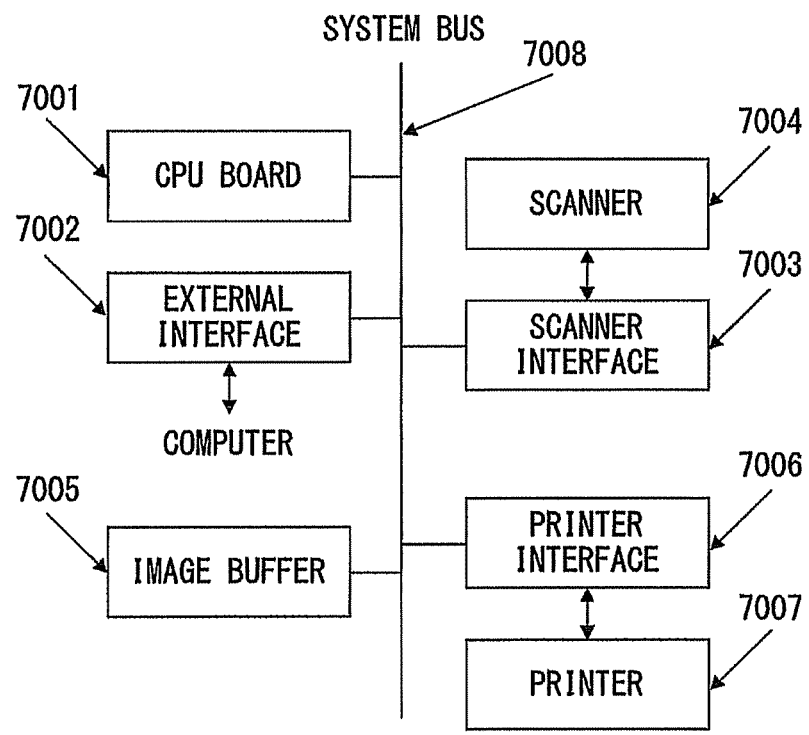

FIG. 115 is a configuration diagram of a system in which the image encryption/decryption process of the present invention is applied to a multifunction machine.

Figure 116:
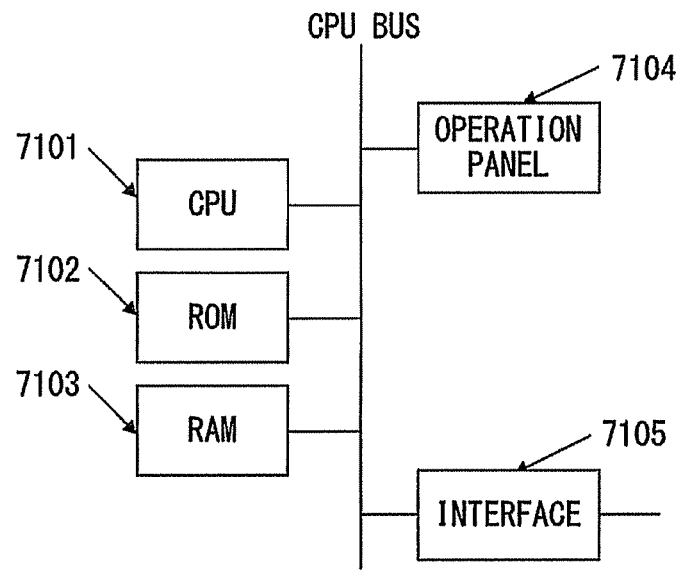

FIG. 116 is a configuration diagram of the CPU board in FIG. 105.

DESCRIPTION OF EMBODIMENTS

Hereinafter, embodiments of the present invention are described, with reference to the drawings.

The present invention relates to an encryption apparatus performing encryption of an image and a decryption apparatus decrypting an encrypted image, and the encryption apparatus and decryption apparatus may be, other than a personal computer, a copy machine (including a multifunction machine), FAX, printer, scanner, over head reader, mobile phone, mobile station, digital camera, TV and so in which the functions of the present invention may be installed.

[Image Encryption Apparatus]

The image encryption apparatus of the present invention is described.

[First Embodiment of the Encryption Apparatus of the Present Invention]

[Configuration]

Figure 1:
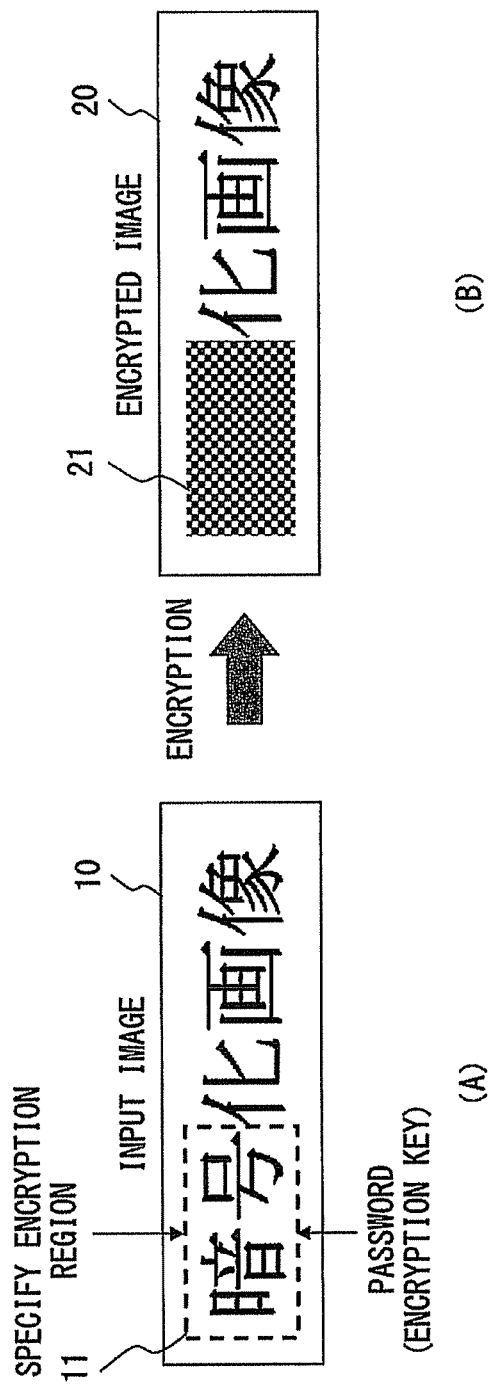
FIG. 1 are a diagram illustrating an example of conventional image encryption.
Figure 2:
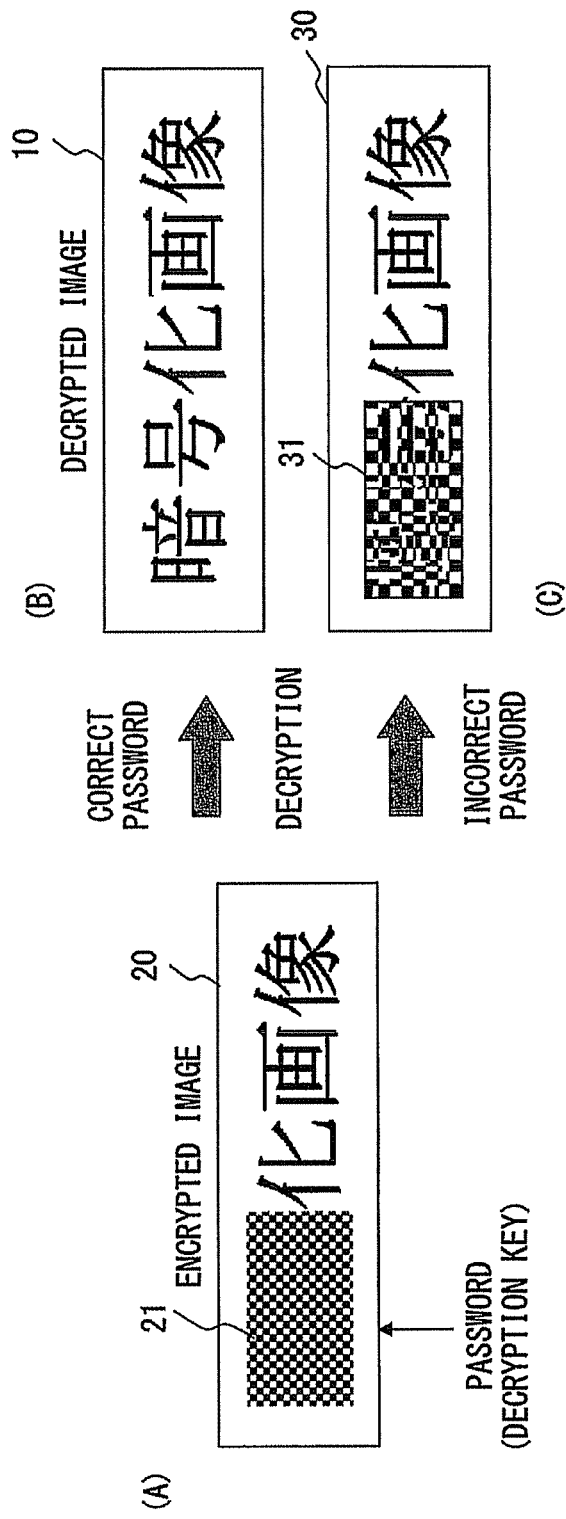
FIG. 2 is a diagram illustrating a decryption method for the conventional image encryption.
Figure 3:
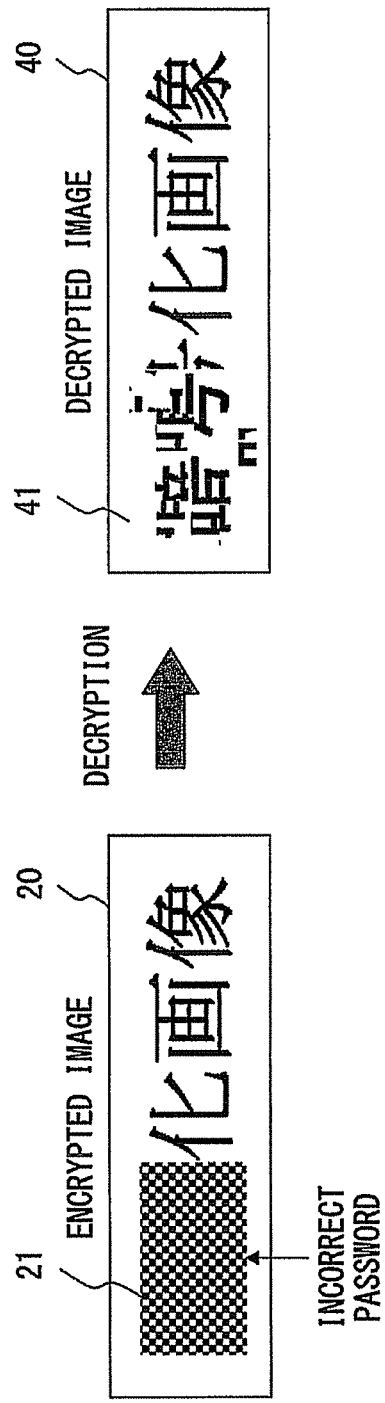
FIG. 3 is a diagram illustrating a problem of the conventional image encryption.
Figure 4:
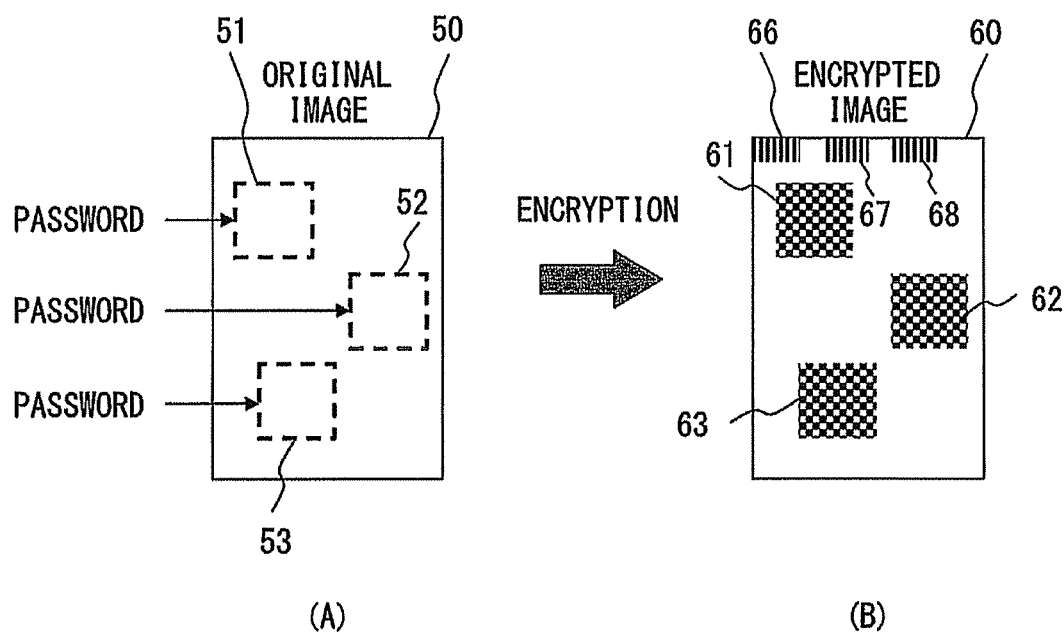
FIG. 4 is a diagram illustrating a problem of another conventional image encryption method of the present invention.
Figure 5:
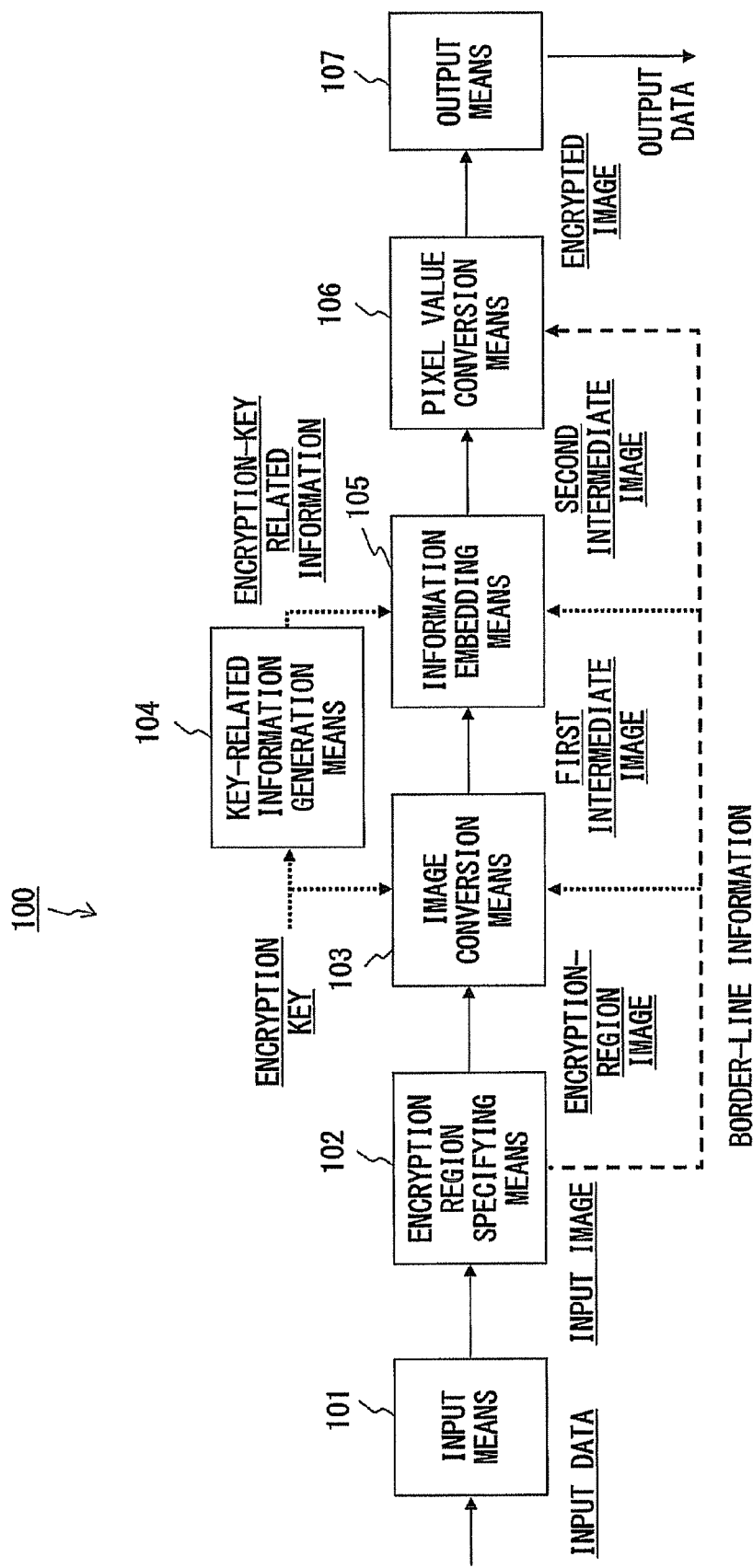
FIG. 5 is a diagram illustrating the basic configuration of a first aspect of an image encryption apparatus of the present invention.

FIG. 5 is a diagram illustrating the basic of the first embodiment of the image encryption apparatus of the present invention.

An image encryption apparatus 100 (first image encryption apparatus) being the first embodiment of the image encryption apparatus of the present invention has input means 101, encryption area specifying means 102, image conversion means 103, key-related image generation means 104, information embedding means 105, pixel value conversion means 106 and output means 107.

The input means 101 obtains data to be the target of the encryption, and converts it into an image (hereinafter, referred as an input image) in a format for which an encryption process can be performed. The image may be an image in the bitmap format.

The input means 101 converts the format of input data as needed, and provides it as an input image for the subsequent processes. The input data may be, for example, image data, electronic document data such as Microsoft Office documents and Adobe PDF documents, or non-image data such as HTML and XML. In addition, in a case in which the encryption target is printed or drawn on a physical medium such as paper, the input can also be performed by reading it by an optical device such as a scanner and digital camera.

In other words, anything that is visually recognizable can be input regardless of its format, by converting it into digital data by various devices. The input means 101 converts apart or the whole of the data into an image (input image) in a format that is suitable for the encryption process, such as the uncompressed bitmap format.

The encryption region specifying means 102 specifies a region for which encryption is desired, for the input image generated by the input data 101. The specification of the encryption region is performed through, for example, a GUI. In addition, if the image is data in a fixed format, the encryption region may be specified in advance by coordinate information and the like. The encryption region to be specified is not limited to one, and there may be a plurality of it. Here, the image within the encryption region is referred to as an "encryption-region image". The encryption region specifying means 102 generates information (hereinafter, referred to as borderline information) related to the outer frame (borderline) of the encryption region and to the borderline in a minimal area within the encryption region. The borderline information is referred to by the image conversion means 103, the information embedding means 105 and the pixel value conversion means 106.

The image conversion means 103 performs an image processing based on an encryption key for the image (encryption-region image) in the region specified by the encryption region specifying means 102, to convert the image in the encryption region into an image in which the original contents cannot be recognized (hereinafter, referred to as intermediate image 1).

The encryption key may be, for example, a password, a key stored in an ID card input through a GUI (Graphical User Interface), or biometric information such as a fingerprint, vein and iris used when a biometric authentication apparatus performs authentication.

The key-related information generation means 104 performs a conversion process for the encryption key, and generates encryption key-related information.

The information embedding means 105 embeds the encryption key-related information generated by the key-related information generation means 104 into the encryption-region image generated by the image conversion means 103, to generate intermediate image 2.

The pixel value conversion means 106 converts the pixel value of the intermediate image 2 so that the position of the encryption region in the image can be specified at the time of the decryption, and generates and outputs the encrypted image. However, in an operation system in which distortion and degradation of the encrypted image input to the image decryption apparatus is very small, that is, in a case in which an encrypted image generated in the image encryption apparatus is input to the image decryption apparatus while being kept as digital, or in a case in which the encrypted image is printed by a high-performance printer and read by a high-performance scanner, the position of the encryption region may be specified at the time of the decryption without the pixel-value conversion. In such a case, the pixel-value conversion may be omitted.

The output means 107 converts the format of the encrypted image as needed, and outputs output data.

The operation of the image encryption apparatus 100 configured as described above is explained.

The input means 101 obtains input data and converts the format of the input data. In the image encryption apparatus 100, any data that a human can visually recognize, such as a monochrome image, color image, document data etc. may be input, regardless of their format. The input means 101 converts the input data into a format that is suitable for the encryption process, such as the uncompressed bitmap format, and gives the input image obtained by the conversion to the encryption region specifying means 102.

The encryption region specifying means 102 specifies, in the input image, a region specified by a user of the apparatus 100 through a GUI (Graphical User Interface) and the like, as an encryption region. In specifying the encryption region, a part of the input image may be specified, or the entirety may be specified when the entire image needs to be kept confidential. When there is a part in the input image that only limited parties are to be allowed to view, the user of the apparatus 100 specifies the part as the encryption region.

Figure 6:
FIG. 6 is a diagram illustrating a method of specifying an encryption region by encryption region specifying means.

FIG. 6 is a diagram illustrating the method of specifying the encryption region by the encryption region specifying means 102.

Figure 7:
FIG. 7 is a diagram illustrating an encryption region specified by the encryption region specifying means.

In FIG. 6, when a part "暗号" in a character string "暗号化画像" in an input image 110 is desired to be kept confidential, the region surrounding the display "暗号" (the region enclosed by the rectangle frame in the drawing) is specified as an encryption region 111. By this, in the input image 110, an encryption-region image 120 illustrated in FIG. 7 is specified.

The image conversion means 103 performs image conversion based on an input encryption key for the encryption-region image specified by the encryption region specifying means 102, so that the contents of the encryption-region image become unrecognizable. For the image conversion, for example, a method disclosed in patent document 1 is applied.

Figure 8:
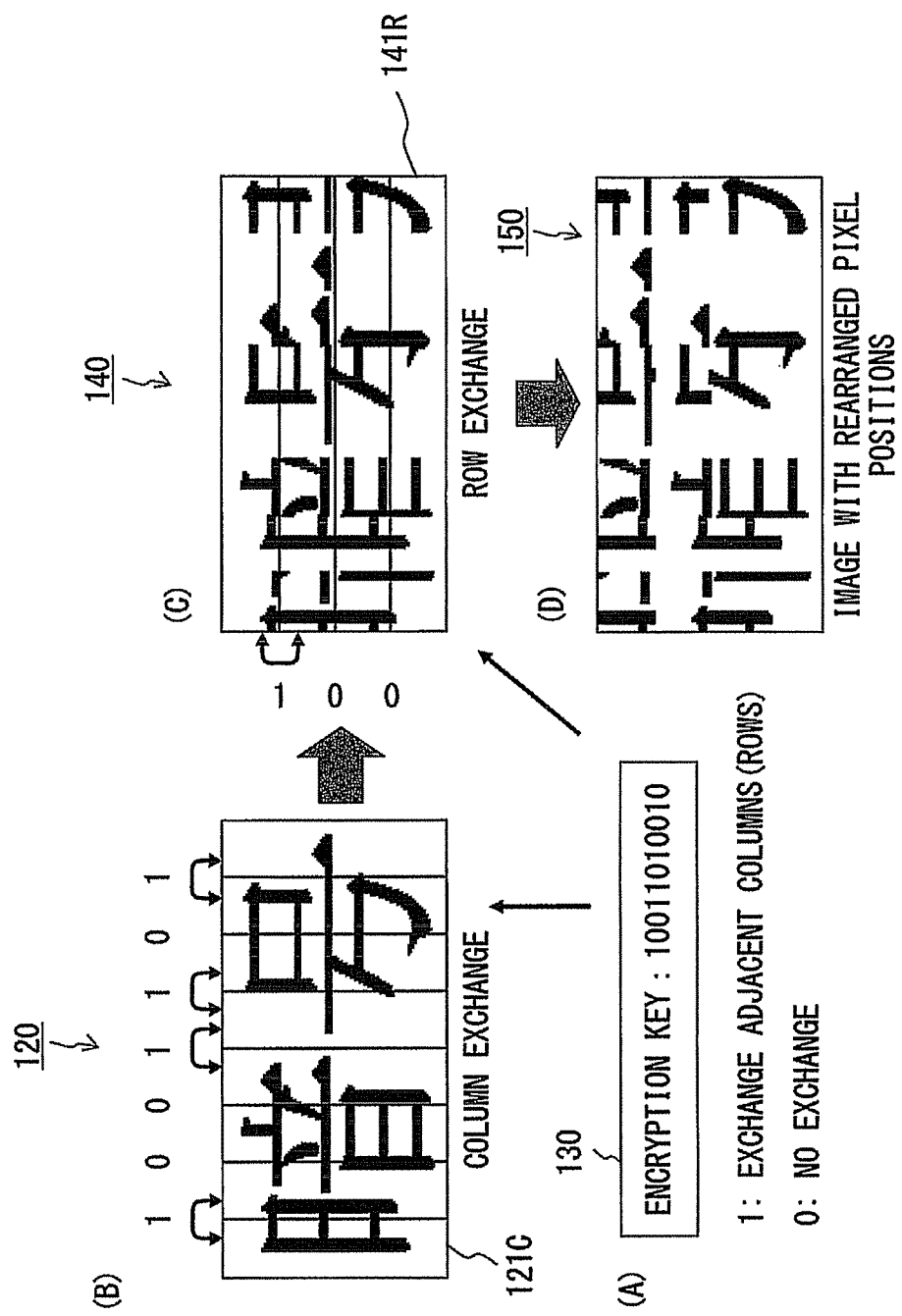
FIG. 8 is a diagram illustrating a method with which image conversion means generates intermediate image from an encryption-region image.

The method is illustrated in FIG. 8.

Here, as illustrated in FIG. 8(A), a binary bit string "10011010010" is used as an encryption key 130. In the binary bit, "1" indicates an "operation exchanging adjacent columns or rows", and "0" indicates that "no operation is to be performed". Meanwhile, as an example of the encryption-region image, the encryption-region image 120 illustrated in FIG. 8(B) is picked up.

First, as illustrated in FIG. 8(B), the encryption-region image 120 is longitudinally divided into eight equal pieces, to divide the encryption-region image 120 into eight columns of segments 121C. Then, the upper seven bits ("1001101") in the encryption key 130 are associated with the boundaries between the eight columns of segments 121C sequentially from left, and the operations corresponding to the bit value described above are performed for adjacent two segments 121C with respect to each boundary sequentially from the left to the right. As a result, the encryption-region image 120 is converted into an image 140 illustrated in FIG. 8(C).

Next, the image 140 is laterally divided into four equal pieces, to divide the image 140 into four rows of segments 141R. Then, the upper three bits ("100") of the encryption key 130 are associated with the three boundaries between the four rows of segments 141R sequentially from the top, and the exchange operations similar to those performed with the longitudinal division are performed for adjacent two segments 141R with respect to each boundary, in units of rows sequentially from the top. As a result, as illustrated in FIG. 8(D), an image 150 in which a scramble process is performed for a region in the encryption-region image 120 divided in a grid pattern in the longitudinal and lateral directions is obtained.

Figure 9:
FIG. 9 is a diagram illustrating intermediate image 1 generated by the image conversion means.

By the image conversion process, an intermediate image 150 (intermediate image 1) illustrated in FIG. 9 in which the contents of the image have become unrecognizable is generated from the encryption-region image 120.

As the method for the image conversion performed by the image conversion means 103, other than the scramble described above, various processes such as inversion side to side and up and down, and rotation may be applied, and any means will do as long as it is a method for making the contents of an original image unrecognizable to human eyes on the basis of an encryption key.

The key-related information generation means 104 performs certain conversion for the encryption key that the image conversion means 103 used for the image conversion, to generate encryption key-related information. As the conversion method, methods such as encryption, function transformation, hash transformation may be applied.

An example of a method for generating encryption key-related information by the key-related information generation means 104 is illustrated in FIG. 10. FIG. 10 illustrates an example of encryption and hash transform.

By encrypting the encryption key 130 (=a bit string of "10011010010") mentioned above, encryption key-related information 161 composed of a bit string of "11001111010" is generated. Meanwhile, by performing hash transformation for the encryption key 130, key-related information 162 composed of a bit string of "1011010" is generated.

The information embedding means 105 embeds the encryption key-related information generated by the key-related information generation means 104 into the intermediate image 1 generated by the image conversion means 103. The encryption key-related information is used for authentication at the time of the decryption of an encrypted image generated by the image encryption apparatus 100. The information embedding means 105 divides the intermediate image 1 into a plurality of equal minimal regions, and embeds each bit in the bit string into each of the minimal regions.

Hereinafter, four specific methods of embedding encryption key-related information by the information embedding means 105 are picked up and the respective methods are explained.

<First Method of Embedding Encryption Key-Related Information>

According to the first method of embedding encryption key-related information, information is embedded into an encrypted image by converting the pixel value of the minimal region (also referred to as an embedding region) in the intermediate image 1. For example, information is embedded by a method in which, when the pixel value of a rectangle region inside the embedding region is subtracted by 10%, bit information of "1", or when no subtraction is performed, bit information of "0" is expressed.

Figure 11:
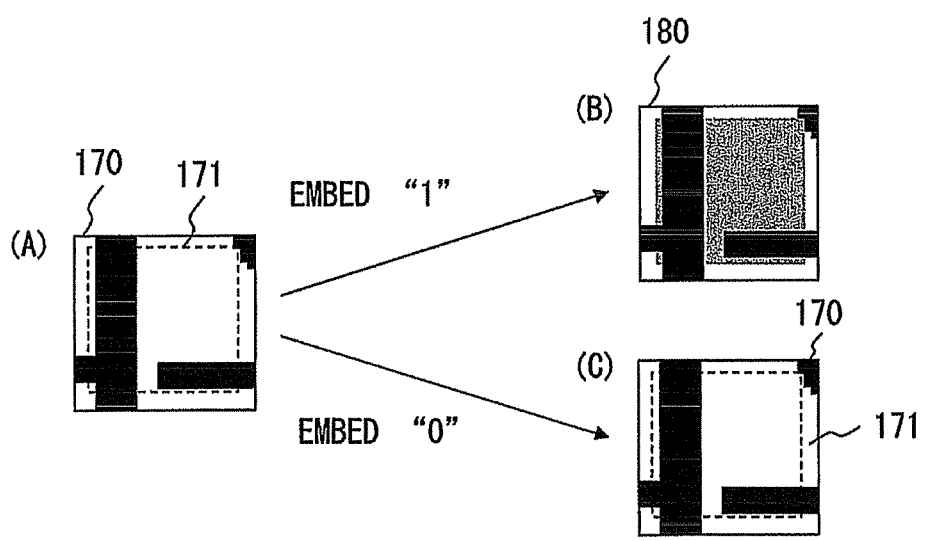
FIG. 11 is a diagram illustrating a first method of embedding encryption key-related information.

The method is illustrated specifically in FIG. 11. Meanwhile, in FIG. 11, the pixel value of black is set to "0", and the pixel value of white is set to "255".

In the case of embedding "1" into an embedding region 170 illustrated in FIG. 11(A), the pixel values of a rectangle region 171 (the region enclosed by the rectangle frame drawn with the broken line) inside the embedding region 170 are equally subtracted by 10%, as illustrated in FIG. 11(B). Meanwhile, in the case of embedding "0" into the embedding region 170, no change is performed for the pixel values of the rectangle region 170, as illustrated in FIG. 11(C). Therefore, the image in the embedding region 170 remains the same as the original.

While the information of "1" is embedded by subtracting the pixel value by 10%, other methods of converting a pixel value such as addition, subtraction, multiplication and division, nonlinear conversion may be adopted. In addition, the part of which pixel values are to be converted in the embedding region is not limited to a portion, and it may be the entire region.

<Second Method of Embedding Encryption Key-Related Information>

According to the second method of embedding encryption key-related information, information is embedded into the encryption region by inverting pixel values of the embedding region.

Figure 12:
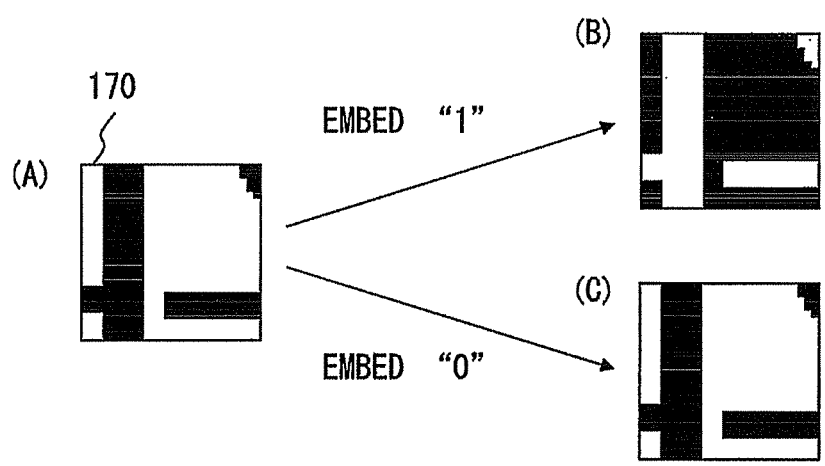
FIG. 12 is a diagram illustrating a second method of embedding encryption key-related information.

FIG. 12 is a diagram illustrating an example of applying the method to a case in which the embedding region is a monochrome image. In this case, a process is performed so that, when embedding "1" into the embedding region illustrated in FIG. 12(A), the pixel values in the region are inverted as illustrated in FIG. 12(B), and when embedding "0", the pixel values of the region are not inverted, as illustrated in FIG. 12(C).

Meanwhile, the inversion process may be applied not only to a monochrome image but also to a color image. When the target image is an image in the RGB format, it becomes possible by inverting each of the pixel values of the three colors of R, G, B independently. In addition, the part of which pixel value is to be inverted is not limited to the entirety of the embedding region, and the embedding may be performed by inverting a portion.

<Third Method of Embedding Encryption Key-Related Information>

According to the third method of embedding encryption key-related information, encryption key-related information is embedded into the encryption region in accordance with inverting patterns that define the part of which pixel values are to be inverted in the embedding region.

Examples of the inverting patterns are illustrated in FIG. 13. An inversion pattern 191 illustrated in FIG. 13(A) in which a black region exists in the upper right is an inversion pattern (pattern 00) corresponding to the bit string "00" (two-bit information). An inversion pattern 192 illustrated in FIG. 13(B) in which a black region exists in the lower right is an inversion pattern (pattern 01) corresponding to the bit string "01" (two-bit information). An inversion pattern 193 illustrated in FIG. 13(C) in which a black region exists in the lower left is an inversion pattern (pattern 10) corresponding to the bit string "10" (two-bit information). An inversion pattern 194 illustrated in FIG. 13(D) in which a black region exists in the upper left is an inversion pattern (pattern 11) corresponding to the bit string "11" (two-bit information). Thus, since four inversion patterns are defined, when the inversion patterns 191-194 are used, two-bit information can be embedded into one minimal region.

Figure 14:
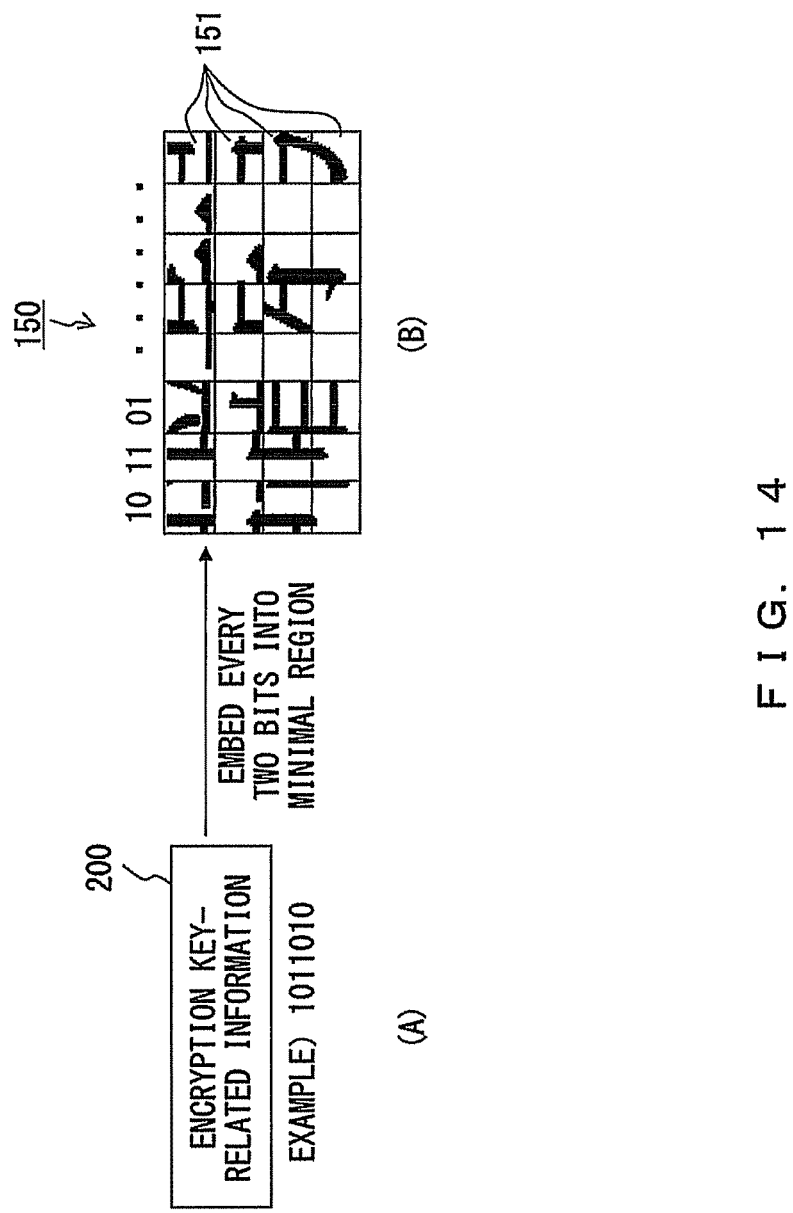
FIG. 14 is a diagram illustrating a method of embedding the four patterns illustrated in FIG. 13 into minimal regions in intermediate image 1 in association with the bit string of encryption key-related information.

FIG. 14 is a diagram illustrating a method for embedding the four kinds of inverting patterns illustrated in FIG. 13 into an embedding region in the intermediate image 1 while associating them with a bit string of encryption key-related information.

As illustrated in FIG. 14(A), it is assumed that encryption key-related information 200 is a seven-bit bit string "1011010". In addition, as illustrated in FIG. 14(B), an intermediate image 150 (intermediate image 1) is divided into 8 (lateral direction)×4 (longitudinal direction), i.e., total of 32 minimal regions (embedding regions) 151.

In this case, every two bits from the top of the encryption key-related information 200 are sequentially embedded into each embedding region 151. The information to be embedded first are the first two bits "10" of the encryption key-related information, and the embedding region 151 to be the target of the embedding is the leftmost region of the top row. After that, two bits are sequentially taken out from the bit string subsequent to the first two bits, and the patterns corresponding to the bit patterns are assigned to the second embedding region 151 from the left of the top row and the subsequent embedding regions, sequentially from left to right, as illustrated in FIG. 14(B).

Figure 15:
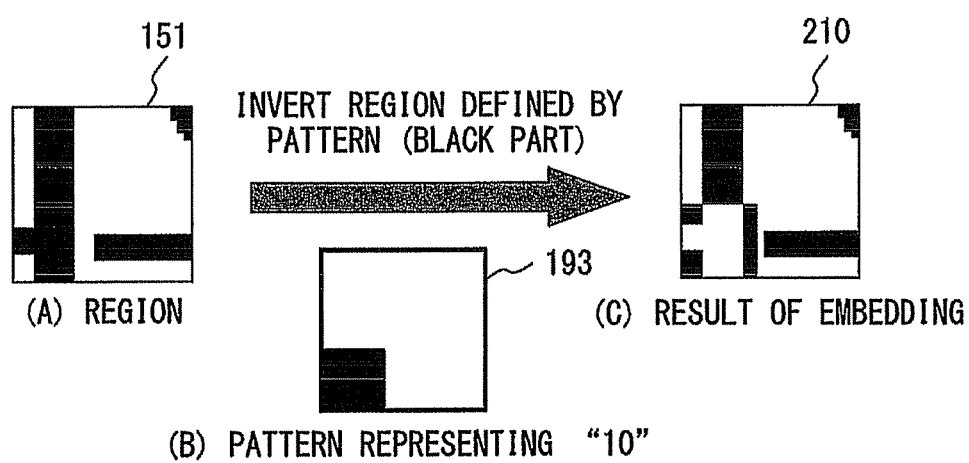
FIG. 15 is a diagram illustrating a specific method of embedding two bits of encryption key-related information into a minimal region of intermediate image.
Figure 17:
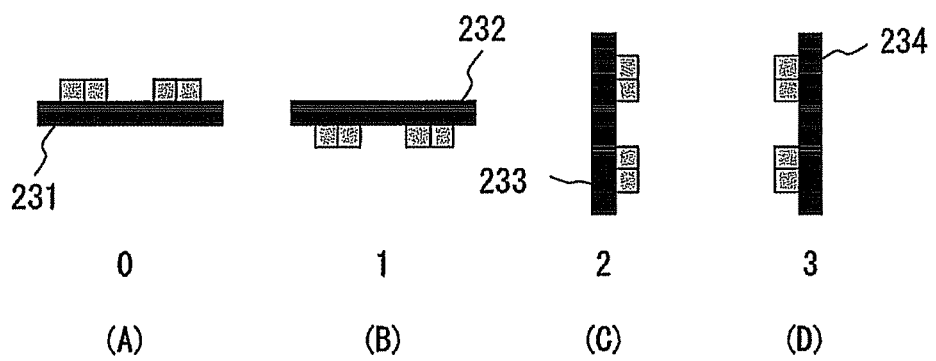
FIG. 17 is a diagram illustrating four image patterns used in an embedding method in patent document.

A specific method of embedding two bits of encryption key-related information into an embedding region is illustrated in FIG. 15.

In the case of embedding a bit string "10" into an embedding region 151 illustrated in FIG. 15(A), a pattern 193 (pattern 10) illustrated in FIG. 15(B) is selected. Then, the region corresponding to the region (black part in the drawing) in the embedding region 151 defined by the inverting pattern 193 is inverted. As a result, the image in the embedding region 151 illustrated in FIG. 15(A) is converted into an image 210 illustrated in FIG. 15(C).

When the embedding of the first two bits ("10") of the encryption key-related information 200 is completed as described above, the next two bits "11" are embedded into the embedding region 151 on the immediate right of the embedding region for which the embedding has just been performed, by the same method.

Thus, in the third embedding method, a plurality of inverting patterns are prepared in association with the respective patterns of partial bit strings of encryption key-related information, and the encryption key-related information is embedded into the intermediate image 1 by inverting pixel values of a region defined by the inverting pattern corresponding to the information to be embedded (partial bit string) in the embedding region. As a result, ultimately, intermediate image 2, into which the encryption key-related information is embedded, is generated.

Other inverting patterns are illustrated in FIG. 16.

Four formats of inverting patterns 211-214 illustrated in FIG. 16(A) are patterns expressing four sets of two-bit information ("00", "01", "10", "11") by dividing an embedding region into two in the two directions i.e., the longitudinal and lateral directions. Four formats of inverting patterns 221-224 illustrated in FIG. 16 (B) are patterns expressing four sets of two-bit information by converting pixel values on the edge part of an embedding region. While the inverting patterns are all in a set of four kinds, the number of formats of the inverting patterns may be set arbitrarily in accordance with the number of bits of information to be embedded into the embedding region.

<Fourth Method of Embedding Encryption Key-Related Information>

According to the fourth method of embedding encryption key-related information, information is embedded into the embedding region by embedding information into the intermediate image 1 using a watermark.

Figure 18:
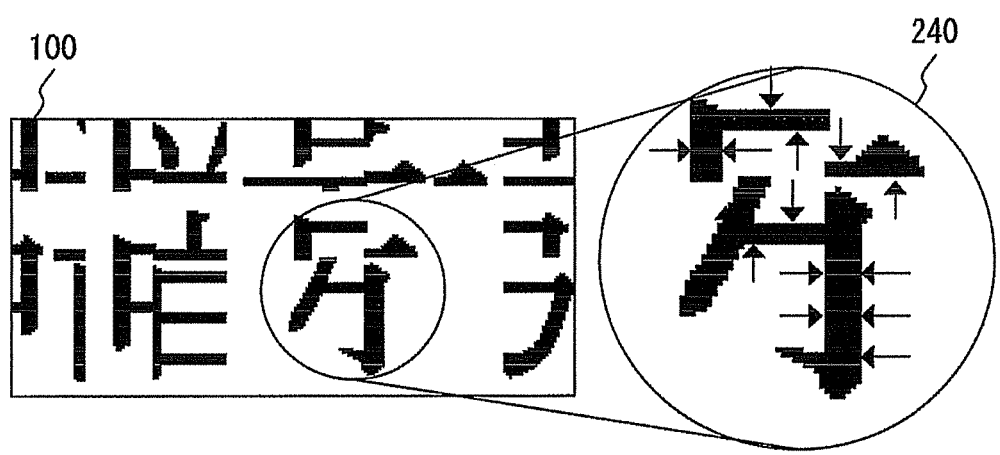
FIG. 18 is a diagram illustrating a search method for an embedding region in an embedding method in patent document 3.

The image to be the target of the embedding of the encryption key-related information here is the intermediate image 150 (intermediate image 1) illustrate in FIG. 9, and as an example of a watermark system that is suitable for embedding information into such an image, there is a method disclosed in Japanese Patent Application No. 2006-266015 (hereinafter, patent document 3) in the Japan Patent Office. The embedding system is characterized in that four kinds of image patterns 231-234 illustrated in FIGS. 17(A)-(D) are embedded into a document image in an indistinctive manner. In the system, as illustrated in FIG. 18, a flat region is searched in a black image in the intermediate image 150, and one of the image patterns 231-234 illustrated in FIGS. 17(A)-(D) is embedded into the flat region. Meanwhile, the image enclosed by a circle 240 illustrated on the right in FIG. 18 is an enlargement of the region enclosed by a circle illustrated on the left, and the parts indicated by the arrow are the flat regions into which the image patterns 231-234 can be embedded.

Figure 19:
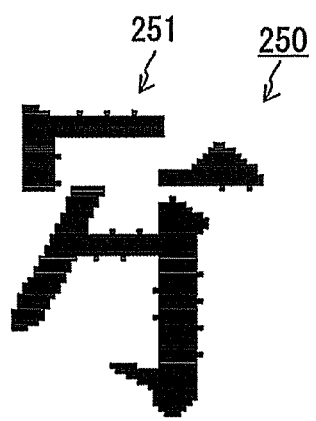
FIG. 19 is a diagram illustrating a result of embedding of the four patterns illustrated in FIG. 17 applying the method to the intermediate image 1 illustrated in FIG. 18.

FIG. 19 is a diagram illustrating the result of the embedding of the image patterns 231-234 applying the system mentioned above into the intermediate image 150 illustrated in FIG. 18. In an image 250 illustrated in FIG. 19, protruding parts 251 represent the parts in which encryption key-related information is embedded.

The information embedding means 105 uses one of four kinds of methods of embedding encryption key-related information described above to embed encryption key-related information into the encryption region (intermediate image 1), and generates the intermediate image 2.

Figure 20:
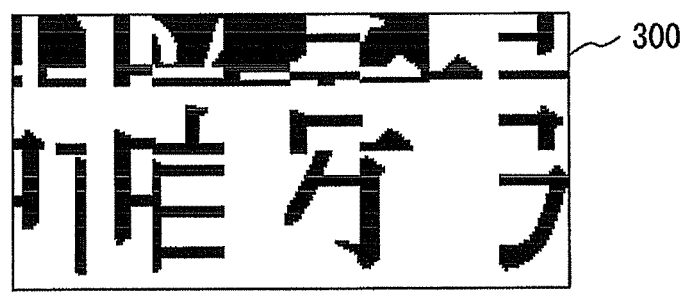
FIG. 20 is a diagram illustrating intermediate image generated by key-related information generation means by embedding encryption key-related information into the intermediate image illustrated in FIG. 9 using the first embedding method (information embedding method by pixel value inversion).

FIG. 20 is a diagram illustrating intermediate image 300 (intermediate image 2) that the information embedding means 105 generated by embedding encryption key-related information into the intermediate image 150 illustrated in FIG. 9 using the first method of embedding encryption key-related information (information embedding method by the pixel value conversion).

For the intermediate image 2 into which encryption key-related information is embedded, the pixel value conversion means 106 generates an image that forms an approximately stripe pattern by converting the pixel values of the intermediate image with respect to its lateral direction with a certain periodicity and converts the pixel values of the intermediate image 2 with respect to its longitudinal direction with a certain periodicity. For the generation, for example, the pixel value conversion method disclosed in patent document 1 may be used.

Figure 21:
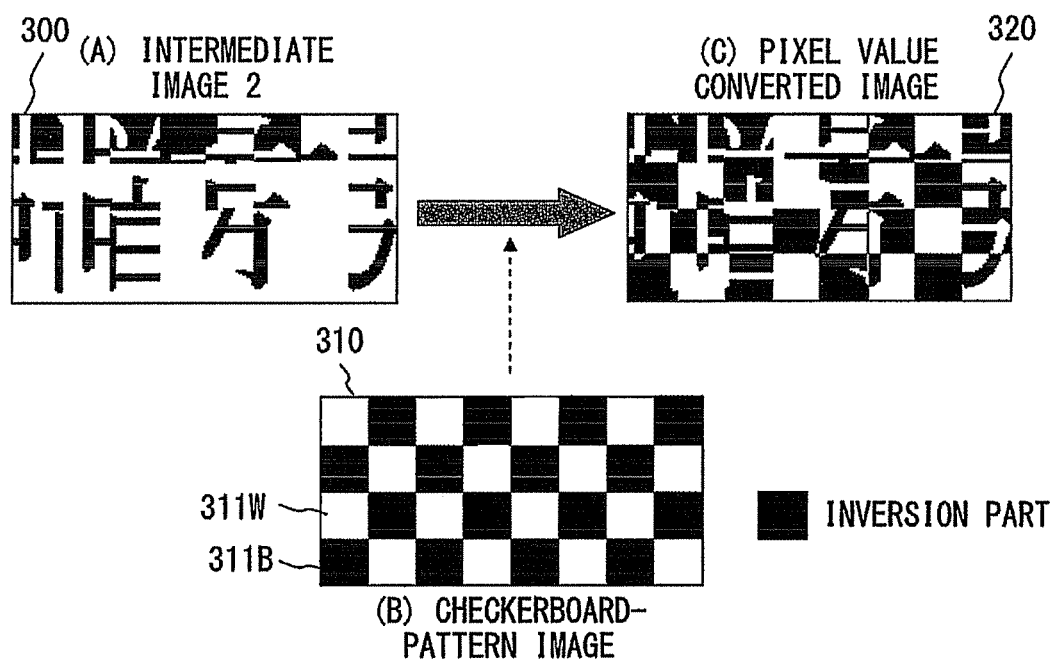
FIG. 21 is a diagram illustrating a method with which pixel value conversion means perform pixel value conversion of intermediate image.

FIG. 21 is a diagram illustrating a method according which the pixel value conversion means 106 performs the pixel value conversion process for the intermediate image 2.

For an intermediate image 300 (intermediate image 2) illustrated in FIG. 21(A), a checkerboard-pattern image 310 illustrated in FIG. 21(B) is prepared. The checkerboard-pattern image (checker-pattern image) 310 is composed of white regions 311W and black regions 311B that are alternately disposed like a matrix, and its size is the same as that of the intermediate image 300. The size of the white region (colorless part) 311W and the black region (colored part) 311B is the same as that of the embedding regions, and their positions are the same as the alignment position of the embedding regions.

The pixel value conversion means 106 performs the conversion in which, in the pixels in the intermediate image 300, the region corresponding to the colored part of the checkerboard pattern image 320 is subjected to an inverting process. As a result, as illustrated in FIG. 21(C), a pixel value converted image 320 forming an approximately stripe pattern as a whole is obtained.

The output means 107 performs the format conversion of the pixel value converted image 320 (encrypted image 320) as needed and outputs it. It may be converted into another image format and output; or when there is no particular need for conversion, the encrypted image 320 may be output in the format without change, or it may be converted into electronic-document data such as a Microsoft Office document and Adobe PDF document or into non-image data such as HTML and XML. In addition, it may be output in the form of presentation on a display or printing on a physical medium such as paper.

The pixel value conversion process is performed using the checkerboard-pattern image 310 composed of the white regions 311W and the black regions 311B in the same arrangement pattern as the arrangement pattern of the embedding regions in encryption key-related information. Therefore, on the side that decrypts the encrypted image, it becomes possible to detect the detail positions of the borderlines between the respective embedding regions into which encryption key-related information is embedded, on the basis of the stripe pattern of the encrypted image (pixel value converted image 320).

Figure 22:
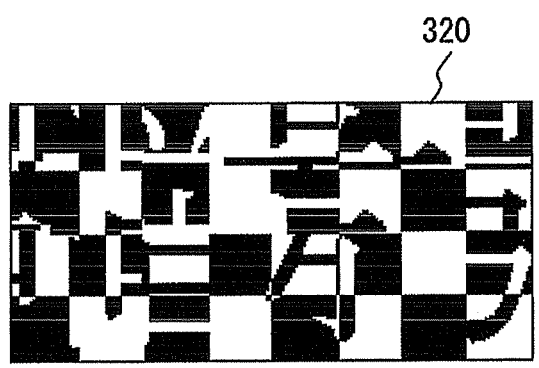
FIG. 22 is a diagram illustrating an encrypted image generated by the first embodiment of the image encryption apparatus of the present invention. Other inversion patterns are illustrated in FIG. 16.

Thus, data input to the image encryption apparatus 100 is converted within the image encryption apparatus 100 into the encrypted image 320 (pixel value converted image 320) illustrated in FIG. 22, by the processes in the input means 101, encryption region specifying means 102, image conversion means 103, key-related information generation means 104, information embedding means 105 and pixel value conversion means 106.

In other words, the image encryption apparatus 100 converts the input data into an input image 110 illustrated in FIG. 6 using the input means 101. Then, image processing is performed to the input image 110 to covert it sequentially into the intermediate image 1, intermediate image 2 and encrypted image. Then, ultimately, the encrypted image 320 of the input image 110 is generated.

[Operation]

Next, the operation of the first embodiment of the image encryption apparatus of the present invention in the configuration described above is explained.

Figure 23:
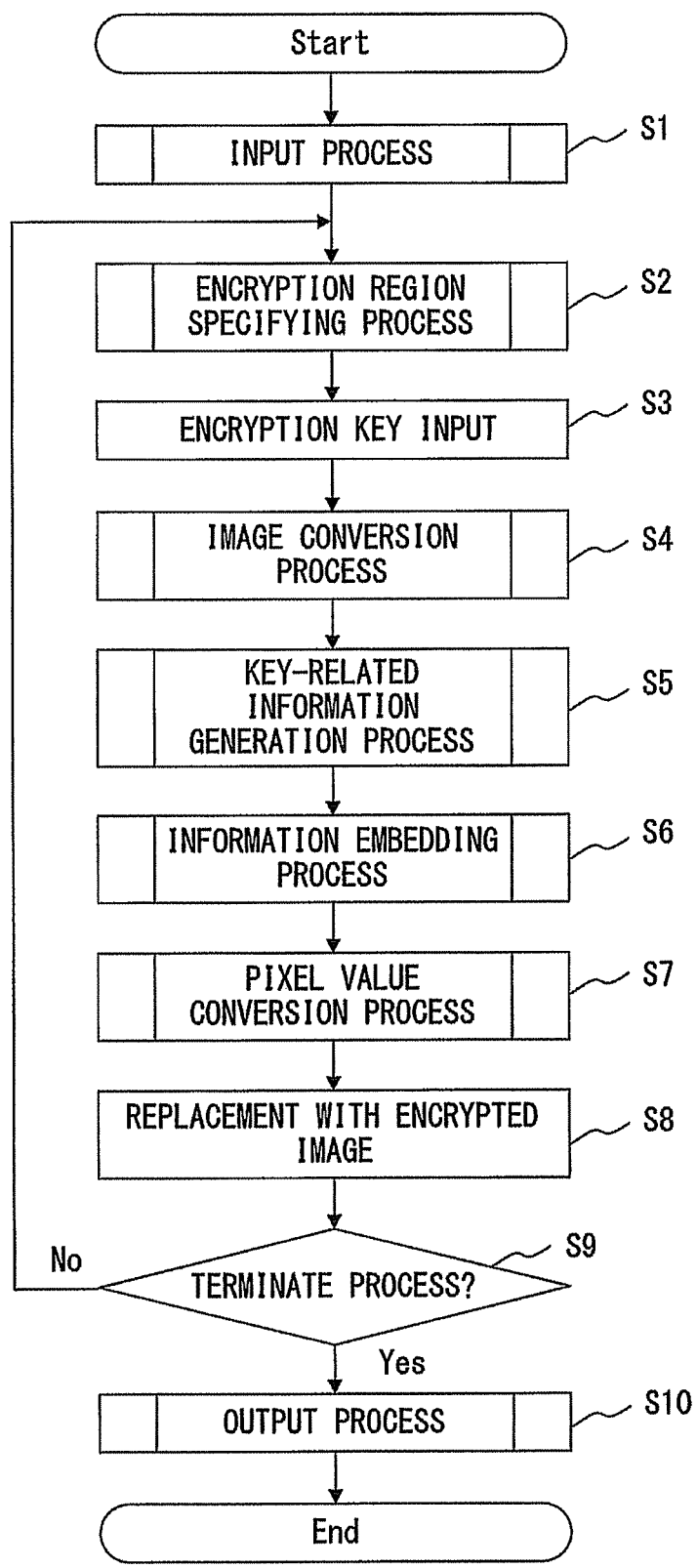
FIG. 23 is a diagram illustrating the entire process in the first embodiment of the image encryption apparatus of the present invention.

FIG. 23 is a flowchart illustrating the entire processes of the image encryption apparatus 100.

First, an input process of obtaining input data by the input means 101 and performing format conversion as needed is performed (S1).

The input data for the apparatus 100 may be, image data, or may be electronic document data such as Microsoft Office documents and Adobe PDF document, or non-image data such as HTML and XML. In addition, in a case of an image printed or drawn on a physical medium such as paper, the input can also be performed by reading it by an optical device such as a scanner and digital camera.

Figure 24:
FIG. 24 is a diagram illustrating a specifying means of an encryption region.

The input means 101 converts a part or the entirety of the input data into an image (input image) in a format that is suitable for the encryption process such as the uncompressed bitmap format, and outputs it to the encryption region specifying means 102. An example of the input image 110 is illustrated in FIG. 24.

Next, an encryption user performs an encryption region specifying process for specifying a region to be encrypted in the input image (S2).

The user (hereinafter, referred to as an encryption user) generating an encrypted image specifies, when the region to be encrypted exists in the input image, the encryption region.

Next, the encryption user inputs an encryption key (S3).

By this input, the image encryption apparatus 100 starts the encryption process.

A method of specifying the encryption regions is illustrated in FIG. 24. In this example, the encryption region 111 is specified in a rectangle shape. The shape for specifying the encryption region is not limited to the rectangle shape, and various shapes may be specified.

Meanwhile, when the encryption-target region does not exist in the input image, the encryption user does not specify the encryption region. In this case, the input image is output without change and the process is terminated.

The encryption key may be, for example, a password. Numerals, character strings and the like can be used for the password. The encryption key input by the encryption user is converted into binary data, and used for the encryption process of the input image.

Figure 25:
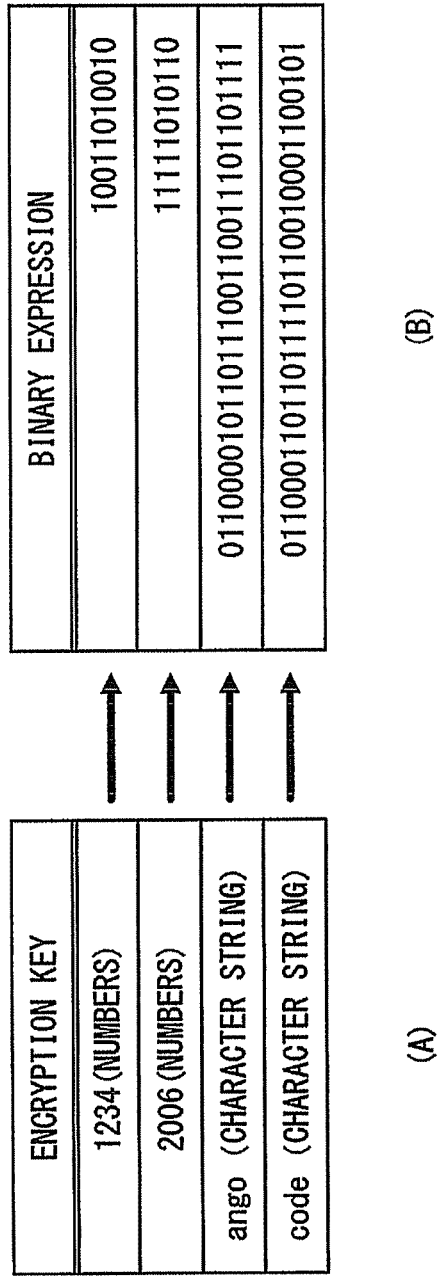
FIG. 25 is a diagram illustrating an example of an encryption key and binary data generated by the encryption key.

An example of the encryption key and the binary data generated from the encryption key is illustrated in FIG. 25.

As illustrated in FIG. 25(A), the encryption key is, for example a numeric value or character string. In a case in which the encryption key is a numeric value "1234", when it is converted into unsigned binary, binary data "10011010010" illustrated in FIG. 25(B) is obtained. Meanwhile, when the encryption key is a character string "ango", by converting it into, for example, ASCII codes, 32-bit binary data "01100001011011100110011101101111" illustrated in FIG. 25(B) is obtained. In the following description, a case in which the numeric value "1234" is input as the encryption key is explained. That is, it is assumed that the encryption key is processed as binary data "10011010010".

Next, by the image conversion means, an image conversion process in which the image in the encryption-target region is converted so that the original contents become unrecognizable is performed (S4).

The image conversion process is explained with reference to FIG. 26 and FIG. 27.

Figure 26:
FIG. 26 is a diagram (part 1) illustrating an image conversion process by image conversion means.

First, as illustrated in FIG. 26, an image 120 (hereinafter, referred to as the encryption-region image 120) in the encryption region 111 in FIG. 24 is divided in a grid pattern. By this, the encryption-region image 120 is divided into a plurality of minimal regions 121. Further, as illustrated in FIG. 27(A), the encryption-region image 120 is divided into eight units of segment 121C in the column direction that is a group of the minimal regions 121 in the column direction. Then, the respective segments 121C are exchanged in units of adjacent segments, from left to right with sequential slide, in accordance with the upper seven bits ("1001101") of the encryption key 130 ("10011010010" illustrated in FIG. 27(B), generating an image 140 illustrated in FIG. 27(C). Next, as illustrated in FIG. 27(C), the image 140 is divided into three units of segment 141R that is a group of the minimal regions 121 in the row direction. Then, the respective segments 141R are exchanged in units of adjacent segments, from top to bottom with sequential slide, in accordance with the upper three bits ("100") of the encryption key 130, generating an intermediate image 150 (intermediate image 1) illustrated in FIG. 27(D). Thus, the encryption-region image 120 is converted into the intermediate image 150 (intermediate image 1) in which the original contents cannot be recognized, by performing exchange in the encryption-region image 120 in units of columns and lines in accordance with the encryption key 130.

FIG. 28 is a flowchart illustrating details of the image conversion process described above (process in step S4 in FIG. 23) performed by the image conversion means 103.

First, image conversion in units of columns is performed.

First, the leftmost column (the segment in the column direction described above) in the encryption-region image becomes the first target column, and the first one bit of the encryption key is obtained (S41). Whether the one bit is "0" or "1" is determined (S42). Then, when the one bit is "0", nothing is performed, and the process may proceed to step S44. On the other hand, in the case of "1", the first target column is exchanged with its next column on the right in units of columns (S43), and the process may proceed to step S44.

In step S44, whether the target column has moved to the column immediately preceding the rightmost column is determined, and if it has not reached the column, the target column is moved to the second column from the left (S45), and return to step S41 is performed.

In step S41, the second bit of the encryption key is obtained. Then, when the second bit is "0", nothing is performed, and in the case of "1", the second column and its next column on the right are exchanged in units of columns (S42-S43).

The processes in steps S41-S45 described above are repeated until, in step S44, it is determined that the target column immediately precedes the rightmost column.

By the processes described above, the encryption-region image 120 illustrated in FIG. 27(A) is converted into the image 140 illustrated in FIG. 27(C), in accordance with the encryption key 130.

When the exchange of columns in accordance with the encryption key 130 is completed as described above, processes in step S46-S50 are performed for the image generated by the column-exchange process described above.

In the processes in steps S46-S50, only the process target changes from the "columns" (segments in the column direction) to the "rows" (segments in the row direction), and the target row simply shifts downward by one row from the top row of in the image. The processes in steps S46-S50 are repeated until, in step S49, it is determined that the target row immediately precedes the last row in the image.

As described above, the columns and rows in the encryption-region image are exchanged in accordance with the encryption key, and converted into the intermediate image 1 in which the original contents cannot be recognized. The image conversion process of the encryption-region image by the image conversion means 103 may be any processing method as long as it is a method for making the original image contents unrecognizable on the basis of an encryption key. For example, processes such as exchange in units of minimal regions, inversion side to side and up and down, or rotation may be applied.

The explanation of the flowchart in FIG. 23 is continued.

Following step S4, an encryption key input by an encryption user is converted into encryption key-related information by the key-related information generation means 104 (S5). The encryption key-related information is generated from the encryption key for a security reason described below.

While information of an encryption key input by an encryption user is embedded into the encryption region in the immediate image 1, if the expression of the encryption key in a bit string is embedded without change, the risk of the encryption key being broken becomes very high. For this reason, in the apparatus 100, a countermeasure is implemented, for example, by performing hash transformation for the encryption key and embedding the hash value obtained by the transform into the encryption region.

For example, as illustrated in FIG. 29, hash transformation is performed for the encryption key using a hash function 330 with which the reminder of the division of the decimal value x of the encryption key by "143" (decimal number) is taken as the hash value, and the transformed value is embedded into the encryption region in the intermediate image 1 as the encryption key-related information. In the case of the example illustrated in FIG. 29, since the encryption key is "1234" (decimal-number expression), when the hash transformation is performed for it, "90" (decimal number) is obtained as a hash value. The key-related information generation means 1004 generates "encryption key-related information" from an "encryption key" using hash transformation as described above and the like.

Following step S5, an "information embedding process" is performed by the information embedding means 105, in which the encryption key-related information generated by the key-related information generation 104 is embedded into the minimal region (embedding region) in the image-target area divided by the image conversion means 103 (S6).

FIG. 30 is a flowchart illustrating details of the information embedding process.

First, a minimal region to be the target of the embedding of the encryption key-related information is extracted from the encryption region (encryption-region image) (S61). Next, "embedding information" to be embedded into the minimal region is obtained from the encryption key-related information, and an "information embedding" process to embed it into the minimal region is performed (S62).

A method of embedding the embedding information into the minimal region in the encryption region is illustrated in FIGS. 31-33.

The embedding information is obtained sequentially from the top bit of the encryption key-related information, the obtained number of bits corresponding to the number of bits that can be embedded into one minimal region. FIG. 31 is an example of embedding the embedding information into one minimal region bit by bit. As illustrated in FIG. 31(A), a hash value 203 is converted from "90" (decimal number) to binary data "1011010". Then, as illustrated in FIG. 31(B), the bits of the binary data are embedded into a minimal region 121 in the encryption region (encryption-region image 120) bit by bit sequentially from the top bit. At this time, the bit-by-bit embedding is performed sequentially from the upper left minimal region 121 in the encryption region.

FIG. 32 is a diagram illustrating a method of embedding the encryption key-related information into each minimal region 121 in the encryption region.

In the case of embedding information "1" (one-bit information" into the minimal region 121 illustrated in FIG. 32(A), the pixel values of the image in the minimal region 121 are all inverted, as illustrated in FIG. 32(B). In the case of embedding information "0", the pixel values of the image in the minimal region 121 are not changed, as illustrated in FIG. 32(C).

FIG. 33 is a diagram illustrating an order of obtaining the minimal region in the encryption region by the information embedding means 105.

As illustrated in FIG. 33, the information embedding means 105 obtains the minimal region 121 sequentially one by one by zigzag scanning moving from left to right starting from the leftmost minimal region 121 on the top line (highest row) in the encryption region (encryption-region image 120), and upon reaching the right end, moving to the left end of the line (row) immediately below.

The explanation of the flowchart in FIG. 30 is continued.

When the process in step S62 is completed, whether all information in the encryption key-related information has been embedded into the encryption region is determined (S63), and when all binary data in the encryption key-related information has not been embedded yet, return to step S61 is performed.

Thus, the processes in steps S61-S63 are repeated until all information in the encryption key-related information is embedded into the encryption region, and when it is determined, in step S63, all information in the encryption key-related information has been embedded into the encryption region, the process of the flowchart are terminated.

An intermediate image 300 (intermediate image 2) obtained as a result of the embedding of the encryption key-related information (in this example, the hash value 203) into the intermediate image 150 (intermediate image 1) in FIG. 27.

Meanwhile, in the present embodiment, information to be embedded into an encryption region is assumed to be encryption key-related information, but other information (such as a user ID) may be embedded along with the encryption key-related information, or the other information only may be embedded.

The explanation of the flowchart in FIG. 23 is continued.

Following step S6, a "pixel value conversion process" to convert the pixel values of the image (intermediate image 2) in the encryption region is performed by the pixel value conversion means 106 (S7).

The pixel value conversion means 106 performs conversion for the pixel values of the image in the encryption region, to make the image after the conversion form, for example, an approximately periodic pattern.

FIG. 35 is a flowchart illustrating details of the pixel value conversion process.

The definitions of variables used in the flowchart are described in FIG. 36.

In the flowchart, the lateral size of the minimal region 121 is assumed as m, and its longitudinal size is assumed as n. In addition, as illustrated in FIG. 36, the lateral size of the image (intermediate image 2) in the encryption region is assumed as w, and its longitudinal size is assumed as h. Further, as illustrated in FIG. 36, with respect to the image (intermediate image 300) in the encryption region, an XY-orthogonal coordinate system of which origin (0,0) is the left end of the top line, and the positive direction of the X axis is taken rightward, and the positive direction of the Y axis is taken downward. The values of the pixel (pixel values) in the position of coordinates (i,j) are expressed as P(i,j) in the encryption-region image for which the orthogonal coordinate system is set as described above.

The explanation of the flowchart in FIG. 35 is started.

First, 0 is set to i and j, and the process starts from the pixel of which coordinates (x,y) are (0,0) (S71). Next, (i/m+j/n) mod 2 is calculated, and whether the reminder of the calculation is "0" is determined (S72). In the case in which the reminder is 0 according to the result of the determination, the process may proceed to step S74 without any operation, and in the case of "1", the pixel values P(0,0) are inverted (S73). When the process in step S73 is completed, the process may proceed to S74.

Meanwhile, in the calculation performed in step S72, "i/m" represents the quotient (integer) of the division of i by m, and "x mod 2" represents the reminder of the division of x by 2. Therefore, "x mod 2" is 0 when x is an even number, and is 1 when the x is an odd number. Accordingly, the process in step S73 is performed for the minimal region 121 of which either of the row number or the column number only is an odd number. In other words, in an even-numbered row in the encryption region, the pixel values of the minimal region 121 in odd-numbered columns, and in an odd-numbered row, the pixel values of the minimal region 121 in even-numbered rows are inverted. By this, the image (intermediate image 2) in the encryption region is converted into an approximately periodic pattern.

In step S74, whether or not the coordinates (i,j) have reached the position of the rightmost pixel in the encryption region (whether i=w−1) is determined. Then, when it is determined that the coordinates (i,j) have not reached the rightmost pixel, the value of i is increased by one (S75), and return to step S72 is performed.

Thus, the processes in steps S72-S74 are repeated while increasing the value of i as 0, 1, 2, ... until, in step S74, it is determined that the target pixel has reached the rightmost pixel. Then, when it is determined in step S74 that it has reached the rightmost pixel, the process may proceed to step S76.

As described above, the conversion process of the pixel values are completed for all the pixels in the target line.

In step S76, whether the target pixel has reached the bottom line (whether j=h−1) is determined. Then, when it has not reached the bottom line, the value of j is increased by one (S77), and return to step S72 is performed. By this, the target line moves to the left end of the line immediately below, and the same processes are performed for all pixels in the line.

As described above, for all pixels in the encryption area, the pixel values are converted while performing sequential zig-zag scanning by line from left to right, top to bottom, starting from the leftmost pixel in the top line. Then, when it is determined in step S76 that the target pixel has reached the rightmost pixel of the bottom line, the process is terminated.

An encrypted image 320 generated by converting the pixel values of the intermediate image 300 by the pixel value conversion means 106 is illustrated in FIG. 37.

Meanwhile, the inversion process of pixel values by the pixel value conversion means 106 may be performed not only for a monochrome image but also for the case of a color image.

An inversion method for a color image is illustrated in FIG. 38.

For a monochrome image, as illustrated in FIG. 38(A), the inversion process is performed, for a black pixel, by converting it into a white pixel (by converting the pixel value from "0" to "255"), and for a white pixel, by converting it into a black pixel (by converting the pixel value from "255" to "0").

The inversion for a color image may be performed by independently inverting the pixel value of each color constituting the pixel value. For example, in the case of an image in the 24-bit RGB format, a pixel is composed of three pixel values of R (red), G (green), B (blue), as illustrated in FIG. 38(B). In the case of a 24-bit color image, eight bits (256 tones) are assigned to each color of RGB. In this case, as illustrated in FIG. 38(B), if the pixel values (R value, G value, B value) before conversion are (50,170,10), the pixel values of the respective colors are shifted to the mirror-symmetrical positions based on the intermediate value (on the coordinate axis, 127.5) of the 256 tones, and P' (205,85,245) are obtained as pixel values after inversion.

An example of the inversion of a color image is illustrated in FIG. 39. In a color image 710 in FIG. 39(B), rectangle regions being parts of a color image 700 in FIG. 39(A) are inverted. The two rectangle regions in the color image 710 indicated by the thick arrows in the drawing are the inverted parts. By using such an inversion method, pixel value conversion may be performed in a color image, in a similar manner as in a monochrome image.

The explanation of the flowchart in FIG. 23 is continued.

When the process in step S7 is completed, the input image is replaced with the encrypted image (S8). Next, whether or not to terminate the encryption process is determined (S9). With this determination, when there is another region to be encrypted in the input image, return to step S2 is performed, and the encryption process is continued.

On the other hand, when there is no other encryption-target region in the input image, the completion of the encryption process is determined, and the encrypted image at that time is subjected to format conversion as needed and output as output data (S10), and the process of the flowchart is terminated.

In the image encryption apparatus of the present invention, encryption for a plurality of regions in an input image may be performed. An example of it is illustrated in FIG. 40. In an encrypted image 800 illustrated in FIG. 40, images in two regions 801, 802 are encrypted.

[Second Embodiment of a Pixel Encryption Apparatus of the Present Invention]

Next, the second embodiment of the image encryption apparatus of the present invention is explained.

[Configuration]

FIG. 41 is a diagram illustrating the configuration of the second embodiment of the image encryption apparatus of the present invention. In FIG. 41, the same numerals are given to the same constituent elements as the constituent elements provided in the image encryption apparatus 100 illustrated in FIG. 5.

An image encryption apparatus 400 (a second image encryption apparatus) being the second embodiment of the image encryption apparatus of the present invention has input means 101, encryption area specifying means 102, information embedding means 403, key-related image generation means 104, image conversion means 405, pixel value conversion means 106, and output means 107.

In the image encryption apparatus 400, the processing order of the image conversion means and the information embedding means is inverse of that in the image encryption apparatus 100. Therefore, the image encryption apparatus 400 is configured so as to perform image conversion (scramble) after embedding encryption key-related information into an encryption region in an input image.

The process in the image encryption apparatus 400 configured above is explained. Meanwhile, the same processes as those in the image encryption apparatus 100 described above are explained briefly.

The input means 101 converts input data into an input image 110 illustrated in FIG. 42 in the same manner as in the image encryption apparatus 100. The encryption region specifying means 102 specifies an encryption region 111 with respect to the input image 110, as illustrated in FIG. 42.

The encryption key-related information generation means 104 converts an encryption key 130 ("10011010010") to encryption key-related information. The generation is performed by encryption, hash transformation and the like as illustrated in FIG. 43. In the example in FIG. 43, encryption key-related information 161 is generated by encryption, and encryption key-related information 162 is generated by hash transformation.

The information embedding means 403 embeds encryption key-related information 200 (in this example, "1011010") illustrated in FIG. 44(A) into a minimal region (embedding region) 501 in an encryption region 500 using, for example, the first method of embedding encryption key-related information described above. The encryption region 500 is divided into minimal regions 501 in a similar manner as in the encryption region 120 described above.

In accordance with the encryption key-related information 200 (bit string), in the minimal regions 501 in the top line in the encryption region 500, the information embedding means 403 inverts the minimal regions 501 that corresponds to the bit "1", and leave the minimal regions 501 that correspond to the bit "0" as they are. By the process above, the information embedding means 403 generates intermediate image 600 (intermediate image 1) illustrated in FIG. 45.

The image conversion means 405 performs an exchange process of segments 601C in eight columns in the intermediate image 600 illustrated in FIG. 46(B) in accordance with the upper seven bits ("1001101") of the bit string of the encryption key 130 ("10011010010") illustrated in FIG. 46(A), to generate an image 610 illustrated in FIG. 46(C). Next, in accordance with the upper three bits ("100") of the encryption key 130, an exchange process of segments 611R in four rows in the image 610 is performed, to generate intermediate image 620 (intermediate image 2) illustrated in FIG. 46(D). Thus, the image conversion means 405 ultimately generates the intermediate image 620 (intermediate image 2) illustrated in FIG. 47.

The pixel value conversion means 106 converts the intermediate image 620 (intermediate image 2) illustrated in FIG. 48(A) into a pixel value converted image 630 illustrated in FIG. 48(C) referring to a checkerboard-pattern image 310 illustrated in FIG. 48(B). However, in an operation system in which distortion and degradation of the encrypted image input to the image decryption apparatus is very small, that is, in a case in which an encrypted image generated in the image encryption apparatus is input to the image decryption apparatus while being kept as digital, or in a case in which the encrypted image is printed by a high-performance printer and read by a high-performance scanner, the position of the encryption region may be specified at the time of the decryption without the pixel-value conversion. In such a case, the pixel-value conversion may be omitted.

The output means 107 performs the format conversion of the pixel value converted image 630 (encrypted image 630) as needed and output it. When the output in the same format as the pixel value converted image 630 is desired, it may be output without change; or it may be converted into another image format and output; or when there is no particular need for conversion, the encrypted image 630 may be output in the format without change, or it may be converted into electronic-document data such as a Microsoft Office document and Adobe PDF document or into non-image data such as HTML and XML. The data output here is output from the image encryption apparatus 400 as output data.

Thus, data input to the image encryption apparatus 400 is converted into the encrypted image 630 (pixel value converted image 630 in FIG. 48(C)) illustrated in FIG. 49, by the processes in the input means 101, encryption region specifying means 102, information embedding means 403, key-related information generation means 104, image conversion means 405, pixel value conversion means 106 and output means 107 disposed within the image encryption apparatus 400.

In other words, the image encryption apparatus 400 converts the input data into the input image 110 illustrated in FIG. 42 using the input means 101. Then, image processing is performed to the input image 110 to covert it sequentially into the intermediate image 1, intermediate image 2 and encrypted image. Then, ultimately, the encrypted image 320 of the input image 630 is generated.

[Operation]

The operation of the image encryption apparatus 400 configured as described above is explained.

FIG. 50 is a flowchart illustrating the entire processes of the image encryption apparatus 400. In FIG. 50, the same step numbers are assigned to the steps of which processing contents are the same as those in the flowchart in FIG. 23 described above. In the following explanation, the processes that are different from those in the flowchart in FIG. 23 are explained with emphasis, and the explanation of the same processes as those in FIG. 23 is simplified or omitted.

As is apparent from the comparison of the flowcharts in FIG. 50 and FIG. 23, the early process procedure (steps S1-S3) in the image encryption apparatus 400 is the same as that in the image encryption apparatus 100. In addition, the late process procedure (steps S7-S10) is also the same as that in the image encryption apparatus 100.

The image encryption apparatus 400 inputs an encryption key in step S3, and next, performs the "key-related information generation process" to generate encryption key-related information (S5). The key-related information generation process is a similar process to the key-related information generation process in the image encryption apparatus 100, which is a process of generating encryption key-related information from the input encryption key.

Next, by the information embedding means 403, the "information embedding process" to embed the encryption key-related information into the input image input in step S1 is performed (S106).

The information embedding process is explained. Here, it is assumed that an input image 110 illustrated in FIG. 51 is input, and in S2, an encryption region 111 is specified with respect to the input image 110. The information embedding means 403 divides the encryption region 11 into eight pieces in the column direction and four pieces in the row direction as illustrated in FIG. 52, to divide the encryption region 111 into 32 pieces of rectangle minimal regions 111a. Then, the encryption key-related information mentioned above is embedded into these minimal regions 111a.

The algorithm of the embedding process of the encryption key-related information is the same as the algorithm illustrated in the flowchart in FIG. 30 described above executed by the information embedding means 105 of the image encryption apparatus 100.

The image encryption apparatus 400 and the image encryption apparatus 100 differ with respect to the image to be the target of the embedding of encryption key-related information. The information embedding means 105 of the image encryption apparatus 100 embeds encryption key-related information into the intermediate image 1, whereas the information embedding means 403 of the image encryption apparatus 400 embeds encryption key-related information into the image in the encryption region 111 in the input image 110.

A method of embedding image encryption key-related information into the encryption region 111 by the information embedding means 403 is illustrated in FIG. 53.

In the example illustrate in FIG. 53, the hash value 162 ("1011010") is used as the encryption key-related information as illustrated in FIG. 53(A). Then, the bit string of the hash value 162 is embedded into the minimal regions 111a of in the encryption region 111 bit by bit sequentially from the top bit. The selection order of the minimal regions 111a in this case is similar to that in the case of the information embedding means 105 of the image encryption apparatus 100.

An example of embedding a bit in the hash value 162 into the minimal regions 111a in the encryption region 111 is illustrated in FIG. 54. FIG. 54 illustrates an example of embedding the top bit of the hash value 162 into the leftmost minimal region 111a in the top line (highest row) of the encryption region 111.

In the case of embedding a top bit "1" into the minimal region 111a illustrated in FIG. 54(A), as illustrated in FIG. 54(B), the pixel values of the image in the minimal region 111a are inverted. In the case of embedding a top bit "0", the image in the minimal region 111a is left as it is without change.

Since the top bit of the hash value 162 in this example is "1", the image in the leftmost minimal region 111a in the highest row in the encryption region 111 is converted as illustrated in FIG. 54(B). The pixel values of the images in the other minimal regions 111a in the encryption region 111 are also processed in a similar manner in accordance with the value of the bit to be embedded.

An intermediate image 600 (intermediate image 1) that the information embedding means 403 generated by embedding the hash value 162 ("1011010") into the minimal regions 111a in the encryption region 111 is illustrated in FIG. 55.

Meanwhile, in the present embodiment, information to be embedded into an encryption region is assumed to be encryption key-related information, but other information (such as a user ID) may be embedded along with the encryption key-related information, or the other information only may be embedded.

The explanation of the flowchart in FIG. 50 is continued.

When the process in step S106 is completed, an "image conversion process" for the intermediate image 1 is performed by the image conversion means 405 (S107).

The algorithm of the image conversion process is the same as the algorithm illustrated in the flowchart in FIG. 28 described above. In the case of the image encryption apparatus 400, unlike the image encryption apparatus 100, the image conversion process is performed not for the "input image" but for the "intermediate image 1". The image conversion process is performed using the method illustrated in FIG. 46 described above, and by this process, the intermediate image 620 (intermediate image 2) illustrated in FIG. 47 described above is generated.

Next, a "pixel value conversion process" is performed for the intermediate image 2 by the image conversion means 106 (S7). The algorithm of the pixel value conversion process is the same as the algorithm illustrated in the flowchart in FIG. 35. By the pixel value conversion process, the encryption-region image 620 illustrated in FIG. 49 described above is obtained.

The output means 107 performs the format conversion of the pixel value converted image 620 (encrypted image 620) as needed and outputs it. It may be converted into another image format and output; or when there is no particular need for conversion, the encrypted image 620 may be output in the format without change, or it may be converted into electronic-document data such as a Microsoft Office document and Adobe PDF document or into non-image data such as HTML and XML. In addition, it may be output in the form of presentation on a display or printing on a physical medium such as paper. The data output here is output from the image encryption apparatus 400 as output data.

After that, the processes in steps S8-S10 illustrated in the flowchart in FIG. 23 described above are performed, encrypting the image in the encryption region in the input image specified by the encryption user, and the process is terminated at the time when there is no more specification of the encryption region. As described above, the image in the encryption region in the input image specified by the encryption user is encrypted. Thus, by the image encryption apparatus 400, a color encrypted image 710 as illustrated in FIG. 39(B) described above and an encrypted image 800 as illustrated in FIG. 40 described above in which the images in a plurality of encryption regions 801 and 802 are encrypted, are generated.

As described above, according to the image encryption apparatus of the present embodiment, since encryption key-related information is embedded within an encryption region, even when there is no margin apart from the encryption region, encryption key-related information can be embedded within an image (referring to both a printed matter and a digital image). In addition, since encryption key-related information is embedded using an embedding method that is highly resistant to distortion, at the time of decryption, encryption key-related information can be detected accurately even from an image that has gone through a process such as printing, copying and scanning. Therefore, it becomes possible to provide, at the decrypting side, a function to perform user authentication based on the detected encryption key-related information, so as to enable only a user having a legitimate right can restore and view the original image.

[Image Decryption Apparatus]

The image decryption apparatus of the present invention is described.

[First Embodiment of the Image Decryption Apparatus of the Present Invention]

The first embodiment of the image decryption apparatus of the present invention is explained. The image decryption apparatus is an apparatus decrypting an encrypted image generated by the first embodiment of the image encryption apparatus of the present invention (image encryption apparatus 100).

[Configuration]

FIG. 56 is a diagram illustrating the first embodiment of the image decryption apparatus of the present invention.

An image decryption apparatus 1000 (first image decryption apparatus) being the first embodiment of the image decryption apparatus of the present invention has an input means 100X, encrypted position detection means 1001, pixel value conversion means 1002, embedded information detection means 1003, key-related information generation means 1004, authentication means 1005, embedded information removal means 1006, image conversion means 1007 and output means 1008.

The input means 100X obtains input data, performs format conversion as needed, and gives it to the next process as an input image.

The encrypted position detection means 1001 detects an encryption region in the input image, and further detects the positions of borderlines within the encryption region.

For example, when an encrypted image 1100 as illustrated in FIG. 57 is input, in order to decrypt the encrypted part, the position of the encryption region 1110 (corresponds to the encrypted image 320 in FIG. 22 in this example) needs to be recognized first. However, it is not sufficient just to recognize the position, and the decryption is impossible unless the positions of borderlines 1111C, 1111R in the column direction and the row direction used in the process such as scrambling performed at the time of the encryption. Here, the borderlines 1111C in the column direction are borderlines between segments in the column direction to be the target of the scrambling, and the borderlines 1111R is borderlines between segments in the row direction to be the target of the scrambling (see FIG. 8).

The pixel value conversion means of the image encryption apparatus performs a process of periodically converting pixel values, so, as illustrated in FIG. 58, the position of the encryption region and the positions of the border lines can be specified by performing frequency analysis of the pixel values on the sections in the longitudinal and lateral directions. In addition, when there are a plurality of encryption regions in an encrypted image, plural detection is also possible.

FIG. 58 is a diagram illustrating a method with which the encrypted position detection means 1001 performs frequency analysis of the encrypted image 1100 to detect the borderlines 1111C, 1111R in the encrypted region 1110.

As illustrate in FIG. 58, for the image in the encryption region 1110, a section line 1113R in the lateral direction and a section line 1113C in the longitudinal direction are drawn, and the values of the pixels on the section lines of the images in the encryption region 1110 are obtained. The pixel value is, maximum for white (for example, "255") and minimum for black (for example, "0"). As a result, as illustrated in FIG. 58, a waveform 1115C for the lateral direction, and a waveform 1115R for the longitudinal direction are obtained. The borderline 1111C and the borderline 1111R are detected, for example, using a known art of performing frequency analysis of the waveform 1115C and the waveform 1115R. Meanwhile, when there are a plurality of encryption regions in the encrypted image 1100, the positions of the encryption regions and the positions of borderlines are detected for all the encryption regions.

Meanwhile, a method for performing frequency analysis of the encrypted image 1100 to detect the encryption region 1110 is illustrated in FIG. 23 of patent document 1. Since the encryption region 1110 has a higher periodicity than other regions in the encrypted image 1100, the encryption region 1110 can be detected by checking the periodicities of the entire regions of the encrypted image 1100.

The pixel value conversion means 1002 performs the cancellation of the pixel value conversion that the pixel value conversion means 106 of the image encryption apparatus 100 performed to generate the encrypted image from the intermediate image 2. For example, in a case in which conversion to a checkerboard pattern as illustrated in FIG. 21 was performed when generating the encrypted image, the cancellation of the pixel value conversion can be performed by undoing the pixel value conversion (conversion to the checkerboard pattern) using the method illustrated in FIG. 59.

FIG. 59 is a diagram illustrating a method with which the pixel value conversion means 1002 cancels the pixel value conversion (conversion to a checkerboard pattern) performed for an encrypted image.

In the encrypted image 1100 illustrated in FIG. 59(A), referring to a checkerboard-pattern image 1310 illustrated in FIG. 59(B) (same as the checkerboard-pattern image 310 that the pixel value conversion means 106 of the image encryption apparatus 100 referred to), the pixel values of the parts corresponding to the regions defined with the black color in the checkerboard-pattern image 1310 of the encrypted image 1100 are all inverted. As a result, intermediate image 1200 (intermediate image 2') illustrated in FIG. 59(C) is generated.

However, in a case in which the pixel value conversion means is not implemented in the image encryption apparatus 100, the pixel value conversion means 1002 in the image decryption apparatus 1000 may be omitted.

The intermediate image 1200 (intermediate image 2') is illustrated in FIG. 60. The intermediate image 1200 is the same image as the intermediate image 620 (intermediate image 2) generated by the image encryption apparatus 100, while, before the encrypted image 1100 is input into the apparatus 1000, an image process performed for the intermediate image 620 (intermediate image 620), printing, copying or intervention of a scanner may cause a noise or distortion.

The embedded information detection means 1003 detects the encryption key-related information embedded at the time of the encryption from the intermediate image 1200 (intermediate image 2') restored by the pixel value conversion means 1002.

The first through fourth embedding methods have been described as the methods with which the information embedding means 105 of the image encryption apparatus 100 embeds the encryption key-related information, and described below are the detection methods for the encryption key-related information in the cases in which the respective embedding methods are used.

<Detection Method for Encryption Key-Related Information in Accordance with the First Embedding Method>

The first embedding method is a method for embedding encryption key-related information by changing the pixel values in a certain prescribed region (specific region) within an embedding region. In the case of this method, if the pixel values in the specific region are changed, it is supposed that, in the vicinity of the borderlines of the region, a difference (edge) in the pixel values is always generated between inside and outside.

A detection method for encryption key-related information embedded using the first embedding method is described in FIG. 61.

The presence/absence of an edge in the vicinity of the borderlines of a specific region in an embedding region (minimal region) is detected, and it is determined that, for a specific region having an edge as the specific region 1201 illustrated in FIG. 61(A), the bit information of "1" is embedded, and for a specific region having no edge as the specific region 1202 in FIG. 61(B), the bit information of "0" is embedded. By this, each bit value in the bit string of the encryption key-related information embedded in the embedding region can be detected.

<Detection Method for Encryption Key-Related Information in Accordance with the Second Embedding Method>

The second embedding method is a method for embedding encryption key-related information by inverting the pixel values in an embedding region. In the case of this method, each bit value in the bit string of the encryption key-related information embedded in the embedding region can be detected by calculating the black-pixel rate in the embedding region.

A detection method for encryption key-related information embedded using the second embedding method is described in FIG. 62.

For an embedding region in which the black-pixel rate exceeds a threshold value as an embedding region 1211 illustrated in FIG. 62(A), it is determined that the pixel values were inverted at the time of the embedding, and that "1" is embedded in the embedding region. Meanwhile, for an embedding region in which the black-pixel rate is below the threshold value, it is determined that the pixel values have not been inverted, and that "0" is embedded in the region. Thus, the values in the bit string of encryption key-related information embedded in an embedding region can be detected.

<Detection Method for Encryption Key-Related Information in Accordance with the Third Embedding Method>

The third embedding method is a method for embedding encryption key-related information by inverting the pixel values of an embedding region in a region defined by a pattern associated with a partial bit string of encryption key-related information. In the case of this method, the partial bit string embedded into the embedding region can be detected by detecting an edge part in the embedding region being the target of the detection, and by examining the inversion pattern corresponding to the edge part.

FIG. 63 illustrates a detection method for encryption key-related information embedded using the third embedding method.

A case of detecting a partial bit string of encryption key-related information from an embedding region 1221 illustrated in FIG. 63(A) is considered. In this case, it is supposed that one of the respective patterns of the four inversion patterns 191-194 illustrated in FIG. 63(B) is embedded into the region 1221. Therefore, as illustrated in FIG. 63(C), whether an edge exists on the same positions of the edges of the colored parts 191b-194b defined in the respective inversion patterns 191-194 is examined in colored parts 1221a-1221d (regions enclosed with broken-lined rectangle frames in the drawing) to which the colored parts 191b-194b in the embedding region 1221 correspond. In the case of this example, since an edge is detected in the lower left as illustrated in FIG. 63(D), on the basis of the inversion pattern 193 corresponding to the edge, it is found that a bit string "10" is embedded in the embedding region 1221d. Encryption key-related information can be detected by performing such a process for all embedding regions.

<Detection Method for Encryption Key-Related Information in Accordance with the Fourth Embedding Method>

The fourth embedding method is a method for embedding encryption key-related information by an electronic watermark. In this case, encryption key-related information embedded into intermediate image 2' can be detected using a predetermined detection method in the electronic watermark technique. For the details of this method for detecting encryption key-related information, see the detection method in accordance with the watermark embedding method disclosed in patent document 3 mentioned above.

The embedded information detection means 1003 detects encryption key-related information from intermediate image 2' by an extraction method in accordance with the embedding method for the encryption key-related information used by the information embedding means 105 of the image encryption apparatus 100.

The key-related information generation means 1004 converts a decryption key input by a decryption user of the encrypted image into decryption key-related information, in accordance with a certain rule. The decryption key is the same as the encryption key used for the generation of the encrypted image. The key-related information generation means 1004 performs the same process as that of the key-related information generation means 104 of the image encryption apparatus 100, to generate decryption key-related information.

The authentication means 1005 checks whether the user (hereinafter, referred to as a decryption user) currently attempting the decryption of the encrypted image has a legitimate right to view the original image, by crosschecking the encryption key detected by the embedded information detection means 1003 with the decryption key-related information generated by the key-related information generation means 1004. When the two match, the authentication means 1005 authenticates the user. When the two do not match, the decryption user is not authenticated. The authentication is based on the logic (1) described below.

(1) The key-related information generation means 104 of the image encryption apparatus 100 and the key-related information generation means 1004 of the image decryption apparatus 1000 respectively generate encryption key-related information and decryption key-related information by applying the same algorithm to the encryption key and the decryption key. Therefore, if the decryption key is the same as the encryption key, the encryption key-related information and the decryption key-related information is obviously expected to match.

When the encryption key-related information and the decryption key-related information match, authentication is given, and the subsequent processes are continued. On the other hand, when they do not match, authentication is not given, and the restoration of the original image is cancelled.

The embedded information removal means 1006 performs, when the authentication is given in by the authentication means 1005, a process for restoring the original pixel values that were changed when the encryption key-related information was embedded in to the intermediate image 1, to generate intermediate image 1'. Meanwhile, in the case in which the information was embedded by the image encryption apparatus 100 using the electronic watermark, since the embedding has been performed so as not to affect the appearance, the removal of the embedded information is not compulsory. The intermediate image 1' corresponds to the intermediate image 1 (see FIG. 27) generated by the image encryption apparatus 100. For the intermediate image 1', as well as the intermediate image 2', there is a possibility that a noise or distortion is generated in it, due to the input into the image decryption apparatus 1000 performed through a process such as printing, copying, scanning and the like.

The image conversion means 1007 restores the original image (raw image) from the intermediate image 1' using an inverse conversion method in accordance with the conversion method that the image conversion means 103 of the image encryption apparatus 100 used for the intermediate image 1.

FIG. 64 is a diagram illustrating a method with which the image conversion means 1007 restores the original image from the intermediate image 1'.

It is assumed that an intermediate image 1400 (intermediate image 1') illustrated in FIG. 64(A) has been generated by the embedded information removal means 1006. In addition, it is assumed that the encryption key is "10011010010". This is equal to the encryption key used in the image encryption apparatus 100.

The image conversion means 1007 first performs, as illustrated in FIG. 64(A), a row exchange process for four segments 1401R in the row direction in the intermediate image 1400 using the upper three bits ("100") of the encryption key, to generate an image 1410 illustrated in FIG. 64(C). Next, as illustrated in FIG. 64(C), a column exchange process for segments 1411C in the column direction in the image 1410 is performed using the upper seven bits ("1001101"), to generate an image 1500 illustrated in FIG. 64(D).

As a result, by the image conversion means 1007, the original image (raw image) 1500 illustrated in FIG. 65 is restored.

The output means 1008 performs format conversion of the image decrypted as described above as needed, and outputs it as output data.

[Operation]

The operation of the image decryption apparatus 1000 configured as described above is explained.

FIG. 66 is a flowchart illustrating the entire processes of the image decryption apparatus 1000.

Input data is input to the apparatus 1000 by a user (hereinafter, referred to as a decryption user) attempting to decrypt an image in an encryption region of an encrypted image generated by the image encryption apparatus 100 to view the contents of the original image (raw image) of the encrypted image.

The input means 100X performs format conversion of the input data as needed, and provides it as an input image for the subsequent processes (S101). The input data may be, for example, image data, electronic document data such as Microsoft Office documents and Adobe PDF document, or non-image data such as HTML and XML. In addition, in a case in which the encryption target is printed or drawn on a physical medium such as paper, it can be treated as input data by reading it by an optical device such as a scanner and digital camera.

The encrypted position detection means 1001 performs an "encrypted position detection process" for detecting the position of an encryption region included in the input image and borderline information of respective minimal regions in the encrypted region (S102).

The details of the encrypted position detection process are explained with reference to FIGS. 67-71.

FIG. 67 is a diagram illustrating the outline of the encrypted position detection process.

The encrypted image detection process is divided into two main stages: first, as illustrated in FIG. 67(A), a rough position 1113 of an encryption region 1110 is identified. Next, on the basis of the rough position 1113, as illustrated in FIG. 67(B), borderlines 1111C in the longitudinal direction and border lines 1111R in the lateral direction in the encryption region 1110 are detected.

FIG. 68 is a diagram illustrating a method for detecting the rough position of the encryption region 1110.

Since the pixel values in the encryption region 1110 have been changed periodically by the process in the pixel value conversion means 106 in the image encryption apparatus 100, the rough image of the encryption region 1110 can be identified by performing frequency analysis for the entirety of the encrypted image 1100. For the encrypted image 1100 illustrated in FIG. 68(A), frequency analysis is performed by FFT (Fast Fourie Transformation) and the like in its longitudinal direction and lateral direction.

By this, as illustrated in FIG. 68(B), a region 1120 having a high periodicity and a region 1130 having a low periodicity are detected for the encrypted image 1100. When frequency analysis is performed, the power of the frequency corresponding to the period at the time when the pixel conversion was performed in the course of encryption tends to be prominently strong. For this reason, by performing the frequency analysis of the encrypted image 1100, the rough position of the encryption region 1110 and the periodicity of a borderline can be detected. Therefore, by the frequency analysis, the periodicity of borderlines 1115 in the encryption region 1110 can also be detected, as illustrated in FIG. 69(A).

However, with the information obtained by the frequency analysis only, the periodicity of the borderlines 1115 can be detected as illustrated in FIG. 69(A), but where those borderlines 1115 are located cannot be found.

For this reason, using a method illustrated in FIG. 70, the absolute positions of the borderlines 1115 are obtained.

In this method, first, on the basis of the position information of the borderlines 1115C obtained by the frequency analysis, a pattern 1140 (hereinafter, referred to as a periodic pattern 1140) having a periodicity illustrated in FIG. 70(A) is obtained.

Next, in a state in which the periodic pattern 1140 is overlapped with the encryption region 1110, the sum of the difference of the absolute values of the respective pixels of the images in the periodic pattern 1140 and the encryption region 1110 are examined while shifting their positions, to detect the absolute positions of the borderlines 1115. Details of this pattern-matching method are disclosed in patent document 3 mentioned above.

As described above, ultimately, as illustrated in FIG. 71, the borderlines 1111C, 1111R at the time when scrambling and the like was performed in the image encryption apparatus 100 can be obtained as illustrated in FIG. 71.

The explanation of the flowchart in FIG. 66 is continued.

The process branches off depending on whether or not an encryption region has been detected as a result of the encrypted position detection process in step S102 (S103).

When it is determined in step S102 that there is an encryption region, the encryption user is asked to input a key (decryption key) for decrypting the encryption region (S104), and move to the subsequent decryption processes is performed. As described later, when the same decryption key as the encryption key is input, the authentication as a proper decryption user is given, and the original image can be viewed. On the other hand, when it is determined in S103 that there is no encryption region, that is, no encryption region was detected in the process in step S102, the determination is presented to the user, and the process of the flowchart is terminated (S114).

When the decryption key is input by the decryption user in step S104, next, for the image in the encryption region, a "pixel value conversion process" for cancelling the pixel value conversion performed by the pixel value conversion means 106 of the image encryption apparatus 100 is performed (S105).

FIG. 72 is a diagram illustrating the pixel value conversion process performed by the pixel value conversion means 1002.

Since in the image 1110 in the region (encryption region) detected by the encrypted image detection means 1001 illustrated in FIG. 72(A), the pixel values was periodically converted at the time of the encryption, in order for the decryption, the conversion needs to be undone. For this reason, using a checkerboard-pattern image 1310 illustrated in FIG. 72(B) that the pixel value conversion means 106 of the image encryption apparatus 100 used for the pixel value conversion, a process to reset the converted pixel values is performed. In other words, in accordance with the colored regions (regions defined with the block color in the drawing) in the checkerboard-pattern image 1310, the pixel values of the encryption region 1110 are reset. For example, when the image in the encryption region 1110 is a monochrome image and the pixel values were inverted at the time of the encryption, the image before the pixel conversion can be restored by inverting the pixel values of the image in the encryption region 1110. Meanwhile, when the image in the encryption region 1110 is a color image, the original image can be restored by inverting the pixel values of the image in the encryption region 1110 by using, for example, the pixel value inversion method illustrated in FIG. 38 mentioned above. By the process as described above, the pixel value conversion performed for the image in the encryption region 1110 illustrated in FIG. 72(A) is canceled, and a pixel value converted image 1200 (intermediate image 2') illustrated in FIG. 72(C) is generated from the image in the encryption region 1110.

The explanation of the flowchart in FIG. 66 is continued.

The intermediate image 2' generated by the pixel value conversion process in step S105 is an image in which encryption key related information that was embedded at the time of the image encryption can be detected. In order to check whether the decryption key input by the decryption user is correct, the encryption key-related information being information about the encryption key to be crosschecked with the decryption key needs to be extracted from the intermediate image 2' in the encryption region.

For this reason, following step S105, a "key-related information detection process" for detecting encryption key-related information from the intermediate image 2' is performed by the embedded information detection means 1003 (S106).

FIG. 73 is a flowchart illustrating details of the key-related information detection process performed by the embedded information detection means 1003.

The process order in the flowchart in FIG. 73 is explained.

First, a minimal region to be the first detection target is obtained from the intermediate image 2' (S121). As described above, the borderlines (borderlines 1111C, 1111R) of the minimal regions in the encryption region 111 have already been detected as illustrated in FIG. 71 by the encrypted position detection process in step S102, the detection starts from the top leftmost region in the minimal regions divided by the borderlines.

The order of obtaining the minimal region in the image (intermediate image 2') in the encryption region in step S121 is illustrated in FIG. 74. In the intermediate image 1200 (intermediate image 2') illustrated in FIG. 74, a minimal region 1201 is the minimal region obtained first in step S121. After that, as illustrated on the right side in FIG. 74, the minimal region is obtained sequentially one by one with zigzag scanning performed in the order from left to right, top to bottom.

Following step S121, an "embedded information detection process" for detecting embedded information of the encryption key-related information (hereinafter, referred to briefly as "embedded information" for convenience) from the obtained minimal regions is performed (S122).

The detection of embedded information from each minimal region is performed by determining whether the ratio of the number of black pixels in the total number of pixels in the region is above a threshold value or is below the threshold value.

A specific detection method for detecting embedded information from the minimal regions is specified in FIG. 75.

In the example illustrated in FIG. 75, the "black pixel rate" is used as a benchmark for the detection of embedded information, and the threshold for detecting the bit information "1" is set to 50%. When the black pixel rate in a minimal region 1211a is below the threshold value as illustrated in FIG. 75(A), it is determined that "0" is embedded in the minimal region 1212w. On the other hand, when the black pixel rate in a minimal region 1211b is above the threshold value as illustrated in FIG. 75(B), it is determined that all pixel values in the minimal region 1211b were inverted at the time of the embedding of the embedded information, and that "1" is embedded.

The detection as described above is performed sequentially for all minimal regions 1201 in the intermediate image 1200 (intermediate image 2') with the zigzag scanning as descried on the right side in FIG. 74, and the embedded information detection process is terminated when the detected amount of the embedded information becomes equal to the size (number of bits) of the encryption key-related information. In the case of the present embodiment, the embedded information detection process is terminated when the encryption key-related information being the bit string of seven bits "1011010" is detected. Thus, as illustrated in FIG. 76, the encryption key-related information ("1011010") illustrated in FIG. 76(B) can be detected from the intermediate image 1200 (intermediate image 2') illustrated in FIG. 76(A).

Meanwhile, in the case in which other information (a user ID and the like) has been embedded together with the encryption key-related information, or only the other information has been embedded, the detection is performed for the amount of the information.

The explanation of the flowchart in FIG. 66 is continued.

FIG. 77 is a diagram illustrating the positioning of the decryption-user authentication at the time when the process of step S106 is completed.

As illustrated in FIG. 77, at the time when the process of step S106 is completed, both the decryption key 1231 (=1234 ("10011010010")) input by the decryption user and the encryption key-related information 1233 (=90("1011010")) detected from the image (intermediate image 2') in the encryption region have been obtained. However, since they cannot be compared directly, in order to perform the identity authentication of the encryption user, the decryption key also needs to be converted into decryption key-related information 1235 with a key-related information generation process 1240, to perform a an authentication process 1250 for crosschecking the encryption key-related information and the decryption key-related information.

For this reason, following step S106, a "key-related information generation process" for generating decryption key-related information from the decryption key input in step S104 is performed (S107).

An example of the key-related information generation process is illustrated in FIG. 78.

The example illustrated in FIG. 78 corresponds to a case in which the image encryption apparatus 100 uses hash transformation for the generation of the encryption key-related information.

In this case, for the generation of the decryption key-related information, in the same manner as in the generation of the encryption key-related information, the decryption key is converted into a hash value using a hash function 1260.

The hash function 1260 illustrated in FIG. 78 is represented by an expression hash=x mod 143.

Here, x is the decimal expression of the decryption key.

As illustrated in FIG. 78, when the decryption key x input by the decryption user is "1234" (decimal number), hash transformation is performed with the hash function 1260, and "90" (decimal number) is obtained as a hash value. By converting "90" into binary numbers, a binary bit string "1011010" is generated as the decryption key-related information.

When the process in step S107 is completed, an "authentication process" for crosschecking the decryption key-related information obtained in step S107 with the encryption key-related information detected in step S106 to authenticate the decryption user is performed (S108).

FIG. 79 is a flowchart illustrating the details of the authentication process performed by the authentication means 1005.

After the "encryption key-related information" from the embedded information detection means 1003 and the "decryption key-related information" from the key-related information generation means 104 are respectively input, the authentication means 1005 starts the process illustrated in the flowchart in FIG. 79.

The encryption key-related information and the decryption key-related information are crosschecked (S131), whether they match, that is, whether the user authentication has been successful or not is determined (S132). When it is determined in S132 that the user authentication has been successful, information "authentication succeeded" is stored in a storage means (not shown in the drawing), and the process is terminated (S133). On the other hand, when it is determined in S132 that the user authentication has failed, information "authentication failed" is stored in the storage means, and the process is terminated (S134).

The explanation of the flowchart in FIG. 66 is continued.

When the user authentication process in step S108 is completed, whether or not authentication has been given to the decryption user is determined on the basis of the information stored in the storage means (S109), and when the authentication has been given, it is determined that the decryption user is a user having the right to view the encrypted part, and move to the process in step S110 is performed. On the other hand, when the authentication was not given, it is determined that the decryption user is a user having no right to view, and, either of the process to notify the user of the determination, or to display a different matter from the original image such as a dummy image, advertisement, link, etc. is performed (S114), and the process is terminated.

Meanwhile, the configuration may also be made so that, in the user authentication process in step S108, the authentication fails if the authentication was not given even when the input of the decryption key is allowed for a given number of time, for example three times.

When it is confirmed in step S109 that the user authentication has been successful, that is, when it is confirmed that the decryption user is a user having the right to decrypt the encrypted image, the restoration process of the original image is performed.

First, an "embedded information removal process" for removing the encryption key-related information from the intermediate image 2' is performed by the embedded information removal means 2006 (S110).

FIG. 80 is a flowchart illustrating the details of the embedded information removal process.

First, one bit if obtained from the top of the bit string being the encryption key-related information (S141), and top leftmost minimal region in the intermediate image 2' to which the information of the obtained one bit is embedded, is obtained next (step S142).

The process is explained specifically with reference to FIG. 81.

As illustrated in FIG. 81(A), the top bit of the encryption key-related information 1231 (="1011010") is obtained (S141), and as illustrated in FIG. 81(B), the leftmost minimal region 1201 in the top line is obtained from the intermediate image 1200 (intermediate image 2') (S142).

Next, "embedded information removal" is performed for cancelling, in the obtained minimal region, the state with the embedded information (in this case, "1") being embedded is cancelled (S143).

A method of removing the embedded information is illustrated in FIG. 82. FIG. 82(A) illustrates a method of removing embedded information "1", and FIG. 82(B) illustrates a method of removing embedded information "0".

As illustrated in FIG. 82(A), in the case of a minimal region 1211a in which the information "0" is embedded, the pixel values were not changed when embedding the information, so the pixel values of the minimal region 1211a are not changed either for the cancellation. On the other hand, in the case of a minima region 1211b in which the information "1" is embedded as illustrated in FIG. 82(B), the pixel values in the minimal region were inverted for embedding the information, so the pixel values in the minimal region 1211b are converted to cancel (remove) information embedded in the minimal region 1211b.

Thus, in both of the cases illustrated in FIG. 82(A) and FIG. 82(B) in which either the information "0" or "1" has been embedded into the embedding region, the image in the embedding region can be reset (the embedded information can be cancelled).

When the process in step S142 is completed, whether or not the process to remove the entire information of the encryption key-related information from the intermediate image 2' has been completed is determined, and when it is determined that the process has not been completed, return to step S141 is performed. Then, the next piece of information in the encryption key-related information is obtained in step S141, and next, the next minimal region is obtained from the intermediate image 2' in step S142. Then, the embedded information removal process described above is performed in step S143.

Thus, the processes in steps S141-143 are repeated until it is determined in step S144 that the entirety of the encryption key-related information has been removed from the intermediate image 2'. Then, when it is determined in step S144 that the removal of the entirety of the encryption key-related information is completed, the process in the flowchart is terminated.

Thus, the entire encryption key-related information embedded in the intermediate image 1' can be removed (canceled) by performing the processes as described above for the number of time corresponding to the number of bits that is equal to the information amount of the encryption key-related information.

FIG. 83 is a diagram illustrating an example of the intermediate image 1' obtained as a result of the removal of the seven-bit encryption key-related information from the intermediate image 2'.

By removing the seven-bit encryption key-related information ("1011010") from the intermediate image 1200 (intermediate image 2') illustrated in FIG. 83(A), that is, by performing the removal of the information embedded in the consecutive seven minimal regions (embedding regions) 1201 from the left end of the top line of the intermediate image 1200, the intermediate image 1400 (intermediate image 1')illustrated in FIG. 83(B) is restored. Meanwhile, in FIG. 83(A), the regions indicated by the down-pointing arrows are the minimal regions 1201.

In the intermediate image 1' generated in step S110, as described above, the image contents have become unrecognizable by the image conversion (scrambling process) performed on the basis of the encryption key for the original image (raw image). Therefore, the original image can be restored by cancelling the image conversion performed for the intermediate image 1'. In other words, a process in the inverse order of the order followed in the image conversion of the original image at the time of the encryption is to be performed for the intermediate image 1'.

The process order of the image conversion for converting (encrypting) the original image into the intermediate image 1' by the image encryption apparatus 100 and the process order of the image conversion for restoring the intermediate image 1' as the original image by the image decryption apparatus 1000 are illustrated in FIG. 84.

FIG. 84(A) illustrates the order of the image conversion process in which the original image is encrypted as the intermediate image 1 by the image encryption apparatus 100. In the image conversion at the time of the encryption, first, on the basis of the encryption key, the columns 121C in the original image 120 are exchanged. Next, on the basis of the encryption key, the rows 141R in the image 140 obtained by the column exchange are exchanged. As a result, the intermediate image 150 (intermediate image 1) is obtained.

FIG. 84(B) illustrates the order of the image conversion process in which the original image is restored from the intermediate image 1' by the image decryption apparatus 1000. In the image restoration, first, on the basis of the decryption key, the exchange of the rows 1401R in the intermediate image 1400 (intermediate image 1') is performed. Next, on the basis of the decryption key, the exchange of the columns 1411C in the image 1410 obtained by the exchange is performed. As a result, the original image 1500 is restored.

In addition, in the image encryption by the image encryption apparatus 100 and in the image restoration by the image decryption apparatus 1000, the directions in the respective exchange processes of the rows and columns are opposite. For example, as illustrated in FIG. 85(A), it is assumed that at the time of the encryption by the image encryption apparatus 100, the columns 121C in the original image 120 are exchanged from left to right, in accordance with the bit arrangement order in the encryption key-related information. In this case, at the time of the decryption of the intermediate image 1', the image decryption apparatus 1000 is to exchange the columns 1411C in the intermediate image 1410 (intermediate image 1')from right to left which is an order opposite to the bit arrangement order of the decryption key (order from the last to the top of the bit arrangement), as illustrated in FIG. 85(B).

By the process as described above, as illustrated in FIG. 86, the scrambling performed for the intermediate image 1410 (intermediate image 1') illustrated in FIG. 86(A) can be cancelled, to restore the original image 1500 illustrated in FIG. 86(B).

The explanation of the flowchart in FIG. 66 is continued.

When the image conversion process in step S111 is completed as described above, the image in the encryption region is replaced with the original image restored in step S111 (S112).

The process contents in step S111 is illustrated in FIG. 87.

The image in the encryption region 1110 in the encrypted image 1100 illustrated in FIG. 87(A) is replaced with the restored image 1500 illustrated in FIG. 87(B). As a result, as illustrated in FIG. 87(C), an original image 1600 of the encrypted image 1100 is restored.

As described above, the restoration of the image in one encryption region in the encrypted image is completed.

When the process in step S111 is completed, return to step S102 is performed. Then, in step S102, an encryption region for which the image restoration has not been performed is detected from the encrypted image.

Thus, when there are a plurality of encrypted regions, the processes in step S102-S112 are repeated. Then, when it is determined in step S103 that there is no encryption region within the encryption region, that is, the restoration of the image in all the encryption regions in the encrypted image, the process may proceed to step S113.

In step S113, by the output means 1008, format conversion as needed and output of the decrypted image 1600 (output image) is performed. The decrypted image 1600 may be output in the format without change, or it may be converted into another image format and output. Or it may also be converted into and output as electronic-document data such as a Microsoft Office document and Adobe PDF document or into non-image data such as HTML and XML. By the output means 1008, the decrypted image 1600 (output image) is output as output data.

The restoration of the image in the encryption region in the input image from the final encrypted image generated by the image encryption apparatus 100 can be done only by a user who has a secret key paired with the public key used for the generation of the encryption key information embedded in the final encrypted image.

Accordingly, only by sending a printed matter or electronic data of the input image to which the encryption key information is embedded to a recipient, the recipient can restore the image in the encryption region in the input image using a public key paired with the public key to find the important information being the image of in the encryption region.

As described above, by using the image encryption apparatus 100 and the image decryption apparatus 1000 of the present invention, an encryption key (common key) used for the encryption of important information in an input image desired to be kept secret to third parties can be safely encrypted in the framework of the public key encryption system, and the important image in the input image can be safely exchanged between a legitimate sender and recipient without exchanging the encryption key in any means other than the input image.

[Second Embodiment of the Image Decryption Apparatus of the Present Invention]

Next, the basic configuration of the second embodiment of the image decryption apparatus of the present invention is explained. The image decryption apparatus is an apparatus decrypting an encrypted image generated by the first embodiment of the image encryption apparatus of the present invention described above.

[Configuration]

FIG. 88 is a diagram illustrating the second embodiment of the image decryption apparatus of the present invention. In FIG. 88, the same numerals are given to the same constituent elements as the constituent elements provided in the image decryption apparatus 1000 illustrated in FIG. 55.

The image decryption apparatus 2000 (second image decryption apparatus) illustrated in FIG. 88 has an input means 100X, encrypted position detection means 1001, pixel value conversion means 1002, image conversion means 2003, key-related information generation means 1004, embedded information detection means 2005, authentication means 1005, embedded information removal means 1006 and output means 1008.

The difference in the configuration of the image decryption apparatus 2000 and the image decryption apparatus 1000 is in the configuration after the pixel value conversion means 1002. In the image decryption apparatus 2000, intermediate image 2' generated by the pixel value conversion means 1002 is converted into intermediate image 1' by the image conversion means 2003. Then, the generation of the decrypted image (raw image) is performed by the embedded information removal means 1006.

The image decryption apparatus 2000 has a function to decrypt an encrypted part in input data and output the result as output data. Here, input data is output data itself from the image encryption apparatus 400, or data generated by intervention of data-format conversion, printing, copying, scanning and the like.

The input means 100X performs format conversion of the input data as needed, and provides it as an input image for the subsequent processes. The input data may be, for example, image data, electronic document data such as Microsoft Office documents and Adobe PDF document, or non-image data such as HTML and XML. In addition, in a case in which the encryption target is printed or drawn on a physical medium such as paper, it can be treated as input data by reading it by an optical device such as a scanner and digital camera.

FIG. 89 illustrates an input image 2100. The input image 2100 includes an encryption region 2110. The image in the encryption region 2110 is composed of minimal regions (embedding regions) in a checkerboard pattern divided by a plurality of borderlines 2111R in the row direction and a plurality of borderlines 2111C in the column direction.

The encrypted position detection means 1001 detects an encryption region in the input image, and further detects the positions of borderlines within the encryption region. The encrypted position detection means 1001 detects the position of the encryption region 2110 using a similar method as in the encrypted potion detection means 1001 of the image decryption apparatus 1000. In addition, the positions of the borderlines in the encryption region 2110 are detected in a similar manner as in the encrypted position detection means 1001 of the image decryption apparatus 1000.

A method of detecting the positions of the borderlines in the encrypted region 2110 by the encrypted position detection means 1001 is illustrated in FIG. 90. In FIG. 90, changes of the pixel values on a section line 2113R in the row direction and on a section line 2113C in the column direction in the encryption region 2110 are examined, and the width of the borderline in the encryption region 2110 is calculated by performing frequency analysis of a waveform 2115R of the pixel value change in the row direction and a waveform 2115R of the pixel value change in the column direction respectively, to detect the position of the borderline.

The pixel value conversion means 1002 cancels pixel value conversion performed for an image 2200 (hereinafter, referred to as an encrypted image 2200) in the encrypted region 2110 detected by the encrypted position detection means 1001, to generate a pixel value converted image.

A method with which the pixel value conversion means 1002 converts the encrypted image 2200 into a pixel value converted image is illustrated in FIG. 91.

In FIG. 91, referring to the checkerboard-pattern image 1310 illustrated in FIG. 91(B) (the checkerboard-pattern image similar to the checkerboard-pattern image used by the pixel value conversion means 106 of the image encryption apparatus 400), in the encrypted image 2200 illustrated in FIG. 91(A), the pixel values in a region (embedding region) corresponding to a region defined by a black region 1311B in the checkerboard-pattern 1310 are converted, to cancel the pixel value conversion performed for the encrypted image 2200 by the image conversion means 405 in the image encryption apparatus 400. Then, a pixel value converted image 2300 illustrated in FIG. 91(C) is generated.

Thus, by the image conversion means 2003, the intermediate image 2300 (intermediate image 2') illustrated in FIG. 92 is generated.

However, when the pixel value conversion means is not implemented in the image encryption apparatus 400, the pixel value conversion means 1002 in the image decryption means 2002 may be omitted.

For the intermediate image 2300 (intermediate image 2'), the image conversion means 2003 performs inverse conversion using a method in which the process order is opposite to that in the conversion means used by the image conversion means 405 of the image encryption apparatus 400 (inverse conversion method), to generate an intermediate image 2400 (intermediate image 1').

A method with which the image conversion means 2003 generates the intermediate image 1' from the intermediate image 2' is illustrated in FIG. 93. The method illustrated in FIG. 93 is similar to the method illustrated in FIG. 64 described above. In the method, first, segments 2301R in the row direction of the intermediate image 2300 (intermediate image 2') illustrated in FIG. 93(A) are exchanged using the upper three bits ("100") of the decryption key ("10011010") illustrated in FIG. 93(B), to generate an image 2310 illustrated in FIG. 93(C). Next, as illustrated in FIG. 93(C), segments 2311C in the column direction of the image 2310 are exchanged using the upper seven bits ("1001101") in the decryption key, to generate an intermediate image 2400 (intermediate image 1') illustrated in FIG. 93(D). The intermediate image is approximately similar to the intermediate image 600 (intermediate image 1') illustrated in FIG. 45.

The embedded information detection means 2005 detects, from the intermediate image 2400 (intermediate image 1') generated by the image conversion means 2003, the encryption key-related information embedded in the intermediate image 2400 at the time of the encryption. The detection method is similar to the detection method in the information detection means 1003 of the image decryption apparatus 1000.

A conceptual diagram of a method of detecting encryption key-related information by the embedded information detection means 2005 is illustrated in FIG. 94.

In the intermediate image 2400 (intermediate image 1') illustrated in FIG. 94(A), encryption key-related information is embedded using the second embedding method described above, that is, by inverting the pixel values in the embedding region. The embedded information detection means 2005 detects encryption key-related information ("10110110") illustrated in FIG. 94(B) from the intermediate image 2400 (intermediate image 1') using a method similar to that in the embedded information detection means 1003 of the image decryption apparatus 1000 described above.

The key-related information generation means 1004 converts the decryption key input by the decryption user into decryption key-related information in accordance with a certain rule (the same rule as the rule used by the key-related information generation means 1004 of the image encryption apparatus 400).

The authentication means 1005 checks whether the user currently attempting the decryption of the encrypted image 2200 is the one who has a right to view the original image (raw image), by crosschecking the encryption key-related information detected by the embedded information detection means 2005 and the decryption key-related information generated by the key-related information generation means 1004. When the decryption user is authenticated by the authentication means 1005, the process may be passed to the embedded information removal means 2006.

The embedded information removal means 2006 performs, when the decryption user is authenticated by the authentication means 1005, a process for resetting the pixel values changed when the information embedding means 403 of the image encryption apparatus 400 embedded the encryption key-related information into the intermediate image 2400 (intermediate image 1').

A method with which the embedded information removal means 2006 removes encryption key-related information from the intermediate image 1' is illustrated in FIG. 95.

As illustrated in FIG. 95(A), in order to remove the encryption key-related information ("10110110") from the intermediate image 2400 (intermediate image 1'), the embedded information removal means 2006 inverts the pixel values in seven embedding regions (minimal values) 2401 from the top of the highest row in the intermediate image 2400 (intermediate image 1'), to perform decryption and obtain an image 2500 illustrated in FIG. 95(B).

As a result, by the embedded information removal means 2006, an original image (raw image) 2500 illustrated in FIG. 26 is restored. Meanwhile, when an electronic watermark is embedded in the image encryption apparatus 400, the embedding is performed so as not to affect the appearance, so the removal of the embedded information is optional.

In the same manner as the output means 1008, in order to present the decryption result (decrypted image 2500) to the user, the output means 1008 converts the data format of the decrypted image 2500 as needed, and outputs output data.

By this output, it becomes possible to recognize the image in the encryption regions in the encrypted image generated by the image encryption apparatus 400.

<Operation>

The operation of the image decryption apparatus 2000 configured as described above is explained.

FIG. 97 is a flowchart illustrating the entire processes in the image decryption apparatus 2000. In FIG. 97, the same step numbers are assigned to the steps of which processing contents are the same as those in the flowchart illustrating the entire processes of the image decryption apparatus 1000 in FIG. 65 described above. In the following explanation, the processes that are different from those in the image decryption apparatus 1000 are explained with emphasis, and the explanation of similar processes is simplified or omitted.

As is apparent from the comparison of FIG. 97 and FIG. 65, steps S101-S105 are similar to those in the flowchart in FIG. 65. In addition, steps S107-S114 are also similar to those in the flowchart in FIG. 65.

The difference between the processes in the image decryption apparatus 2000 an the image decryption apparatus 1000 is in the processes between the "pixel value conversion process" in step S105 and the "embedded information detection process" in step S107.

In the image decryption apparatus 2000, following the pixel value conversion process in step S105, an "image conversion process" (S206) and an "embedded information detection process" (S207) are performed. In the following description, these process procedures different from those in the image decryption apparatus 1000 are explained with emphasis.

First, in step S101, the decryption user inputs input data, and format conversion of the input data is performed as needed, and the input data is given to the subsequent processes as an input image 2100.

Next, in step S102, an "encrypted position detection process" for detecting the position of an encryption region included in the input image is performed.

The encrypted position detection process is similar to the "encrypted position detection process" in the image decryption apparatus 1000 described above, and divided into two main stages.

First, in the same manner as in the method illustrated in FIG. 67, a rough position of an encryption region 2100 (encrypted image 2100) is identified from the encrypted image 2100. Next, as illustrated in FIG. 98, the borderlines (borderlines 2111C in the column direction and borderlines 2111R in the lateral direction) of the encryption region 2100 are determined. Thus, by the encrypted position detection process, the borderlines at the time when scrambling and the like was performed for the intermediate image 2 by the image encryption apparatus 2000 can be obtained. As mentioned above, the details of the process are disclosed in patent document 3.

Next, in step S103, whether or not there is an encryption region detected in the encrypted position detection process is determined in step S103, and when there is one, the process may proceed to step S104. The decryption user is asked in S104 to input the decryption key for decrypting the image in the encryption region, and when the input is completed, move to step S15 is performed. On the other hand, when it is determined that there is no encryption region, the process may proceed to step S113. Then, the "output process" described above is performed, and the process in the flowchart is terminated.

In step S105, the "pixel value conversion process" described above is performed. An example of the pixel value conversion process is illustrated in FIG. 99.

As illustrated in FIG. 99, the encrypted image 2100 illustrated in FIG. 99(A) is converted into the intermediate image 2300 (intermediate image 2') illustrated in FIG. 99(C) referring to the checkerboard-pattern image 1310 illustrated in FIG. 99(B). In other words, by cancelling the pixel value conversion performed for the encrypted image 2100, the intermediate image 2' is generated from the encrypted image 2100.

Following step S105, an "image conversion process" is performed by the image conversion means 2003 (S206). The method for the image conversion process is basically similar to that in the "image conversion process" in step S111 in the flowchart in FIG. 66 described above. The difference is in that the image to be the target of the process is not the "intermediate image 1'" but the "intermediate image 2'", and that the image to be restored is not the "original image" but the "intermediate image 1'".

In the intermediate image 2', the image contents have become unrecognizable by the image conversion (scrambling process) performed on the basis of the encryption key for the intermediate image 1. Therefore, by cancelling the image conversion performed for the intermediate image 2' on the basis of the decryption key, the intermediate image 1' can be restored.

The cancellation of the image conversion can be performing a process in an inverse order of the order in the image conversion performed at the time of the encryption. In other words, if the exchange of the columns was performed first in the image conversion at the time of the encryption and the exchange of columns was performed next, in the image conversion at the time of the decryption, the exchange of the rows is performed first, and the exchange of the columns is performed next.

An order of the image conversion at the time of the encryption is illustrated in FIG. 100(A). In the image conversion process in step S206, the intermediate image 2003 (intermediate image 2') is converted into the intermediate image 2400 (intermediate image 1') on the basis of the decryption key in the order illustrated in FIG. 100(B). In other words, on the basis of the decryption key, columns 2301R in the intermediate image 2300 (intermediate image 2') are exchanged, to convert the intermediate image 2300 into the image 2310. Next, rows 2311C in the image 2310 are exchanged on the basis of the decryption key, to convert the image 2310 into the intermediate image 2340 (intermediate image 1'). Meanwhile, at this time, the order for the respective exchange of the columns and the rows are reversed (see FIGS. 101(A) and 101(B)).

Thus, by the image conversion process in step S206, the scramble in the intermediate image 2300 (intermediate image 1') in FIG. 102(A) is cancelled, and the intermediate image 2400 (intermediate image 2') illustrated in FIG. 102(B) is generated.

Following step S206, an "embedded information detection process" is performed (S207). The algorithm of the embedded information detection process is the same as the algorithm of the "embedded information detection process" performed by the image decryption apparatus 1000 illustrated in the flowchart in FIG. 80 described above. The difference is that the image to be the target of the process is not the "intermediate image 2'" but the "intermediate image 1'".

In the embedded information detection process, the encryption key-related information embedded at the time of the encryption is detected from the intermediate image 1'. The specific detection method is explained with reference to FIGS. 103-105.

As illustrated in FIG. 103, embedding regions 2401 in the intermediate image 2400 (intermediate image 1') are obtained sequentially one by one by the zigzag scanning described above. At this time, from the obtained embedding region 2101, the "embedded information" is detected using the method illustrated in FIG. 104.

In the example illustrated in FIG. 104, the threshold value is set to 50%, and when the black pixel value in the embedding region 2401a is below the threshold value as illustrated in FIG. 104(A), it is determined that "0" is embedded. On the other hand, as illustrated in FIG. 103(B), when the black pixel value in the embedding region 2401b is above the threshold value, it is determined that all the pixel values in the region were inverted at the time of the embedding of the information, and that "1" is embedded. The detection as described above is performed with the zigzag scanning illustrated in FIG. 103, and the process is terminated when the detection of the encryption key-related information is completed. For example, as illustrated in FIG. 105, when the encryption key-related information being the seven-bit string "1011010" is detected as illustrated in FIG. 105(B), the detection process in the embedding regions is terminated.

Meanwhile, in the case in which other information (a user ID and the like) has been embedded together with the encryption key-related information, or only the other information has been embedded, the detection is performed for the amount of the information.

At the time when the process of step S207 is completed, the decryption key "10011010010" (=1234 (decimal number)) input by the decryption user and the encryption key-related information "1011010" (=90(decimal number) detected from the image (intermediate image 1') in the encryption region have been obtained. However, as described above, in order to perform the authentication, the decryption key needs to be converted into information related to it (decryption key-related information).

For this reason, following step S207, a "key-related information generation process" for generating decryption key-related information from the decryption key is performed (S208).

Following step S208, an "authentication process" for matching the decryption key-related information generated in step S208 and the encryption key-related information to authenticate the decryption user is performed (S108). The algorithm of the authentication process is the same as that in the authentication process in the image decryption apparatus 1000 described above (see the flowchart in FIG. 79).

Next, whether or not authentication has been given to the decryption user is determined (S109), and when the authentication has been given, an "embedded information removal process" for removing, from the intermediate image 1', the encryption key-related information embedded there (S110).

An example of the embedded information removal process is illustrated in FIG. 106.

As illustrated in FIG. 106(A), the top one bit (="1") in the encryption key-related information (="1011010") is obtained. Then, from the intermediate image 2400 (intermediate image 1'), the minimal region 2401 in the left corner of the top line in which the bit information is embedded, is obtained. Next, in the obtained minimal region 2401, the state with the bit information (="1") being embedded is cancelled.

A method for removing, from the minimal region in the intermediate image 1', information embedded there is illustrated in FIG. 107.

As illustrated in FIG. 107(A), in the case of the minimal region 2401a in which the information "0" is embedded, the pixel values of the minimal region 2401a was not changed at the time when the information was embedded. Accordingly, when cancelling the embedded information, there is no need to change the pixel values of the minimal region 2401a. Therefore, no change is performed for the image in the minimal region 2401a.

On the other hand, in the case of the minimal region 2401b in which "1" is embedded as illustrated in FIG. 107(B), the pixel values in the minimal region 2401b were inverted at the time of the encryption. Accordingly, the pixel values in the minimal region 2401b are inverted. As a result, the image in the minimal region 2401b becomes the same as the minimal region 2401a.

Thus, in both cases as illustrated in FIGS. 107(A) and 107(B), in which either the information "0" or "1" has been embedded into the embedding region, the image in the embedding region can be reset (the embedded information can be cancelled). The entire encryption key-related information embedded in the intermediate image 1' can be removed (canceled) by performing the processes as described above for the number of time corresponding to the number of bits (in this example, seven bits) that is equal to the information amount of the encryption key-related information.

As a result, as illustrated in FIG. 108, the encryption key-related information ("1011010") can be removed from the intermediate image 2400 (intermediate image 1') illustrated in FIG. 108(A), to restore an original image 2500 illustrated in FIG. 108(B).

Following step S110, a "replacement image with a restored image" in step S111 is performed. This process is the same as the process in step S111 in the image decryption process 1000, so detail explanation for it is omitted. Hereinafter, processes similar to those in the flowchart in FIG. 66 described above are performed.

The restoration of the image in the encryption region in the input image from the final encrypted image generated by the image encryption apparatus 400 can be done only by a user who has a secret key paired with the public key used for the generation of the encryption key information embedded in the final encrypted image.

Accordingly, only by sending a printed matter or electronic data of the input image to which the encryption key information is embedded to a recipient, the recipient can restore the image in the encryption region in the input image using a public key paired with the public key to find the important information being the image of in the encryption region.

As described above, by using the image encryption apparatus 400 and the image decryption apparatus 2000 of the present invention, an encryption key (common key) used for the encryption of important information in an input image desired to be kept secret to third parties can be safely encrypted in the framework of the public key encryption system, and the important image in the input image can be safely exchanged between a legitimate sender and recipient without exchanging the encryption key in any means other than the input image.

[System Configuration]
(1) Image Encryption Apparatus
<Computer Hardware Configuration>

The hardware configuration of a computer that functions as the image encryption apparatus 100 or the image encryption apparatus 400 described above is explained.

FIG. 109 is a diagram illustrating the hardware configuration of a computer being the execution environment of a program that makes the computer function as the image encryption apparatus 100 or the image encryption apparatus 400.

A computer 300 illustrated in FIG. 109 has a CPU (Central Processing Unit) 3010, memory 3020 (computer-readable record medium), an input device 3030, an external storage device 3040, a medium drive device 3050, a network connection device 3060, and an output device 3070.

The CPU 3010 is a central processing unit that controls the entire operation of the computer 3000, and makes the computer 3000 function as the image encryption apparatus 100 or the image encryption apparatus 400 by executing an image encryption program stored in a program storage region 3021 in the memory 3020. Here, a program making the computer 3000 function as the image encryption apparatus 100 is referred to as a first image encryption program and a program making the computer 3000 function as the image encryption apparatus 400 is referred to as a second image encryption program, with distinction. The program storage region 3021 also stores, other than the first or second image encryption program, basic software (OS), drivers (software) for the respective devices 3030-3070, communication control software for the network connection device 3060, and so on.

The memory 3020 has, other than the program storage region 3021, an input image storage region 3022, an encryption key storage region 3023, an encryption key-related information storage region 3024, a borderline position information storage information 3025, an intermediate image storage region 3026, an encrypted image storage region 3027, an embedding pattern storage region 3028, an operation region 3029, and so on.

The input image storage region 3022 stores an input image to be the target of encryption. The encryption key storage region 3023 stores an encryption key used in the encryption of the input image. The key-related information storage region 3024 stores encryption key-related information generated on the basis of the encryption key. The borderline position information storage region 3025 stores borderline position information that is information related to the position of a borderline of an embedding region (minimal region) in an in image in which the encryption key-related information is embedded. The intermediate image storage region 3026 stores the intermediate image 1 and the intermediate image 2. The encrypted image storage region 3027 stores an encrypted image generated by the image encryption apparatus 100 or the image encryption apparatus 400. The embedding pattern storage region 3028 stores information related to an embedding pattern in the embedding of the encryption key-related information in the embedding region. The operation region 3029 holds temporary data used for in the execution of the first or second image encryption program by the CPU 3010, and the like.

The input device 3030 is a device used by the encryption user to input an image to be encrypted (input image), to specify an encryption region in the input image, and so on, and specifically, it is composed of a keyboard, mouse and the like.

The external storage device 3040 is a device that saves/stores the image encryption program, the embedding pattern, the encrypted image and the so on, and specifically, it is a magnetic disc device, an optical disc device, or a magnet-optical disc device and the like.

The medium drive device 3050 is a device in/from which a portable storage medium 3080 is placed/removed, and performs, with the placed portable storage medium 3080, the writing in/reading out of data. The portable storage medium 3080 is a CD (Compact Disc), DVD (Digital Video Disc), or a USB (Universal Serial Bus) memory, a memory card such as a SD (Secure Digital) card. The first or second image encryption program, the image being the encryption target (input image), the encrypted image and so on are saved in the portable storage medium. The image encryption program stored in the portable storage medium 3080 is read out by the medium drive apparatus 3050, loaded onto the program storage region 3021, and can be executed by the CPU 3010.

The network connection device 3060 is a device for the communication connection with a LAN (Local Area Network) or a WAN (Wide Area Network) such as the Internet, a leased line network and the like, and performs communication with an external server, terminal and so on via these networks. The image encryption program can be downloaded in the external storage device 3040 of the computer 3000 from a website of a vendor of the first or second image encryption program via a network, and the network connection device 3060 is used in the download.

The output device 3070 is composed of a display device such as an liquid crystal display, a CRT (Cathode Ray Tube), and a printer device such as a printer, and so on. The output device 3070 performs the display of an input image, intermediate images 1 and 2, and further an encryption image, and so on. In addition, it has a function as a man-machine interface such as a GUI (Graphical User Interface) by means of screen display.

<Function Block Configuration>
[Image Encryption Apparatus 100]

FIG. 110 is a function block diagram of processes in the image encryption apparatus 100.

The configuration is made with input means 101, encryption region specifying means 102, image conversion means 103, key-related information generation means 104, information embedding means 105, pixel value conversion means 106, and output means 107.

[Image Encryption Apparatus 400]

FIG. 111 is a function block diagram of processes in the image encryption apparatus 400.

Configuration is made with input means 101, encryption region specifying means 102, key-related information generation means 104, information embedding means 403, image conversion means 405, pixel value conversion means 106, and output means 107.

(2) Image Decryption Apparatus
<Computer Hardware Configuration>

The hardware configuration of a computer that functions as the image decryption apparatus 1000 or the image decryption apparatus 2000 described above is explained.

FIG. 112 is a diagram illustrating the hardware configuration of a computer being the execution environment of a program that makes the computer function as the image decryption apparatus 1000 or the image decryption apparatus 2000.

A computer 5000 illustrated in FIG. 112 has a CPU (Central Processing Unit) 5010, memory 5100 (computer-readable record medium), an input device 5030, an external storage device 5040, a medium drive device 5050, a network connection device 5060, and an output device 5070.

The CPU 5010 is a central processing unit that controls the entire operation of the computer 5000, and makes the computer 5000 function as the image decryption apparatus 1000 or the image decryption apparatus 2000 by executing an image decryption program stored in a program storage region 5101 in the memory 5100. Here, a program making the computer 5000 function as the image decryption apparatus 1000 is referred to as a first image decryption program and a program making the computer 5000 function as the image decryption apparatus 2000 is referred to as a second image decryption program, with distinction. The program storage region 5101 also stores, other than the first or second image decryption program, basic software (OS), drivers (software) for the respective devices 5030-5070, communication control software for the network connection device 5060, and so on.

The memory 5100 has, other than the program storage region 5101, an encrypted image storage region 5102, a borderline position information storage region 5103, a decryption key storage region 5104, a decryption key-related information storage region 5105, an encryption key-related information storage region 5106, an intermediate image storage region 5107, a decrypted image storage region 5108, an embedding pattern storage region 5109, an operation region 5110, and so on.

The encrypted image storage region 5102 stores an encrypted image generated by the image encryption apparatus 100 or the image encryption apparatus 400. The borderline position information storage region stores borderline position information that is information related to the position of a borderline of an embedding region (minimal region) in an in image in which the encryption key-related information is embedded. The decryption key storage region 5104 stores a decryption key required in the decryption of the encrypted image. The decryption key-related information storage region 5105 stores decryption key-related information generated by an algorithm similar to the generation algorithm of the encryption key-related information on the basis of the internet decryption key. The intermediate image storage region 5107 stores the intermediate image 1' and the intermediate image 2'. The decrypted image storage region 5108 stores a restored image obtained by performing restoration with the encrypted image. The embedding pattern storage region 5109 stores information related to an embedding pattern in the embedding of the encryption key-related information in the embedding region. The operation region 5110 holds temporary data used for in the execution of the first or second image decryption program by the CPU 5010, and the like.

The input device 5030 is a device used by the decryption user to input the encrypted image and the decryption key, and specifically, it is composed of a keyboard, mouse and the like.

The external storage device 5040 is a device that saves/stores the image decryption program, the embedding pattern, the restored image and the so on, and specifically, it is a magnetic disc device, an optical disc device, or a magnet-optical disc device and the like.

The medium drive device 5050 is a device in/from which a portable storage medium 5080 is placed/removed, and performs, with the placed portable storage medium 5080, the writing in/reading out of data. The portable storage medium 5080 is a CD (compact Disc), DVD (Digital Video Disc), or a USB (Universal Serial Bus) memory, a memory card such as a SD (Secure Digital) card. The first or second image decryption program, the image being the encryption target (input image), the encrypted image, the restored image and so on are saved in the portable storage medium. The first or second image decryption program stored in the portable storage medium 5080 is readout by the medium drive apparatus 5050, loaded onto the program storage region 5101, and can be executed by the CPU 5010.

The network connection device 5060 is a device for the communication connection with a LAN (Local Area Network) or a WAN (Wide Area Network) such as the Internet, a leased line network and the like, and performs communication with an external server, terminal and so on via these networks. The image decryption program can be downloaded in the external storage device 5040 of the computer 5000 from a website of a vendor of the first or second image decryption program via a network, and the network connection device 5060 is used in the download.

The output device 5070 is composed of a display device such as an liquid crystal display, a CRT (Cathode Ray Tube), and a printer device such as a printer, and so on. The output device 3070 performs the display of an input image, intermediate images 1, 2, and further an encryption image, and so on. In addition, it has a function as a man-machine interface such as a GUI (Graphical User Interface) by means of screen display.

<Function Block Configuration>
[Image Decryption Apparatus 1000]

FIG. 113 is a function block diagram of processes in the image decryption apparatus 1000.

The processes in the image decryption apparatus 1000 is composed of input means 100X, encrypted position detection means 1001, pixel value conversion means 1002, embedded information detection means 1003, key-related information generation means 1004, authentication means 1005, embedded information removal means 1006, image conversion means 1007 and output means 1008.

[Image Decryption Apparatus 2000]

FIG. 114 is a function block diagram of processes in the image decryption apparatus 2000.

The processes in the image decryption apparatus 2000 is composed of input means 100X, encrypted position detection means 1001, pixel value conversion means 1002, image conversion means 2003, embedded information detection means 2004, authentication means 1005, embedded information removal means 1006, and output means 1008.

<Application Example to a Multifunction Machine>

A system configuration in a case of applying the encryption process and the decryption process in the present invention to a multifunction machine is illustrated in FIG. 115.

In regard to FIG. 115, a CPU board 7001 performs the control of the entire system. An external interface 7002 has a function to connect to an external computer. A scanner interface 7003 plays a role of interface control with a scanner 7004. Image information read from the scanner 7004 is accumulated in an image buffer 7005. A printer interface 7006 plays a role of interface control with a printer 7007.

FIG. 116 is a diagram illustrating the configuration of the CPU board 7001. The reference 7101 is a CPU, which performs the control of the entire system. The reference 7102 is a ROM, which stores programs of the encryption process and the decryption process that the CPU board is to be directed to perform. The reference 7013 is a RAM, which temporarily saves various data and the like required for performing the encryption process and the decryption process. In addition, an operation panel 7104 has a function to receive key input by a user, and a function to display a message and the like to the user. Further, an interface 7105 is an interface for connecting the CPU board 7001 and a system bus 7106.

With the system presented in FIG. 115, it becomes possible to realize the encryption process and the decryption process of the present invention in a multifunction machine.

In addition, other than the personal computer, the function of the present invention may be built into a copy machine (including a multifunction machine), FAX, printer, over head reader, mobile phone, mobile station, digital camera, TV and the like. In other words, the present invention is not limited to the embodiments described above, and may be in various configurations or forms within the scope that does not deviate from the gist of the present invention.

The present invention may also be realized as software, and can be mounted on various terminals accordingly. Therefore, a general user and the like can easily perform image encryption of a printed matter and so on that includes confidential information of the individual, and can give the contents of the printed matter and so on to a legitimate individual or institute directly or via a network and the like, while maintaining a high security. In addition, the receiving side can easily restore the encrypted image using a decryption key.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image encryption apparatus encrypting an image, comprising:
    a central processing unit; and
    a computer-readable recording medium having stored therein a program for causing the central processing unit to execute processes, the processes including:
    obtaining input data, performing format conversion of the obtained input data into an image as needed, and inputting the image to be a target of encryption;
    specifying, with regard to an image obtained by the obtaining, a region to be encrypted;
    converting an image in the encryption region specified by the specifying into a first intermediate image on a basis of an encryption key;
    generating encryption key-related information on a basis of the encryption key;
    embedding the encryption key-related information generated by the generating into the first intermediate image to generate a second intermediate image;
    performing pixel value conversion for the second intermediate image generated by the embedding; and
    outputting the image after the pixel value conversion while performing format conversion of the image as needed, wherein
    the embedding embeds the encryption key-related information into the image in the encryption region by converting pixel values of the image in the encryption region on a basis of the encryption key-related information.

2. An image encryption apparatus encrypting an image, comprising:
    a central processing unit; and
    a computer-readable recording medium having stored therein a program for causing the central processing unit to execute processes, the processes including:
    obtaining input data, performing format conversion of the obtained input data into an image as needed, and inputting the image to be a target of encryption;
    specifying, with regard to an image obtained by the obtaining, a region to be encrypted;
    generating, on a basis of the encryption key, encryption key-related information that is information related to the encryption key;
    embedding the encryption key-related information generated by the generating into an image in the encryption region specified by the specifying to generate a first intermediate image;
    converting the first intermediate in on a basis of the encryption key to generate a second intermediate image;
    performing pixel value conversion for the second intermediate image generated by the converting; and
    outputting the image after the pixel conversion while performing format conversion of the image as needed, wherein
    the embedding embeds the encryption key-related information into the image in the encryption region by converting pixel values of the image in the encryption region on a basis of the encryption key-related information.

3. The image encryption apparatus according to claim 2, wherein the generating the encryption key-related information generates the encryption key-related information by performing hash transformation of the encryption key.

4. The image encryption apparatus according to claim 2, wherein the performing the pixel value conversion is inversion of pixel values.

5. The image encryption apparatus according to claim 2, wherein the embedding converts pixel values in the image in the encryption region in accordance with a pattern corresponding to information to be embedded.

6. The image encryption apparatus according to claim 2, wherein the embedding embeds the encryption key-related information by electronic watermarking methods.

7. An image decryption apparatus decrypting an encrypted image to generate a decrypted image, comprising:
   a central processing unit; and
   a computer-readable recording medium having stored therein a program for causing the central processing unit to execute processes, the processes including:
   obtaining input data, performing format conversion of the obtained data into an image as needed, and inputting the image as an encrypted image;
   detecting a position of an encryption region from the encrypted image;
   converting pixel values in the encryption region detected by the detecting to generate a first intermediate image;
   detecting encryption key-related information embedded in the first intermediate image;
   converting a decryption key into decryption key-related information;
   crosschecking the encryption key-related information and the decryption key-related information to check whether the decryption key is correct;
   removing, when the decryption key is authenticated as correct by the crosschecking, the encryption key-related information from the first intermediate image to generate a second intermediate image;
   converting the second intermediate image on a basis of the decryption key to generate a decrypted image; and
   outputting the decrypted image while performing format conversion of the decrypted image as needed.

8. An image decryption apparatus decrypting an encrypted image to generate a decrypted image, comprising:
   a central processing unit, and
   a computer-readable recording medium having stored therein a program for causing the central processing unit to execute processes, the processes including:
   obtaining input data, performing format conversion of the obtained data into an image as needed, and inputting the image as an encrypted image;
   detecting a position of an encryption region from the encrypted image;
   converting pixel values in the encryption region to generate a first intermediate image;
   converting the first intermediate image on a basis of a decryption key to generate a second intermediate image;
   detecting encryption key-related information embedded in the second intermediate image;
   converting the decryption key into decryption key-related information;
   crosschecking the encryption key-related information and the decryption key-related information to check whether the decryption key is correct;
   removing, when the decryption key is authenticated as correct by the crosschecking, the encryption key-related information from the second intermediate image to generate a decrypted image;
   outputting the decrypted image while performing format conversion of the decrypted image as needed.

9. An image encryption method for encrypting an image, comprising:
   obtaining input data, performing format conversion of the obtained input data into an image as needed, and inputting the image to be a target of encryption;
   specifying, with regard to an image obtained by the obtaining, a region to be encrypted;
   converting an image in the encryption region specified by the specifying into a first intermediate image on a basis of an encryption key;
   generating encryption key-related information on a basis of the encryption key;
   embedding the encryption key-related information generated by the generating into the first intermediate image to generate a second intermediate image;
   performing pixel value conversion for the second intermediate image generated by the embedding; and
   outputting the image after the pixel value conversion while performing format conversion of the image as needed, wherein
   in the embedding, the encryption key-related information is embedded into the image in the encryption region by converting pixel values of the image in the encryption region on a basis of the encryption key-related information.

10. An image encryption method for encrypting an image, comprising:
    obtaining input data, performing format conversion of the obtained input data into an image as needed, and inputting the image to be a target of encryption;
    specifying, with regard to an image obtained by the obtaining, a region to be encrypted;
    generating, on a basis of the encryption key, encryption key-related information that is information related to the encryption key;
    embedding the encryption key-related information generated by the generating into an image in the encryption region specified by the specifying to generate a first intermediate image;
    converting the first intermediate image on a basis of the encryption key to generate a second intermediate image;
    performing pixel value conversion for the second intermediate image generated by the converting; and
    outputting the image after the pixel conversion while performing format conversion of the image as needed, wherein
    in the embedding, the encryption key-related information is embedded into the image in the encryption region by converting pixel values of the image in the encryption region on a basis of the encryption key-related information.

11. The image encryption method according to claim 10, wherein in the embedding, pixel values in the image in the encryption region are converted in accordance with a pattern corresponding to information to be embedded.

12. An image decryption method for decrypting an encrypted image, comprising:
    obtaining input data, performing format conversion of the obtained data into an image as needed, and inputting the image as an encrypted image;
    detecting a position of an encryption region from the encrypted image;
    converting pixel values in the encryption region detected by the detecting to generate a first intermediate image;
    detecting encryption key-related information embedded in the first intermediate image;

converting a decryption key into decryption key-related information;

crosschecking the encryption key-related information and the decryption key-related information to check whether the decryption key is correct;

removing, when the decryption key is authenticated as correct by the crosschecking, the encryption key-related information from the first intermediate image to generate a second intermediate image;

converting the second intermediate image on a basis of the decryption key to generate a decrypted image; and outputting the decrypted image while performing format conversion of the decrypted image as needed.

13. An image decryption method for decrypting an encrypted image to generate a decrypted image, comprising:

obtaining input data, performing format conversion of the obtained data into an image as needed, and inputting the image as an encrypted image;

detecting a position of an encryption region from the encrypted image;

converting pixel values in the encryption region to generate a first intermediate image;

converting the first intermediate image on a basis of a decryption key to generate a second intermediate image;

detecting encryption key-related information embedded in the second intermediate image;

converting the decryption key into decryption key-related information;

crosschecking the encryption key-related information and the decryption key-related information to check whether the decryption key is correct;

removing, when the decryption key is authenticated as correct by the crosschecking, the encryption key-related information from the second intermediate image to generate a decrypted image;

outputting the decrypted image while performing format conversion of the decrypted image as needed.

14. A non-transitory computer-readable record medium which records an image encryption program for making a computer function, in order to encrypt an image by performing a method comprising:

obtaining input data, perform format conversion of the obtained input data into an image as needed, and input the image to be a target of encryption;

specifying, with regard to an image obtained, a region to be encrypted;

converting an image in the encryption region specified into a first intermediate image on a basis of an encryption key;

generating encryption key-related information on a basis of the encryption key;

embedding the encryption key-related information into the first intermediate image to generate a second intermediate image;

performing pixel value conversion for the second intermediate image so that a position of the encryption region can be specified at a time of decryption; and outputting an image generated by the pixel value conversion while performing format conversion of the image as needed with the encryption key-related information embedded into the image in the encryption region by converting pixel values of the image in the encryption region on a basis of the encryption key-related information.

15. A non-transitory computer-readable record medium which records an image encryption program for making a computer function, in order to encrypt an image by performing a method comprising:

obtaining input data, perform format conversion of the obtained input data into an image as needed, and input the image to be a target of encryption;

specifying, with regard to an image obtained, a region to be encrypted;

generating encryption key-related information on a basis of the encryption key;

embedding the encryption key-related information into an image in the encryption region to generate a first intermediate image;

converting the first intermediate image on a basis of the encryption key to generate a second intermediate image;

performing pixel value conversion for the second intermediate image so that a position of the encryption region can be specified at a time of decryption; and outputting an image generated by the pixel value conversion while performing format conversion of the image as needed with the encryption key-related information embedded into the image in the encryption region by converting pixel values of the image in the encryption region on a basis of the encryption key-related information.

16. The non-transitory computer-readable record medium according to claim 15, wherein the embedding converts pixel values in the image in the encryption region in accordance with a pattern corresponding to information to be embedded.

17. A non-transitory computer-readable record medium which records an image decryption program for making a computer function, in order to decrypt an encrypted image by performing a method comprising:

obtaining input data, perform format conversion of the obtained input data into an image as needed, and input the image as an encrypted image;

detecting a position of an encryption region from the encrypted image;

converting pixel values in the encryption region to generate a first intermediate image;

detecting encryption key-related information embedded in the first intermediate image;

converting a decryption key into decryption key-related information;

authentication by crosschecking the encryption key-related information and the decryption key-related information to check whether the decryption key is correct;

removing, when the decryption key is authenticated as correct by the authentication, the encryption key-related information from the first intermediate image to generate a second intermediate image;

converting the second intermediate image on a basis of the decryption key to generate a decrypted image; and outputting the decrypted image while performing format conversion of the decrypted image as needed.

18. A non-transitory computer-readable record medium which records an image decryption program for making a computer function, in order to decrypt an encrypted image by performing a method comprising:

obtaining input data, perform format conversion of the obtained input data into an image as needed, and input the image as an encrypted image;

detecting a position of an encryption region from the encrypted image;

converting pixel values in the encryption region to generate a first intermediate image;

converting the first intermediate image on a basis of a decryption key to generate a second intermediate image;

detecting encryption key-related information embedded in the second intermediate image;

converting the decryption key into decryption key-related information;

authentication by crosschecking the encryption key-related information and the decryption key-related information to check whether the decryption key is correct;

removing, when the decryption key is authenticated as correct by the authentication, the encryption key-related information from the second intermediate image to generate a decrypted image;

outputting the decrypted image while performing format conversion of the decrypted image as needed.

* * * * *

UNITED STATES PATENT AND TRADEMARK OFFICE
CERTIFICATE OF CORRECTION

| | |
|---|---|
| PATENT NO. | : 8,588,414 B2 |
| APPLICATION NO. | : 12/626104 |
| DATED | : November 19, 2013 |
| INVENTOR(S) | : Hideaki Ishii et al. |

It is certified that error appears in the above-identified patent and that said Letters Patent is hereby corrected as shown below:

In the Claims

In Column 48, Line 53, In Claim 2, delete "in" and insert -- image --, therefor.

Signed and Sealed this
Twenty-fifth Day of March, 2014

Michelle K. Lee
*Deputy Director of the United States Patent and Trademark Office*